US012739663B2

(12) United States Patent
Soldati et al.

(10) Patent No.: US 12,739,663 B2
(45) Date of Patent: Sep. 15, 2026

(54) REFERENCE SIGNAL BEAM CONFIGURATION IN A WIRELESS COMMUNICATION NETWORK

(71) Applicant: Telefonaktiebolaget LM Ericsson (publ), Stockholm (SE)

(72) Inventors: Pablo Soldati, Solna (SE); Luca Lunardi, Genoa (IT); Angelo Centonza, Granada (ES); Ali Parichehrehteroujeni, Linköping (SE); Pradeepa Ramachandra, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 619 days.

(21) Appl. No.: 18/020,000

(22) PCT Filed: Aug. 5, 2021

(86) PCT No.: PCT/SE2021/050772
§ 371 (c)(1),
(2) Date: Feb. 6, 2023

(87) PCT Pub. No.: WO2022/031209
PCT Pub. Date: Feb. 10, 2022

(65) Prior Publication Data

US 2023/0300634 A1 Sep. 21, 2023

Related U.S. Application Data

(60) Provisional application No. 63/062,177, filed on Aug. 6, 2020.

(51) Int. Cl.
*H04W 24/02* (2009.01)
*H04L 5/00* (2006.01)

(52) U.S. Cl.
CPC ........... *H04W 24/02* (2013.01); *H04L 5/0051* (2013.01)

(58) Field of Classification Search
CPC ....... H04W 24/00; H04W 24/02; H04W 4/50; H04W 16/24; H04W 16/28;
(Continued)

(56) References Cited

U.S. PATENT DOCUMENTS 5,966,668 A * 10/1999 Lindroth ............... H04W 84/14 455/446
2016/0066312 A1* 3/2016 Centonza .............. H04W 72/27 370/329
(Continued)

FOREIGN PATENT DOCUMENTS

CN 109327327 A 2/2019
EP 3229515 A1 10/2017
(Continued)

OTHER PUBLICATIONS

International Search Report and Written Opinion of the International Searching Authority, PCT/SE2021/050772, mailed Nov. 9, 2021, 11 pages.
(Continued)

*Primary Examiner* — Warner Wong
(74) *Attorney, Agent, or Firm* — Sage Patent Group

(57) ABSTRACT

A first network node is configured for use in a wireless communication network. The first network node determines a modified configuration of a reference signal beam of a serving cell of the first network node. The first network node transmits a first indication to a second network node. The first indication comprises a configuration update message that describes the modified configuration of the reference signal beam of the serving cell.

22 Claims, 25 Drawing Sheets

(58) Field of Classification Search
CPC ............... H04W 72/046; H04W 16/00; H04W 36/008355; H04W 36/008357; H04W 84/00; H04L 5/003; H04L 5/0048; H04L 5/0051; H04L 5/0091; H04L 41/08; H04L 41/0803; H04L 5/00; H04L 5/0026
See application file for complete search history.

(56) References Cited

U.S. PATENT DOCUMENTS

| | | | | |
|---|---|---|---|---|
| 2016/0309376 | A1* | 10/2016 | Liu | H04L 5/0048 |
| 2017/0026846 | A1* | 1/2017 | Byun | H04W 24/02 |
| 2019/0132066 | A1* | 5/2019 | Park | H04W 76/27 |
| 2019/0132777 | A1* | 5/2019 | Park | H04W 36/0079 |
| 2019/0132778 | A1* | 5/2019 | Park | H04W 36/0085 |
| 2019/0141592 | A1* | 5/2019 | Park | H04W 36/0079 |
| 2019/0182683 | A1* | 6/2019 | Khirallah | H04W 16/28 |
| 2019/0357059 | A1* | 11/2019 | Frenger | H04B 7/0617 |
| 2020/0229057 | A1* | 7/2020 | Park | H04B 17/309 |
| 2020/0229058 | A1* | 7/2020 | Park | H04W 36/085 |
| 2023/0092324 | A1* | 3/2023 | Seidel | H04W 74/0833 370/329 |
| 2023/0319764 | A1* | 10/2023 | Shreevastav | H04L 5/0057 455/456.1 |
| 2024/0195593 | A1* | 6/2024 | Lunardi | H04L 5/0096 |
| 2024/0259837 | A1* | 8/2024 | Soldati | H04W 16/10 |

FOREIGN PATENT DOCUMENTS

| | | | |
|---|---|---|---|
| IN | 201947037530 | A | 9/2019 |
| IN | 201947037567 | A | 9/2019 |
| WO | 2018204863 | A1 | 11/2018 |

OTHER PUBLICATIONS

"Solution for RACH Optimization in NG-RAN," 3GPP TSG-RAN WG3 #105, R3-194292 Ljubljana, SL, Aug. 26-30, 2019, Agenda Item 10.2.3, Ericsson, XP051770484, 7 pages.

"(TP for SON BL CR for TS 38.423, TS 38.473, TS 38.300): CCO," 3GPP TSG-RAN WG3 Meeting #110-e, R3-206514, Online, Nov. 2-12, 2020, Agenda Item 10.2.2, Ericsson, XP051941786, 41 pages.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15) 3GPP TS 36.300 V15.10.0 (Jul. 2020) 365 pages.

3rd Generation Partnership Project; Technical Specification Group Radio Access Network; NR; Physical layer procedures for data (Release 15) 3GPP TS 38.214 V15.10.0 (Jun. 2020) 107 pages.

3rd Generation Partnership Project; Technical Specification Group Radio Access Network; NR; NR and NG-RAN Overall Description; Stage 2 (Release 16) 3GPP TS 38.300 V16.2.0 (Jul. 2020) 148 pages.

3rd Generation Partnership Project; Technical Specification Group Radio Access Network; NG-RAN; Architecture description (Release 15) 3GPP TS 38.401 V15.4.0 (Dec. 2018) 40 pages.

3rd Generation Partnership Project; Technical Specification Group Radio Access Network; Evolved Universal Terrestrial Radio Access Network (E-UTRAN); X2 application protocol (X2AP) (Release 16) 3GPP TS 36.423 V16.2.0 (Jul. 2020) 489 pages.

3rd Generation Partnership Project; Technical Specification Group Radio Access Network; NR; Physical layer procedures for control (Release 15) 3GPP TS 38.213 V15.10.0 (Jun. 2020) 109 pages.

Search Report, Japanese Patent Application No. 2023-501669, mailed Jan. 26, 2024, 4 pages.

3rd Generation Partnership Project; Technical Specification Group Radio Access Network; NG-RAN; F1 Application Protocol (F1AP) (Release 16), 3GPP TS 38.473 V16.2.0 (Jul. 2020), 5 pages.

"Scope of Coverage and Capacity Optimisation Solution for NR," 3GPP TSG-RAN WG3 #104, R3-193068, Reno, NV, US, May 13-17, 2019, Agenda Item 25.2.3.5, Ericsson, 6 pages.

"Support of CCO in NG-RAN," 3GPP TSG-RAN3 Meeting #104, R3-192969, Reno, NV, US, May 13-17, 2019, Agenda Item 25.2.3.5, Huawei, 5 pages.

Notice of Allowance, CN Patent Application No. 202180057911.6, mailed Mar. 16, 2026, 8 pages.

"Solution for RACH Conflict Detection and Resolution at gNB-DU," 3GPP TSG-RAN3 #107bis-e, Ericsson, R3-202266, Apr. 20-30, 2020, 97 pages.

"Beam related information inclusion in logged MDT," 3GPP TSG-RAN WG2 #105bis, Ericsson, TDoc R2-1905223, Apr. 8-12, 2019, Xi'an, Peoples Republic of China, 8 pages.

* cited by examiner

REFERENCE SIGNAL BEAM CONFIGURATION IN A WIRELESS COMMUNICATION NETWORK

CROSS REFERENCE TO RELATED APPLICATIONS

This application is a 35 U.S.C. § 371 national stage application of PCT International Application No. PCT/SE2021/050772 filed on Aug. 5, 2021, which in turn claims domestic priority to U.S. Provisional Patent Application No. 63/062,177, filed on Aug. 6, 2020, the disclosures and content of which are incorporated by reference herein in their entirety.

TECHNICAL FIELD

The present disclosure relates generally to communications, and more particularly to communication methods and related devices and nodes supporting wireless communications.

BACKGROUND

FIG. 1 shows the 5G Radio Access Network (RAN) architecture, also referred to as the Next Generation (NG) RAN architecture, e.g., according to 3rd Generation Partnership Project (3GPP) Technical Specification (TS) 38.401 v15.4.0. The NG-RAN consists of a set of gNBs connected to the 5G Core (5GC) through the NG interface. An gNB can support Frequency Division Duplex (FDD) mode, Time Division Duplex (TDD) mode or dual mode operation. gNBs can be interconnected through the Xn interface. A gNB may consist of a gNB-CU and gNB-DUs. A gNB-CU and a gNB-DU are connected via the F1 logical interface. One gNB-DU is connected to only one gNB-CU. For resiliency, a gNB-DU may be connected to multiple gNB-CUs by appropriate implementation. NG, Xn and F1 are logical interfaces. The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signalling transport.

A gNB may also be connected to a Long Term Evolution (LTE) eNB via the X2 interface. According to another architectural option, an LTE eNB connected to the Evolved Packet Core (EPC) network is connected over the X2 interface with a so called nr-gNB. The latter is a gNB not connected directly to a core network (CN) and connected via X2 to an eNB for the sole purpose of performing dual connectivity.

The architecture in FIG. 1 can be expanded by spitting the gNB-CU into two entities: One gNB Centralized Unit (CU) User Plane (UP) (gNB-CU-UP), which serves the user plane and hosts the Packet Data Convergence Protocol (PDCP) protocol and one gNB CU Control Plane (gNB-CU-CP), which serves the control plane and hosts the PDCP and Radio Resource Control (RRC) protocol. For completeness it should be said that a gNB-DU hosts the RLC/MAC/PHY protocols, where RLC stands for Radio Link Control, MAC stands for Medium Access Control, and PHY stands for Physical.

XnAP and X2AP procedures are defined in 3GPP so that a RAN node can provide a second RAN node with information to be used by the second RAN node for Capacity and Coverage Optimization (CCO).

The purpose of the eNB Configuration Update procedure, for example, is to update application level configuration data needed for two eNBs to interoperate correctly over the X2 interface. The procedure uses non UE-associated signaling, where UE stands for user equipment. In the procedure, eNB1 sends an eNB Configuration Update message to a peer eNB2, to transfer updated information for a TNBL association. With successful operation, eNB2 responds with an eNB Configuration Update Acknowledge message, whereas with unsuccessful operation eNB2 responds with an eNB Configuration Update Failure message.

The eNB Configuration Update message is configurable to include a Coverage Modification List Information Element (IE), which is a list of cells with modified coverage. For each cell in the list, the Coverage Modification List IE includes (i) an ECGI IE that indicates the E-UTRAN Cell Global Identifier (ECGI) of the cell to be modified; (ii) a Cell Coverage State IE with a value of '0' indicating that the cell is inactive or with another (non-zero) value indicating that the cell is active and also indicating the coverage configuration of the concerned cell; (iii) an optional Cell Deployment Status Indicator IE that, if present, indicates the Cell Coverage State is planned to be used at the next reconfiguration; and (iv) a Cell Replacing Info IE that includes a list of one or more ECGIs of one or more cells that may replace all or part of the coverage of the cell to be modified.

If the Coverage Modification List IE is present in the eNB Configuration Update message, eNB2 may use the information in the Cell Coverage State IE to identify the cell deployment configuration enabled by eNB1 and for configuring the mobility towards the cell(s) indicated by the ECGI IE, as described in TS 36.300 v15.10.0. If the Cell Deployment Status Indicator IE is present in the Coverage Modification List IE, the eNB2 shall consider the cell deployment configuration of the cell to be modified as the next planned configuration and shall remove any planned configuration stored for this cell. If the Cell Deployment Status Indicator IE is present and the Cell Replacing Info IE contains a non-empty cell list, the eNB2 may use this list to avoid connection or re-establishment failures during the reconfiguration, e.g. consider the cells in the list as possible alternative handover targets. If the Cell Deployment Status Indicator IE is not present, the eNB2 shall consider the cell deployment configuration of cell to be modified as activated and replace any previous configuration for the cells indicated in the Coverage Modification List IE.

Similarly, the purpose of the E-UTRA—New Radio (NR) Dual Connectivity (EN-DC) Configuration Update procedure is to update application level configuration data needed for eNB and en-gNB to interoperate correctly over the X2 interface. The procedure uses non UE-associated signalling. In the procedure, an initiating node (e.g., eNB) transmits an EN-DC Configuration Update message to a peer neighbouring node (e.g., en-gNB), where both nodes are able to interact for EN-DC, to transfer updated information for a TNL association. With successful operation, the peer neighbouring node responds with an EN-DC Configuration Update Acknowledge message, whereas with unsuccessful operation the peer neighbouring node responds with an EN-DC Configuration Update Failure message.

For NG-RAN, an NG-RAN node Configuration Update procedure is for updating application level configuration data needed for two NG-RAN nodes to interoperate correctly over the Xn-C interface. The procedure uses non UE-associated signalling. In the procedure, an NG-RAN node sends an NG-RAN NODE CONFIGURATION UPDATE message to a neighbouring NG-RAN node to transfer updated information for an Xn-C interface instance. With successful operation, the neighbouring NG-RAN node responds with an NG-RAN Configuration Update Acknowledge message, whereas with unsuccessful operation the neighbouring NG-RAN node responds with an NG-RAN Configuration Update Failure message.

An "NG-RAN NODE CONFIGURATION UPDATE" message includes, for an gNB, updated configuration data for NR cells served by the node sending the message ("Served Cells To Update NR" IE), and "Cell Assistance Information NR." For a ng-eNB, the definition of the "NG-RAN NODE CONFIGURATION UPDATE" message includes updated configuration data for E-UTRA cells served by the node sending the message ("Served Cells to Update E-UTRA" IE), and "Cell Assistance Information NR".

The definition of the "NG-RAN NODE CONFIGURATION UPDATE ACKNOWLEDGE" message includes, for an gNB, configuration data for NR cells served by the node sending the message ("Served Cell Information NR" IE within "Served NR Cells" IE), configuration data for NR neighbour of the NR cells served by the node sending the message ("Neighbour Information NR" IE within "Served NR Cells" IE), and configuration data for E-UTRA neighbour of the NR cells served by the node sending the message ("Neighbour Information E-UTRA" IE within "Served NR Cells" IE).

In this context, two types of reference signals are defined for NR, including a Synchronization Signal Block (SSB, or SS-Block) and a Channel State Information (CSI) Reference Signal (CSI-RS).

With regard to SSB, the IE SSB-Index identifies an SS-Block within an SS-Burst. See TS 38.213 v15.10.0, clause 4.1. The IE SSB-MTC is used to configure measurement timing configurations, i.e., timing occasions at which the UE measures SSBs. The IE SSB-PositionQCL-Relationship is used to indicate the quasi co-location (QCL) relationship between SSB positions on the frequency indicated by ssbFrequency (see TS 38.213 v15.10.0, clause 4.1). Value n1 corresponds to 1, value n2 corresponds to 2 and so on. The IE SSB-ToMeasure is used to configure a pattern of SSBs.

With regard to CSI-RS, the IE NZP-CSI-RS-Resource is used to configure Non-Zero-Power (NZP) CSI-RS transmitted in the cell where the IE is included, which the UE may be configured to measure on (see TS 38.214 v15.10.0, clause 5.2.2.3.1). A change of configuration between periodic, semi-persistent or aperiodic for an NZP-CSI-RS-Resource is not supported without a release and add. The IE NZP-CSI-RS-ResourceId is used to identify one NZP-CSI-RS-Resource. The IE NZP-CSI-RS-ResourceSet is a set of Non-Zero-Power (NZP) CSI-RS resources (their IDs) and set-specific parameters. The IE NZP-CSI-RS-ResourceSetId is used to identify one NZP-CSI-RS-ResourceSet.

SUMMARY

Some embodiments herein address drawbacks to the existing approaches for providing configuration updates between network nodes in a wireless communication network. In particular, the configuration data exchanged using the existing approach lacks support for cell shaping in Dual Connectivity scenario (such as EN-DC or NR-DC). Additionally, the existing approach lacks support for network capacity and coverage optimization by acting on the reference signal beams configuration (SSB beams or CSI-RS beams). Some embodiments in this regard provide signaling between two network nodes sharing a communication interface, such as an X2AP, an XnAP, or an F1AP interface, to support coverage or capacity optimization by means of cell shaping when the coverage area of a serving radio cell is divided by one or more partitions, as defined, for instance, by the coverage area of reference signals beams transmitted by a network node (such as SSB beams or CSI-RS beams).

More particularly, embodiments herein include a method performed by a first network node in a wireless communication network. The method comprises determining a modified configuration of a reference signal beam of a serving cell of the first network node and transmitting a first indication to a second network node. In this case, the first indication comprises a configuration update message that describes the modified configuration of the reference signal beam of the serving cell.

In some embodiments, the modified configuration modifies an identity of the reference signal beam. Additionally or alternatively, the modified configuration modifies a coverage state indicating a coverage configuration of the reference signal beam. Additionally or alternatively, the modified configuration modifies an identity of a cell to which the reference signal beam is mapped.

In some embodiments, the modified configuration is a modified coverage configuration of the reference signal beam.

In some embodiments, the configuration update message comprises a list of cells and/or a list of reference signal beams for which the first network node plans to use a modified configuration.

In some embodiments, the configuration update message indicates an identity of the serving cell.

Alternatively or additionally, in some embodiments, the configuration update message includes a list of one or more reference signal beams of the serving cell before coverage modification. In one embodiment, the list of one or more reference signal beams of the serving cell before coverage modification includes the reference signal beam, and the list indicates, for each of the one or more reference signal beams, a coverage state of the reference signal beam before coverage modification. Here, the coverage state indicates whether or not the reference signal beam is active before coverage modification and indicates a coverage configuration of the reference signal beam before coverage modification.

Alternatively or additionally, in some embodiments, the configuration update message includes a list of one or more replacing cells that are to replace all or part of a coverage of the serving cell after coverage modification. In one embodiment, the list of one or more replacing cells that are to replace all or part of a coverage of the serving cell after coverage modification indicates, for each of the one or more replacing cells, a list of one or more replacing reference signal beams of the replacing cell. In this case, the list of one or more replacing reference signal beams indicates, for each of the one or more replacing reference signal beams, a coverage state of the replacing reference signal beam after coverage modification. Here, the coverage state indicates whether or not the replacing reference signal beam is to be active after coverage modification and indicates a coverage configuration of the replacing reference signal beam after coverage modification.

In one or more embodiments, the modified configuration of the reference signal beam of the serving cell comprises a modification in the coverage state of the reference signal beam.

In some embodiments, the configuration update message comprises a list of one or more reference signal beams that are to replace all or part of the reference signal beam according to the modified configuration of the reference signal beam.

In some embodiments, the reference signal beam comprises a downlink reference signal beam that carries a synchronization signal block or a channel state information reference signal.

In some embodiments, the method further comprises receiving, at the first network node, an indication from the second network node of a capacity and coverage optimization, CCO, issue with the serving cell of the first network node. In this case, determining the modified configuration of the reference signal beam is performed in response to the received indication, and the indicated CCO issue comprises at least one of: a capacity issue, a coverage issue, an interference issue, and/or an uplink/downlink imbalance.

In some embodiments, the modified configuration comprises a change in a shape of the reference signal beam, a merging of the reference signal beam with at least another reference signal beam, or a splitting of the reference signal beam into at least multiple reference signal beams.

In some embodiments, the first network node is a distributed unit, DU, of a gNB and the second network node is a control unit, CU, of the gNB. In this case, the configuration update message is a gNB-DU Configuration Update message.

In some embodiments, the method further comprises receiving a second indication from the second network node, the second indication comprising an acknowledgement of the first indication.

In some embodiments, the first indication comprises information regarding a possible configuration of cells and/or beams of a neighbouring cell to the serving cell. For example, the possible configuration may be considered by the first network node to be compatible with the modified configuration described in the first indication. Or, where the modified configuration described in the first indication describes a change in shape of a reference signal beam of the serving cell, the possible configuration may comprise a proposed change to a shape of a beam in the neighbouring cell. Regardless, in some embodiments, the method further comprises receiving a second indication from the second network node, the second indication comprising a confirmation of the possible configuration.

Other embodiments herein include a method performed by a second network node in a wireless communication network. The method comprises receiving a first indication from a first network node, the first indication comprising a configuration update message that describes a modified configuration of a reference signal beam of a serving cell of the first network node, determining whether a modified neighbour cell list is needed based on the first indication, and updating cell configuration information associated to the first network node.

In some embodiments, the modified configuration modifies an identity of the reference signal beam. Additionally or alternatively, the modified configuration modifies a coverage state indicating a coverage configuration of the reference signal beam. Additionally or alternatively, the modified configuration modifies an identity of a cell to which the reference signal beam is mapped.

In some embodiments, the modified configuration is a modified coverage configuration of the reference signal beam.

In some embodiments, the configuration update message comprises a list of cells and/or a list of reference signal beams for which the first network node plans to use a modified configuration.

In some embodiments, the configuration update message indicates an identity of the serving cell.

Alternatively or additionally, in some embodiments, the configuration update message also indicates a list of one or more reference signal beams of the serving cell before coverage modification. In one such embodiment, the list includes the reference signal beam, and the list indicates, for each of the one or more reference signal beams, a coverage state of the reference signal beam before coverage modification, and the coverage state indicates whether or not the reference signal beam is active before coverage modification and indicates a coverage configuration of the reference signal beam before coverage modification.

In some embodiments, the configuration update message alternatively or additionally indicates a list of one or more replacing cells that are to replace all or part of a coverage of the serving cell after coverage modification. In one such embodiment, the list of one or more replacing cells indicates, for each of the one or more replacing cells, a list of one or more replacing reference signal beams of the replacing cell, the list of one or more replacing reference signal beams indicates, for each of the one or more replacing reference signal beams, a coverage state of the replacing reference signal beam after coverage modification, and the coverage state indicates whether or not the replacing reference signal beam is to be active after coverage modification and indicates a coverage configuration of the replacing reference signal beam after coverage modification. In one or more of these embodiments, the modified configuration of the reference signal beam of the serving cell comprises a modification in the coverage state of the reference signal beam.

In some embodiments, the configuration update message comprises a list of one or more reference signal beams that are to replace all or part of the reference signal beam according to the modified configuration of the reference signal beam.

In some embodiments, the reference signal beam comprises a downlink reference signal beam that carries a synchronization signal block or a channel state information reference signal.

In some embodiments, the method further comprises transmitting, to the first network node, an indication of a capacity and coverage optimization, CCO, issue with the serving cell of the first network node. In this case, the first indication is received in response to the transmitted indication, and the indicated CCO issue comprises at least one of: a capacity issue, a coverage issue, an interference issue, and/or an uplink/downlink imbalance.

In some embodiments, the modified configuration comprises a change in a shape of the reference signal beam, a merging of the reference signal beam with at least another reference signal beam, or a splitting of the reference signal beam into at least multiple reference signal beams.

In some embodiments, the first network node is a distributed unit, DU, of a gNB and the second network node is a control unit, CU, of the gNB, and the configuration update message is a gNB-DU Configuration Update message.

In some embodiments, the method further comprises transmitting a second indication to the first network node, the second indication comprising an acknowledgement of the first indication.

In some embodiments, the first indication comprises information regarding a possible configuration of cells and/or beams of a neighbouring cell to the serving cell. For example, the possible configuration may be considered by the first network node to be compatible with the modified configuration described in the first indication. Or, where the modified configuration described in the first indication describes a change in shape of a reference signal beam of the serving cell, the possible configuration may comprise a proposed change to a shape of a beam in the neighbouring cell. Regardless, in some embodiments, the method further comprises transmitting a second indication to the first network node, the second indication comprising a confirmation of the possible configuration.

Other embodiments herein include a method performed by a first network node in a wireless communication network. The method comprises receiving, from a second network node in the wireless communication network, an indication of a capacity and coverage optimization, CCO, issue with a serving cell of the first network node, and resolving the indicated CCO issue.

In some embodiments, the indicated CCO issue comprises at least one of: a capacity issue, a coverage issue, an interference issue, and/or an uplink/downlink imbalance with the serving cell of the first network node.

In some embodiments, resolving comprises determining a new cell and/or beam configuration.

In some embodiments, the method further comprises, responsive to receiving the indication of the CCO issue, determining a modified configuration of a reference signal beam of the serving cell of the first network node, and transmitting a first indication to the second network node. In this case, the first indication comprises a configuration update message that describes the modified configuration of the reference signal beam of the serving cell.

Other embodiments herein include a method performed by a second network node in a wireless communication network. The method comprises identifying a capacity and coverage optimization, CCO, issue with a serving cell of a first network node, and transmitting, to the first network node, an indication of the CCO issue.

In some embodiments, the indicated CCO issue comprises at least one of: a capacity issue, a coverage issue, an interference issue, and/or an uplink/downlink imbalance with the serving cell of the first network node.

Other embodiments herein include a first network node configured for use in a wireless communication network. The first network node is configured to determine a modified configuration of a reference signal beam of a serving cell of the first network node, and transmit a first indication to a second network node. In this case, the first indication comprises a configuration update message that describes the modified configuration of the reference signal beam of the serving cell.

In some embodiments, the first network node is configured to perform the steps described above for a first network node.

Other embodiments herein include a second network node configured for use in a wireless communication network. The second network node is configured to receive a first indication from a first network node, the first indication comprising a configuration update message that describes a modified configuration of a reference signal beam of a serving cell of the first network node. The second network node is also configured to determine whether a modified neighbour cell list is needed based on the first indication, and update cell configuration information associated to the first network node.

In some embodiments the second network node is configured to perform the steps described above for a second network node.

Other embodiments herein include a computer program comprising instructions which, when executed by at least one processor of a first network node, causes the first network node to perform the steps described above for a first network node. Other embodiments herein include a computer program comprising instructions which, when executed by at least one processor of a second network node, causes the second network node to perform the steps described above for a second network node. In one or more of these embodiments, a carrier containing the computer program described above is one of an electronic signal, optical signal, radio signal, or computer readable storage medium.

Other embodiments herein include a first network node configured for use in a wireless communication network. The first network node comprises a processor and a memory coupled to the processor. In this case, the memory comprises computer program instructions that, when executed by the processor, cause the first network node to determine a modified configuration of a reference signal beam of a serving cell of the first network node, and transmit a first indication to a second network node, with the first indication comprising a configuration update message that describes the modified configuration of the reference signal beam of the serving cell.

In some embodiments, the memory comprises computer program instructions that, when executed by the processor, cause the first network node to perform steps described above for a first network node.

Other embodiments herein include a second network node (400) configured for use in a wireless communication network. The second network node comprises a processor and a memory coupled to the processor. In this case, the memory comprises computer program instructions that, when executed by the processor, cause the second network node to receive a first indication from a first network node, the first indication comprising a configuration update message that describes a modified configuration of a reference signal beam of a serving cell of the first network node. The memory comprises computer program instructions that, when executed by the processor, further cause the second network node to determine whether a modified neighbour cell list is needed based on the first indication, and update cell configuration information associated to the first network node.

In some embodiments, the memory comprises computer program instructions that, when executed by the processor, cause the second network node to configured to perform the steps described above for a second network node.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
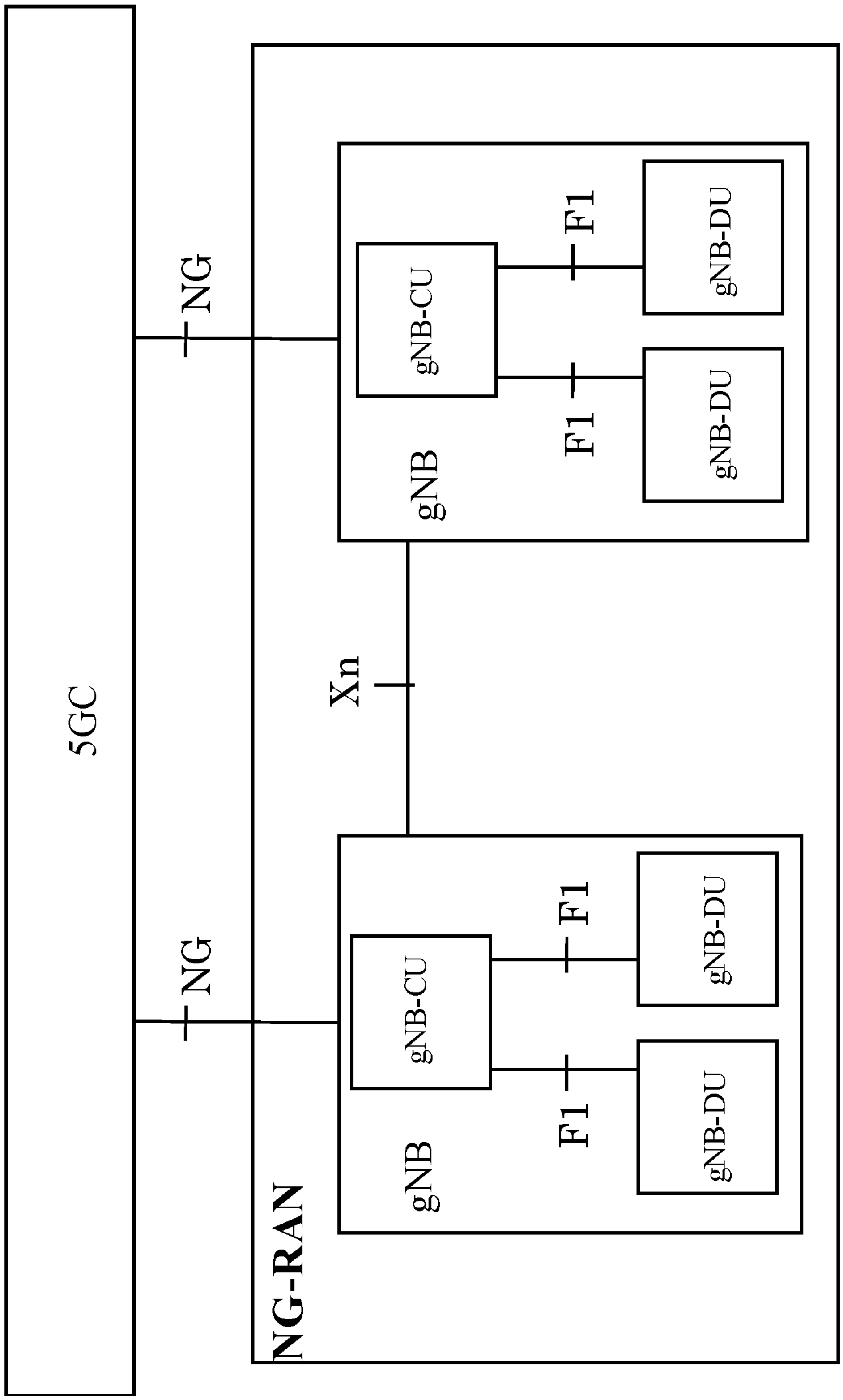
FIG. 1 is a block diagram of a 5G Radio Access Network (RAN) architecture.
Figure 2:
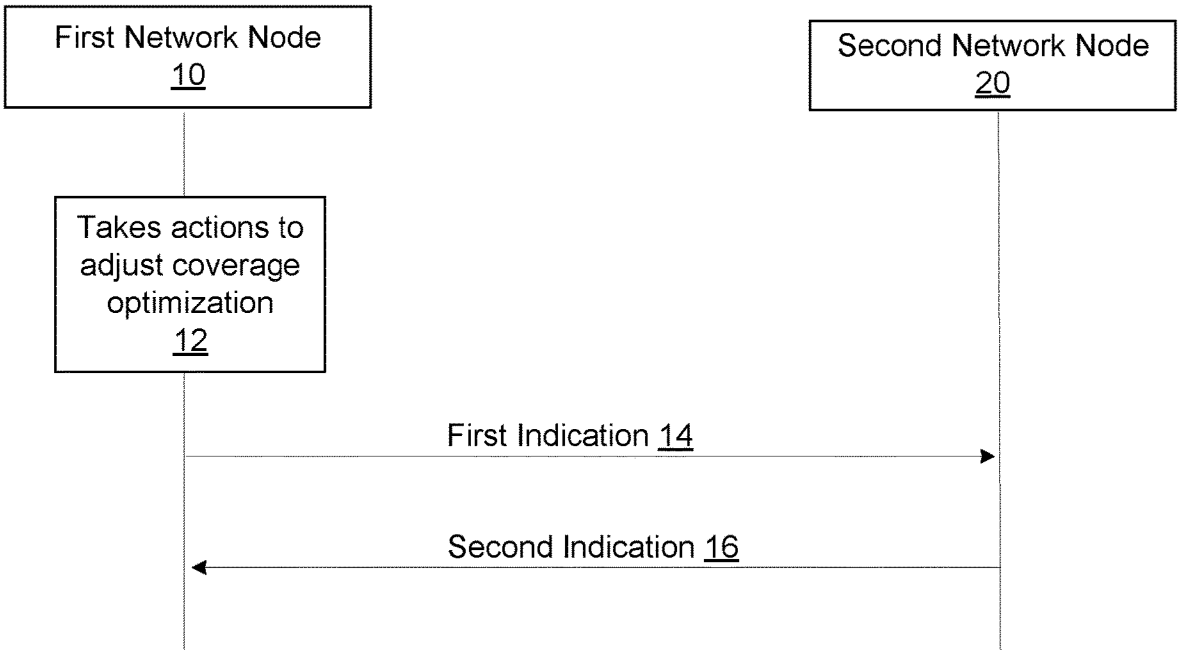
FIG. 2 is a call flow diagram for signaling between a first network node and a second network node according to some embodiments.

FIG. 2 illustrates an embodiment of a method for a first network node 10 and a second network node 20. Some embodiments provide signaling between two network nodes 10, 20 sharing a communication interface, such as an X2AP, an XnAP, or an F1AP interface to support coverage or capacity optimization by means of cell shaping when the coverage area of a serving radio cell is divided by one or more partitions, as defined, for instance, by the coverage area of reference signals beams transmitted by a network node (such as SSB beams or CSI-RS beams).

Some embodiments provide a method executed by a first network node 10 for optimizing the coverage area of reference signal (RS) beams. The method includes determining a new configuration for at least one serving cell of the first network node 10 by modifying the configuration of at least one RS beams of the serving cell, and transmitting a first indication 14 to at least a second network node 20 including a configuration update for one or more RS beams of at least a serving cell.

The method may additionally include signaling, as part of the first indication 14 to the second network node 20, of information concerning a possible configuration of the cells neighbouring the first network node cell, for which the configuration is subject to change. Such possible configuration may constitute a configuration that is considered by the first network node 10 as optimally matching the new configuration that the cell of the first network node 10 is adopting. For example, if the first network node 10 is applying a new shape to some or all of the beams in one of its serving cells, the first network node 10 may indicate to the second network node 20 the configuration considered optimal for the beam shapes of the cells neighbouring the first network node cell.

The method may additionally include receiving a second indication 16 from at least a second network node 20 including an acknowledgment of the first indication 14 and optionally including confirmation of whether the suggested configurations from the first network node 10, applicable to cells of the second network node 20, are included.

In one embodiment, the configuration update includes a list of cells and/or a list of RS beams for which the first network node 10 plans to use a modified configuration (e.g. at next reconfiguration), a list of cells and/or a list of RS beams replacing all or part of the configuration of the cells and/or RS beams for the first network node 10 indicated as to be modified, and/or a list of cells of a neighbouring node towards which the configuration information is signaled, with each cell in this list being associated with a suggested configuration that the transmitting node determined to be optimal in light of the configuration changes to the cells served by the transmitting node.

In yet another embodiment, a RAN node may receive the configuration update for one or more RS beams of one or more cells of a neighbouring cell and transmit that configuration update to another RAN node as a neighbour RAN node's configuration.

In some embodiments, an eNB may receive a configuration update including the capacity and coverage configuration of at least one or more beams of at least one or more cells of an en-gNB and transmit it to another en-gNB as CCO configuration of a neighbouring en-gNB.

In some embodiments, the first network node 10 modifies the configuration of at least one RS of one serving cell for coverage or capacity optimization.

In some embodiments, the new configuration of the RS beams of the radio cell is determined by modifying the shape of at least one RS beam of a radio cell, merging two or more RS beams of the radio cell into a new (single) RS beam, and/or splitting at least one RS beam of the radio cell into at least two new RS beams.

The RS types used for reconfiguring the first network node 10 may be either downlink RS such as Synchronization Signal Blocks (SSBs) beams or Channel State Information Reference signals (CSI-RSs) or uplink RS such as sounding reference signals (SRS).

The information may include information related to the RAN node configuration prior to and/or after the new configuration, associated to the serving cell itself and/or RS beams within the serving ell, such as a mapping between one or more serving cells prior to the reconfiguration and one or more serving cells after the reconfiguration, a list of cells for which the first network node 10 has modified the configuration of downlink (DL) RS beams, a mapping between one or more RS beams of a serving cell prior to the reconfiguration and one or more RS beams of a serving cell after the reconfiguration and/or a list of RS beams (such as SSB beams or CSI-RS beams) for which the first network node 10 has modified the configuration.

The information may include information signaled by the first network node 10 relative to the possible configuration to be adopted by the second, receiving, network node 20 and applicable to cells of the second network node 20 neighbouring those cells of the first network node 10 to which configuration changes were or will be applied.

Some embodiments provide a corresponding method executed by a second network node 20 for optimizing the coverage area of reference signal (RS) beams. The method includes receiving a first indication 14 from a first network node 10 including information associated to a configuration of the at least one serving cell or RS beams of the serving cell. The method further includes verifying if a modified neighbor cell list is needed based on the first indication 14, and updating the cell configuration information associated to the first network node 10.

The method of the second network node 20 may further include, upon reception from the first network node 10 of possible configurations for cells or beams of the second network node 20, evaluating whether such configurations are feasible and optimal. The method of the second network node 20 in this case may further include replying with a second indication 16 to the first network node 14, including an acknowledgement of adoption of the recommended configurations or with any new configuration applied to such cells or to any other served cell, and transmitting a second indication 16 to the first network node 10 including an acknowledgement of the information received with the first indication 14.

In another embodiment of the method, the second network node 20 identifies, by means of own collected measurements, key performance indicator (KPIs), performance counters and similar, a potential issue that needs to be better analyzed and addressed by the first network node 10. Such issue may be one or more of the following: (i) capacity issue: the issue may be associated with one or more cell or beam areas of the first network node 10 for which capacity issues are detected; (ii) coverage issue: the issue may be associated with one or more cell or beam areas of the first network node 10 for which capacity issues are detected; (iii) interference issue: the issue may be associated with one or more cell or beam areas of the first network node 10 for which capacity issues are detected.

Figure 3:
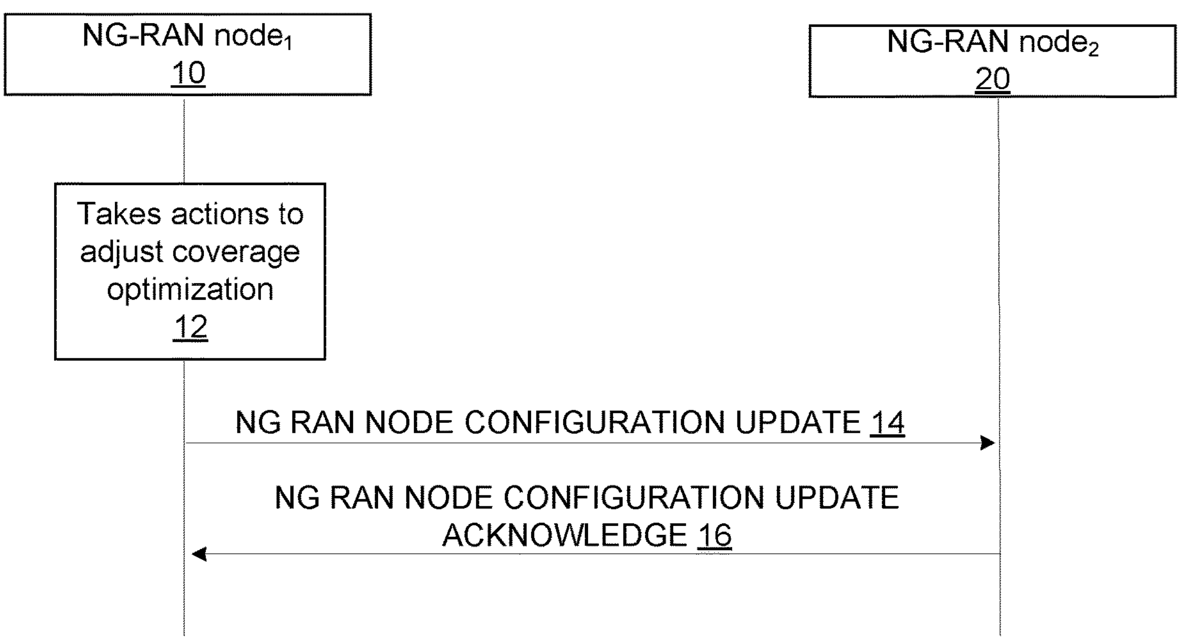
FIG. 3 is a call flow diagram for signaling between a first network node and a second network node, in the form of first and second NG-RAN nodes, according to some embodiments.

FIG. 3 shows an exemplifying case wherein the first and second network nodes 10, 20 are 3GPP gNBs, the first indication 14 includes an NG RAN NODE CONFIGURATION UPDATE message, and the second indication 16 includes an NG RAN NODE CONFIGURATION UPDATE ACKNOWLEDGE message.

Generally, some embodiments may provide efficient optimization of network coverage and capacity by adapting the RS beams (SSB beams or CSI-RS beams) by means of modifying the RS beam shapes, or merging or splitting the RS beams used to define coverage or capacity of the network cells. Some embodiments have the further advantage of enabling a better utilization of the radio resources in the network, thereby resulting in improved spectral efficiency and network performance.

Figure 4:
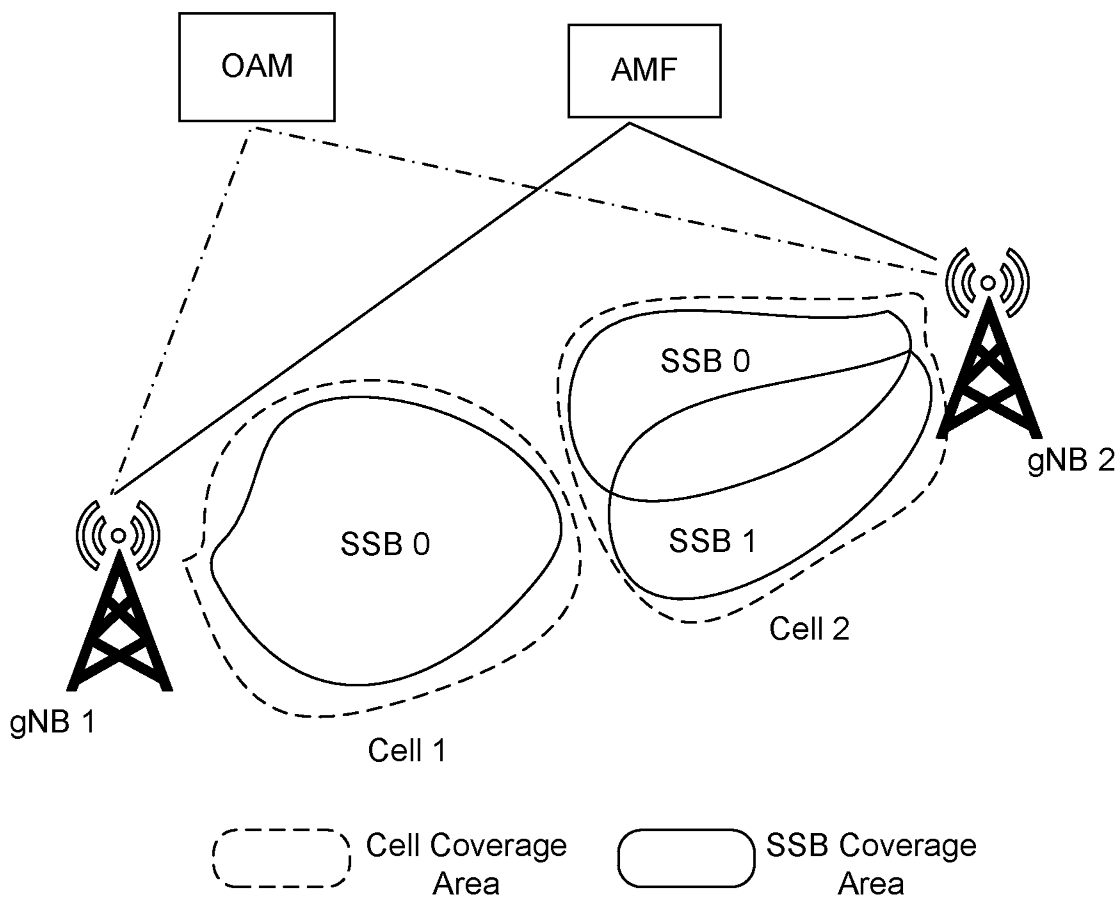
FIG. 4 is an illustration of cell coverage area for NG-RAN cells defined based on the coverage area of the corresponding SSB beams, according to some embodiments.

Consider now a scenario wherein the coverage and/or capacity of a radio cell controlled by a first network node 10 is defined by the coverage area of one or more reference signal (RS) beams. FIG. 4 is an illustration of cell coverage area for NG-RAN cells defined based on the coverage area of the corresponding SSB beams.

In an NG-RAN system, for instance, the downlink coverage or capacity of a cell is determined by the envelop of one or more downlink RS beams, such as Synchronization Signal Blocks (SSBs) beams or Channel State Information Reference signals (CSI-RSs) beams, as illustrated in FIG. 4. FIG. 4 shows two gNBs 1 and 2, each of which is connected to an Access and Mobility Function (AMF) and an Operations and Maintenance (OAM) node. In this example, gNB 1 transmits a single SSB beam in Cell 1 (i.e., SSB 0), thereby the coverage area of cell 1 coincides with the coverage area of SSB 0. On the other hand, gNB 2 transmits two SSB beams in Cell 2 (i.e., SSB 0 and SSB 1), thereby the coverage area of cell 2 is determined by the envelop of the coverage area of the SSB 0 and SSB 1 transmitted in Cell 2.

In this and other scenarios, some embodiments provide a method executed by a first network node 10 for capacity and coverage optimization (CCO). The method includes determining a new configuration for at least one serving cell of the first network node 10 by modifying the configuration of at least one RS beams of the serving cell, and transmitting a first indication 14 to at least a second network node 20 comprising a configuration update for one or more RS beams of at least a serving cells.

In one embodiment, in case of a capacity and coverage optimization (CCO) issue in at least a radio cell, the first network node 10 may resolve the CCO issue for a serving cell by determining a reconfiguration of the reference signal beams of the serving cell.

Figure 5:
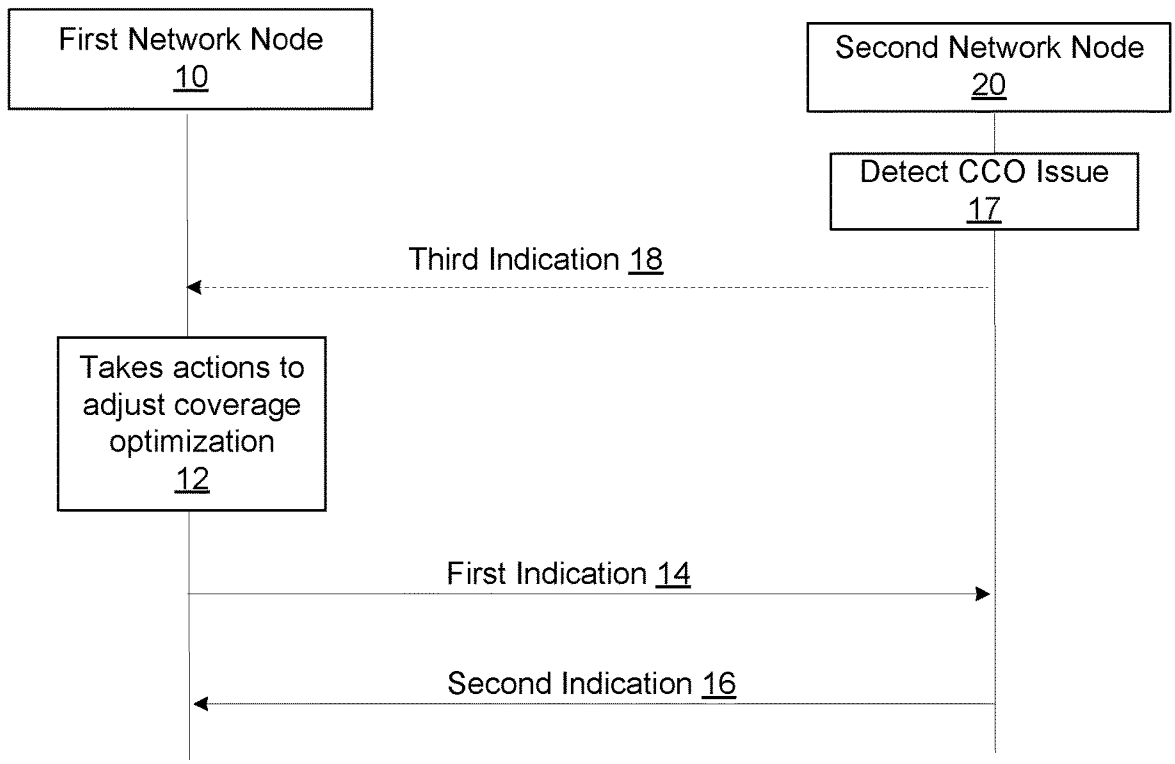
FIG. 5 is an illustration of embodiment wherein a first network node receives an indication of a CCO issue from the second network node, according to some embodiments.

FIG. 5 is an illustration of embodiment wherein the first network node 10 receives an indication of a CCO issue from the second network node 20. In particular, in one embodiment, illustrated in FIG. 5, the method executed by the first network node 10 may additionally include receiving a third indication 18 from the second network node 20 indicating the existence of a potential CCO issue with one or more serving cells of the first network node 10. The second network node 20 may for example send this third indication 18 upon detecting a CCO issue (Block 17).

The indicated CCO issue may be one or a combination of the following: (i) capacity issue, where the issue may be associated with one or more cell or beam areas of the first network node 10 for which capacity issues are detected; (ii) coverage issue, where the issue may be associated with one or more cell or beam areas of the first network node 10 for which coverage issues are detected; (iii) interference issue, where the issue may be associated with one or more cell or beam areas of the first network node 10 for which interference issues are detected, (iv) uplink/downlink imbalance, where the issue may be associated with the imbalance of coverage between uplink and downlink coverage of ore or more cell or beam areas of the first network node 10 for which the imbalance issues are detected.

Based on the third indication 18, the first network node 10 may take an action to resolve the indicated CCO issue, e.g., by taking actions to adjust coverage optimization 12. In one example, the first network node 10 determines a new configuration for at least one serving cell of the first network node 10 by modifying the configuration of at least one RS beams of the serving cell. The first network node 10 may thereafter send the first indication 14 to the second network node 20 and receive the second indication 16 from the second network node 20, as described above.

Figure 6:
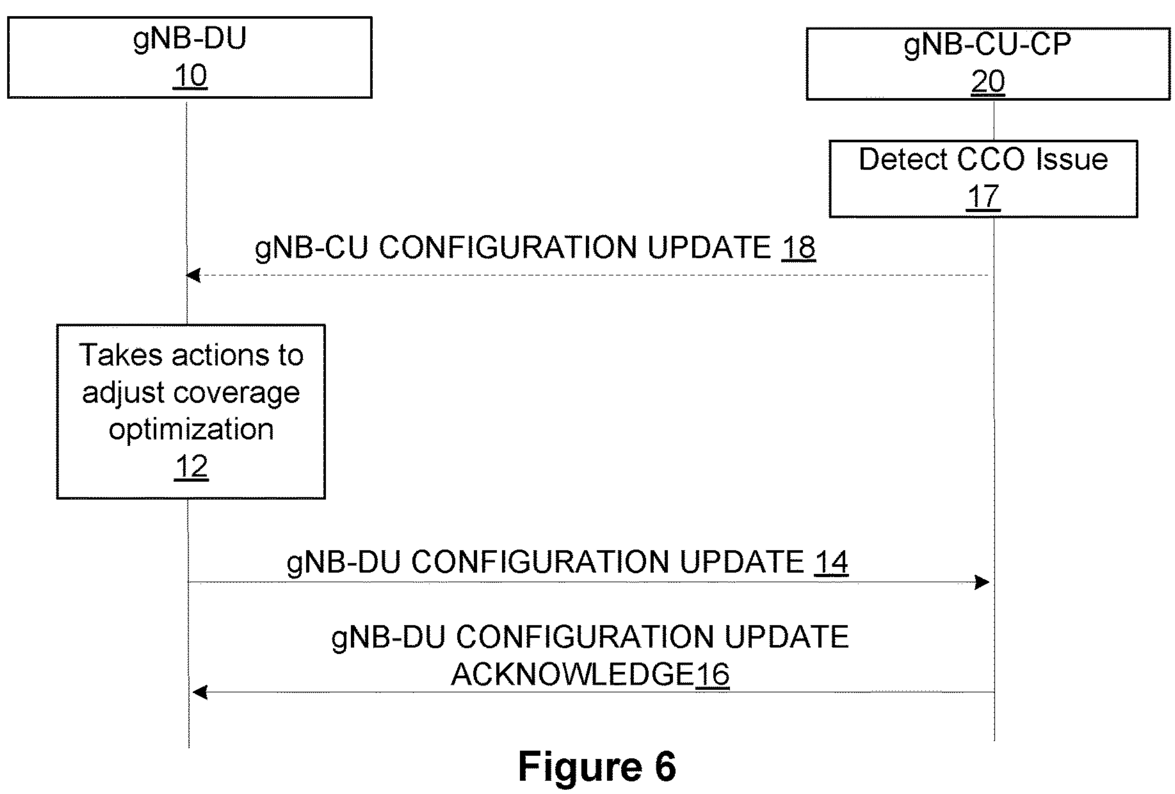
FIG. 6 is an illustration of an embodiment wherein a gNB-DU receives an indication of a CCO issue from a gNB-CU over an F1AP interface, according to some embodiments.

For instance, in case of a 3GPP NG-RAN system with split architecture, FIG. 6 shows one example where the first network node 10 is a gNB-DU and the second network node 20 is a gNB-CU-CP. FIG. 6 is an illustration of an embodiment wherein a gNB-DU 10 receives an indication of a CCO issue from a gNB-CU-CP 20 over an F1AP interface, e.g., as sent by the gNB-CU-CP upon detecting the CCO issue (Block 17). Based on the indicated CCO issue, the gNB-DU 10 determines a new configuration for at least one serving cell of the gNB-DU 10 by modifying the configuration of at least one RS beams of the serving cell and indicating such configuration to the gNB-CU-CP 20.

In this case, illustrated in FIG. 6, the gNB-DU 10 receives from gNB-CU-CP 20 over the F1AP an indication 18, comprising a gNB-CU CONFIGURATION UPDATE message, indicating the existence of a potential CCO issue with one or more serving cells of the gNB-DU 10. The gNB-DU 10 takes action to resolve the CCO issue 12, for instance, by determining a new configuration for at least one serving cell of the gNB-DU 10 by modifying the configuration of at least one RS beams of the serving cell and transmitting a first indication 14 comprising a gNB-DU CONFIGURATION UPDATE message with information associated to the new configuration for the at least one serving cell or RS beams of the serving cell.

In some embodiments, the gNB-DU 10 sends a gNB-DU CONFIGURATION UPDATE ACKNOWLEDGE message 16 to the gNB-CU-CP 20.

Additionally, in the example of FIG. 6 and in other examples, the first network node 10 can determine what are the changes needed in the cells of the second network node 20 that are neighbouring the one or more cells in the first network node 10 to which configuration changes were applied.

In one embodiment, every configuration of a beam area or of a cell can be associated to an index. Once a RAN node is aware of the index that corresponds to a given cell/beam configuration, the RAN node can learn with time (thanks to measurements, key performance indicators (KPIs), statistics etc.) which of the indexed configurations of a neighbour cell and beams performs best with a given configuration of a serving cell. Thanks to this mechanism the first network node 10 is able to suggest to the second network node 20 what is the optimal configuration to be adopted for cells/beams at the second network node 20, in light of configuration changes at cells in the first network node 10.

Note that, in one embodiment, the first network node 10 determines a new configuration for downlink Synchronization Signal Blocks (SSBs) beams, such as those defined for an NG-RAN system. In this case, RS beams are identified by an SSB index. Thereby, the first network node 10 may determine a new configuration of an SSB signal by modifying the list of SSB indexes transmitted in the serving cell.

In another embodiment, the first network node 10 determines a new configuration for downlink Channel State Information Reference signals (CSI-RSs), such as those defined for an NG-RAN system or an LTE-A system.

Consider now a CCO Solution via RS Beams Splitting.

In some embodiments for CCO via RS beam splitting, the first network node 10 resolves a CCO issue for at least one serving cell or at least a RS beam within a serving cell by determining a new configuration comprising one or more of: (i) information splitting the serving cell into two or more cell partitions or new serving cells; and (ii) information splitting the RS beam into two or more RS partitions.

In some embodiments, the configuration information related to splitting either a serving cell or a RS within a serving cell determines a split of the coverage are of the serving cell or the RS within the serving cell into two or more partitions. Such partitions could correspond to the coverage area of one or more new serving cells and/or one or more new RS beams.

Splitting Example 1: Cell Split by SSB Beams Splitting and PCI Reconfiguration In one embodiment, the first network node 10 splits a serving cell, configured with one or more RS beams defining the cell's coverage area, into two or more new cells, each configured with one or more new RS beams defining the coverage area of each new cell. In this case, the first network node 10 configures each new cell and the associated RS beams with a new cell identity.

Figure 7:
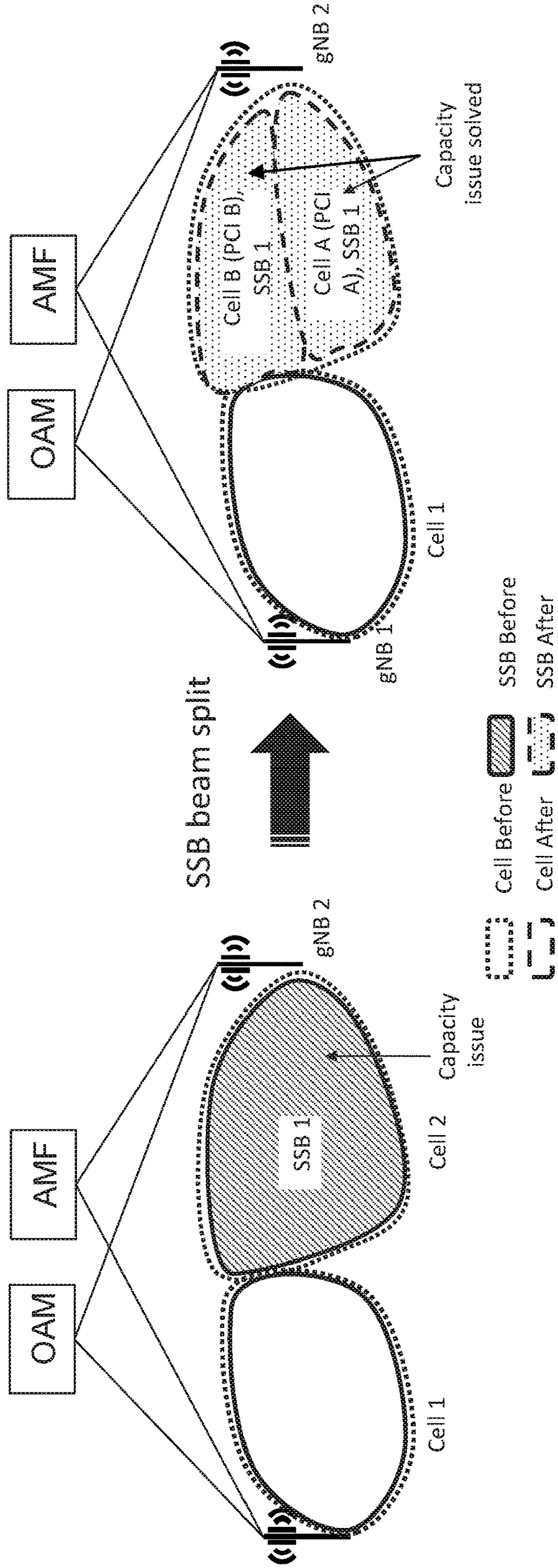
FIG. 7 is an example of a serving cell defined by a single SSB beam which is split into two SSB beams to create two new cells, according to some embodiments.

In some embodiments, the first network node 10 determines a split of a serving cell defined by a single RS beam into two or more serving cells, each configured with one or more RS beams, wherein the RS beams associated to each new cell are configured with a different physical cell identity (PCI). FIG. 7 is an example of a serving cell (gNB 2's Cell 2) defined by a single SSB beam (left part of the figure, SSB 1) which is split into two SSB beams to create two new cells (Cell A and Cell B, in the right part of the figure). Each new cell is identified by a different physical cell identity (PCI), namely PCI A and PCI B, respectively. In this case, the SSB index used in each cell can either be the same (as in this figure, i.e. SSB 1) or different.

More particularly, as shown in FIG. 7, gNB 1 and gNB 2 are associated with the same AMF and OAM. gNB 1 serves cell 1 whereas gNB 2 serves cell 2. As shown in the left part of the figure, cell 2 is initially defined by a single RS beam, in the form of a single SSB beam. However, cell 2 has a capacity issue. In order to solve that capacity issue, as shown in the right part of the figure, the single SSB beam's configuration is modified such that the single SSB beam defining cell 2 is split into two SSB beams to create two new cells. Specifically, the single SSB beam is split into two SSB beams that define two new cells, Cell A identified by PCI A and Cell B identified by PCI B. Not here, though, that while the SSB beam is split into two SSB beams corresponding to the new cells, the two new SSB beams in this example still use the same SSB index, namely SSB 1.

FIG. 7 thereby shows an example where the first network node 10 determines a new configuration that splits a serving cell defined by a single SSB beam (SSB 1) into two new cells, with each new cell being configured with a single SSB beam and a different PCI.

In this case, the same SSB index or different SSB indexes could be configured for the SSB of the new cells. Each of the two SSB beams created by the first network node 10 defines a new serving cell whose coverage area coincides with the coverage area of the corresponding SSB index.

Vice-versa, the example applies to an arbitrary number of SSB beams within a cell of the first network node 10 being split into two or multiple SSB beams.

Splitting Example 2: Cell Split Via SSB Beams Reconfiguration With Different PCI In one embodiment, the first network node 10 splits a serving cell configured with two or more RS beams into two or more new cells by changing the configuration of at least a RS beam with a new cell identity (e.g., a new PCI).

Figure 8:
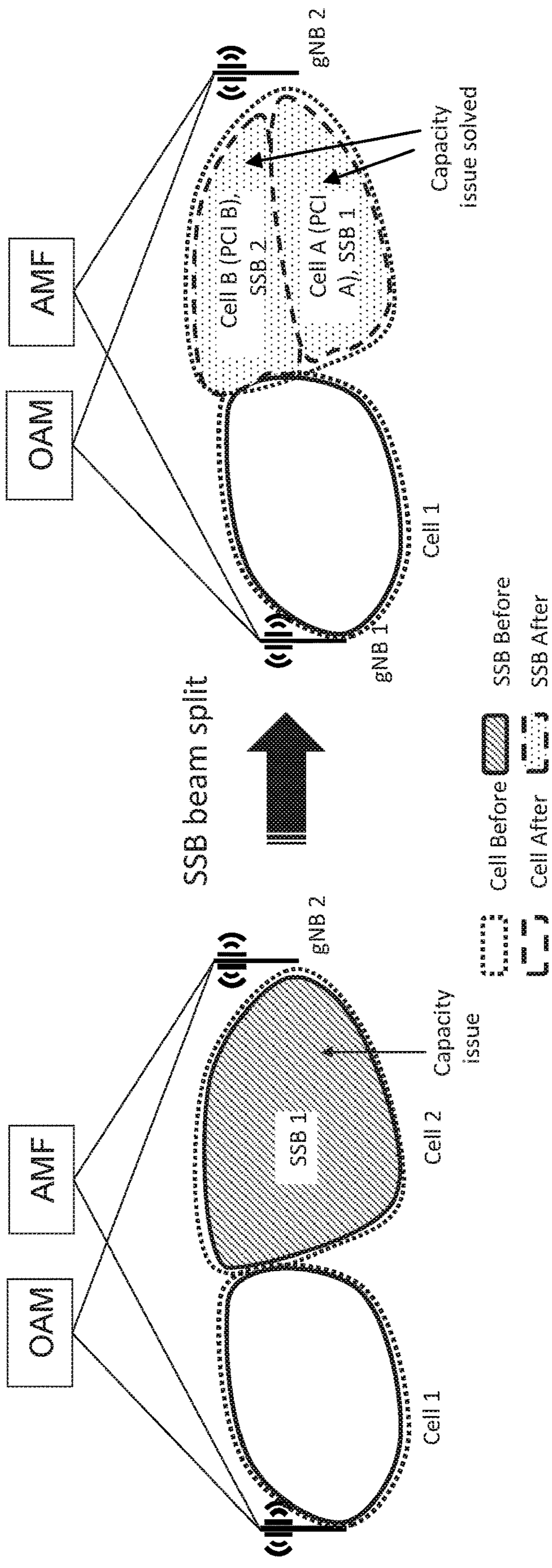
FIG. 8 is an example of cell split via reconfiguration of SSB beams with new PCI.

FIG. 8 is an example of cell split via reconfiguration of SSB beams with new PCI. In one exemplifying case, illustrated in FIG. 8, the first network node 10 splits the coverage area of a serving cell A (defined by a PCI A) configured with two (or more) SSB beams with different SSB indexes, e.g. SSB 1 and SSB 2, into two cells, e.g. cell A and cell B, by determining a new PCI configuration for the original SSB beams. In this example, the first network node 10 reconfigures the SSB beams so that PCI number A is used in SSB beam 1 and PCI number B is used in SSB beam 2. In this way, the coverage area of each new cell is determined by the coverage area of one (or more) SSB beam. Furthermore, the first network node 10 may reconfigure the SSB beams by additionally changing their SSB beam index (not showed in FIG. 8), without changing the outcome.

More particularly, as shown in FIG. 8, gNB 1 and gNB 2 are associated with the same AMF and OAM. gNB 1 serves cell 1 whereas gNB 2 serves cell 2. As shown in the left part of the figure, cell 2 is initially defined by a single RS beam, in the form of a single SSB beam. However, cell 2 has a capacity issue. In order to solve that capacity issue, as shown in the right part of the figure, the single SSB beam's configuration is modified such that the single SSB beam defining cell 2 is split into two SSB beams to create two new cells. Specifically, the single SSB beam is split into two SSB beams that define two new cells, Cell A identified by PCI A and Cell B identified by PCI B. Not here that, contrasted with FIG. 7, the two new SSB beams in this example use different SSB indices, namely SSB 1 and SSB 2.

Splitting Example 3: SSB Beams Splitting by Reconfiguration SSB Index (Keep Cell PCI)

In an embodiment, the first network node 10 splits the coverage area of a serving cell defined by one or more RS beams by determining a new configuration of the RS beams without changing the cell identity.

Figure 9:
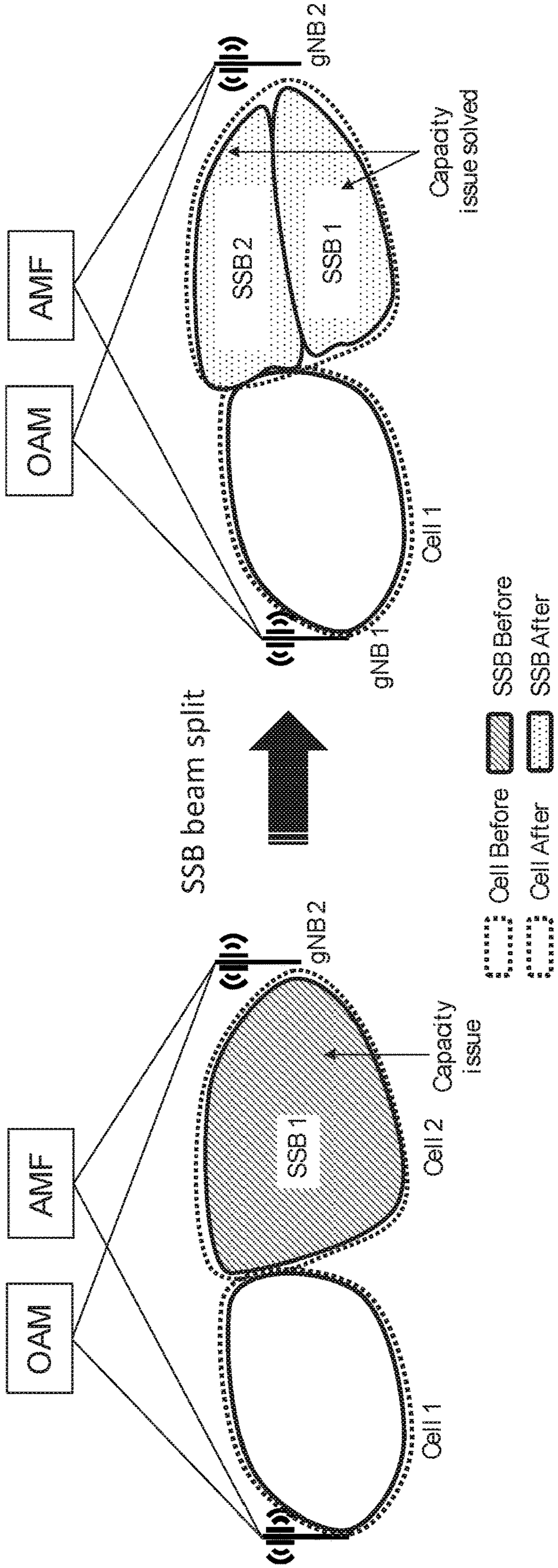
FIG. 9 is an example of a serving cell defined by a single SSB beam which is split into two SSB beams to create two virtual cells characterized by the same physical cell identity (PCI) but identified by different SSB indexes, according to some embodiments.

FIG. 9 is an example of a serving cell defined by a single SSB beam (left figure) which is split into two SSB beams to create two virtual cells characterized by the same physical cell identity (PCI) but identified by different SSB indexes (e.g., SSB 1 and SSB 2).

In one exemplifying case, illustrated in FIG. 9, the serving cell coverage area is defined by a single SSB beam (SSB 1) and the first network node 10 splits the serving cell (Cell 2) by determining a new configuration of the RS that splits original SSB beam (SSB 1) into multiple SSB beams (SSB 1 and SSB 2), each SSB beam being configured with the same physical cell identity (PCI) and a different SSB index.

In this case, each of the new SSB beams created by the first network node 10 defines a virtual cell identified by the SSB index, whose coverage area coincides with the coverage area of the corresponding SSB index. The overall serving cell coverage area, however, is defined by the envelop of the coverage area of the two virtual cells/SSB beams coverage areas.

More particularly, then, as shown in FIG. 9, gNB 1 and gNB 2 are associated with the same AMF and OAM. gNB 1 serves cell 1 whereas gNB 2 serves cell 2. As shown in the left part of the figure, cell 2 is initially defined by a single RS beam, in the form of a single SSB beam with SSB index 1. However, cell 2 has a capacity issue. In order to solve that capacity issue, as shown in the right part of the figure, the single SSB beam's configuration is modified such that the single SSB beam defining cell 2 is split into two SSB beams, identified by different SSB indices 1 and 2, to create two virtual cells characterized by the same PCI. Specifically, the single SSB beam is split into two SSB beams, with indices SSB 1 and SSB 2, that define respective virtual cells identified by the same PCI.

Example 4: CSI-RS Beam Under SSB Beam Split into Multiple CSI-RS Beams

Figure 10:
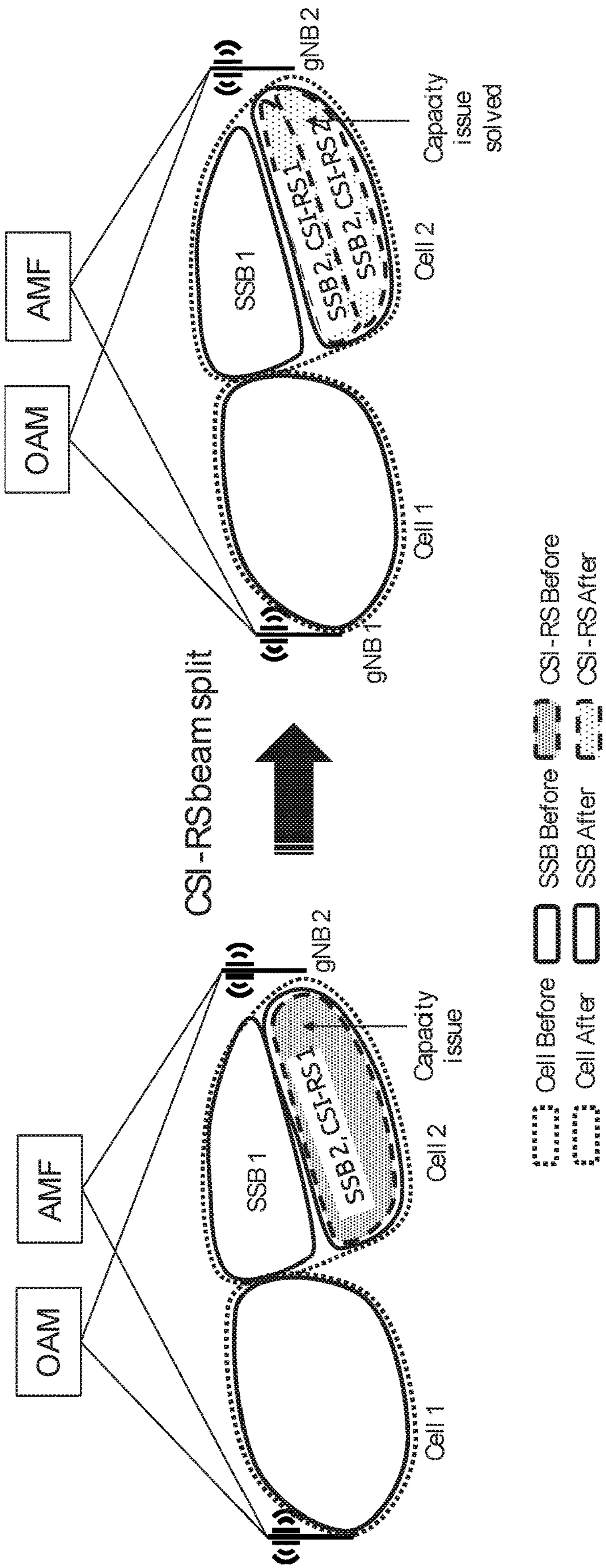
FIG. 10 is an example of an embodiment where the first network node determines a new configuration for CSI-RS beam located under the coverage area of an SSB, according to some embodiments.

In an embodiment, the first network node 10 determines a configuration that splits a first RS beam, located under the coverage area of a second RS beam, into two or more new RS-beams. FIG. 10 is an example of an embodiment where the first network node 10 determines a new configuration for CSI-RS beam located under the coverage area of an SSB. The new configuration splits the CSI-RS beam into two new CSI-RS beams.

FIG. 10 shows one example where a gNB 1 and gNB 2 are associated with the same AMF and OAM. gNB 1 serves cell 1 whereas gNB 2 serves cell 2. As shown in the left part of the figure, cell 2 is initially defined by two SSB beams with respective SSB indices 1 and 2. A CSI-RS beam with CSI-RS beam index 1 is located under the coverage area of the SSB with SSB index 2. The CSI-RS beam could, for instance, be explicitly associated to the SSB beam with SSB index 2. However, the CSI-RS beam has a capacity issue. In order to solve that capacity issue, as shown in the right part of the figure, the first network node 10 determines a new configuration for the CSI-RS beam with CSI-RS beam index 1 located under the coverage area of SSB 2. The new configuration splits the CSI-RS beam with CSI-RS beam index 1 into two new CSI-RS beams (CSI-RS 1 and CSI-RS 2). In this example, the new configuration results in two new CSI-RS beams whose coverage area remains within the coverage area of the SSB beam (SSB 2). Thereby the new configuration may associate, implicitly or explicitly, new CSI-RS beams to the original SSB beam. In an alternative solution, the new configuration may result into two new CSI-RS beams whose coverage area falls within the coverage area of two different SSB beams. Thereby, the new configuration may associate, explicitly or implicitly, the new CSI-RS beams to different SSB beams.

Consider now a CCO Solution via RS beams merging.

In some embodiments for CCO via RS beams merging, the first network node 10 resolves a CCO issue for at least one serving cell or at least a RS beam within a serving cell by determining a new configuration comprising one or more in the group of: (i) information merging the serving cell with at least another cell into a new serving cell; (ii) information merging the RS beam with at least one more RS beam into a new RS beam or into a new serving cell.

Figure 11:
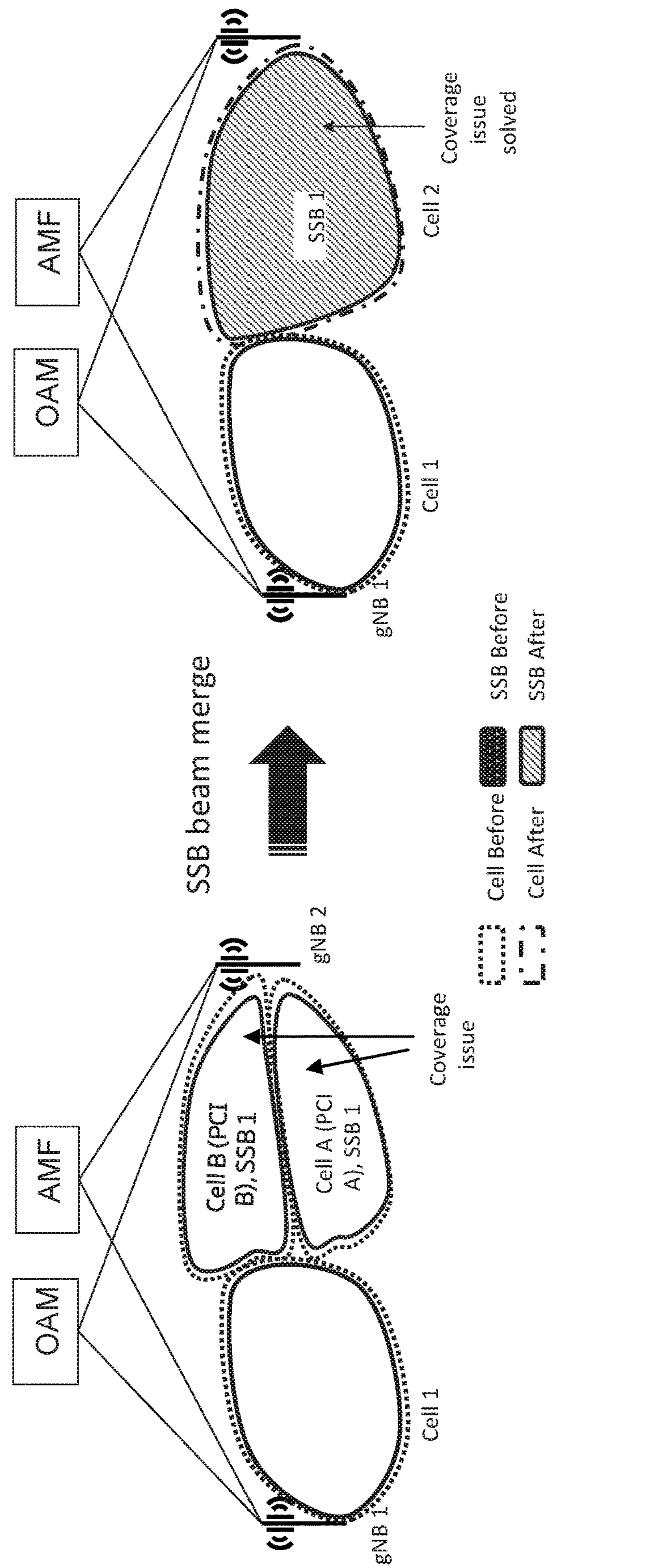
FIG. 11 is an example of first network node merging two cells, each defined by the coverage area of a single SSB beam, into a new cell whose coverage area is also defined by a single SSB beam, according to some embodiments.

Merging Example 1: Two or More Cells Defined by SSB Beams Merged into a Single Cell In one exemplifying case, the first network node 10 merges two or more cells, each configured with one or more RB beams defining the coverage area of each cell, into a new cell configured with one or more new RS beams defining the coverage area of the new cell. FIG. 11 is an example of first network node 10 merging two cells (Cell A and Cell B), each defined by the coverage area of a single SSB beam (SSB 1), into a new cell (Cell 2) whose coverage area is also defined by a single SSB beam (SSB 1).

FIG. 11 illustrates an example wherein the first network node 10 determines a new configuration that merges two cells, each defined by the coverage area of a single SSB beam, into a new cell whose coverage area is also defined by a single SSB beam.

More particularly, then, as shown in FIG. 11, gNB 1 and gNB 2 are associated with the same AMF and OAM. gNB 1 serves cell 1 whereas gNB 2 serves cells A and B that are identified by respective PCIs A and B. As shown in the left part of the figure, cells A and B are initially defined by two respective RS beams, in the form of two SSB beam with the same SSB index 1. However, cells A and B each has a coverage issue. In order to solve that coverage issue, as shown in the right part of the figure, the configurations of the SSB beams are modified such that the two SSB beams are merged into a single SSB beam, identified by the same SSB index 1, to create a single new cell 2

Figure 12:
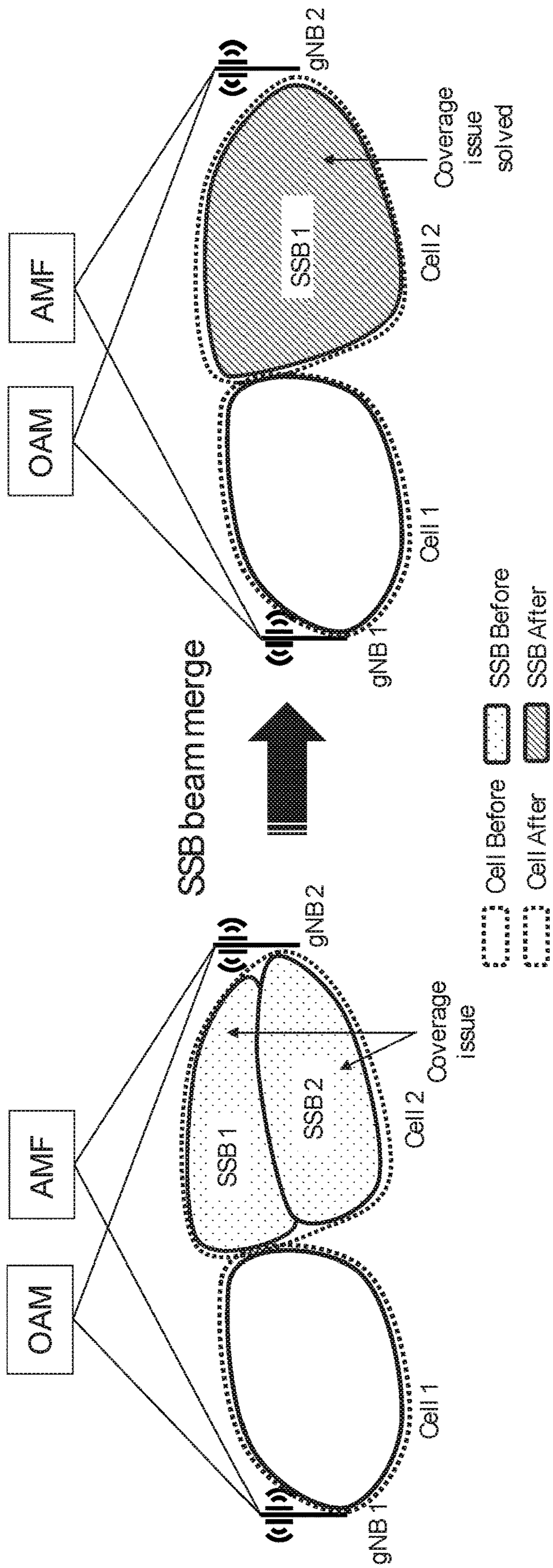
FIG. 12 is an example of first network node merging two SSB beams located under the coverage area of a serving cell, into a single SSB beam, according to some embodiments.

Example 2: Two or More SSB Beams within a Cell Merged into a Single SSB Beam In another exemplifying case, the first network node 10 merges two or more RS beam located within the coverage area of a serving cell or within the coverage area of another RS beam, into a RS beam without changing the configuration of the cell identity. FIG. 12 is an example of first network node 10 merging two SSB beams (SSB 1 and SSB 2) located under the coverage area of a serving cell (Cell 2), into a single SSB beam (SSB 1). In this case, the coverage area of the serving cell (Cell 2) is originally defined by the envelop of the coverage areas of the two original SSB beams (SSB 1 and SSB 2), and then defined by the coverage area of the new SSB beam (SSB 1) after the merging.

More particularly, as shown in FIG. 12, gNB 1 and gNB 2 are associated with the same AMF and OAM. gNB 1 serves cell 1 whereas gNB 2 serves cell 2. As shown in the left part of the figure, cell 2 is initially defined by two RS beams, in the form of two SSB beam with respective SSB beam indices 1 and 2. However, cell 2 has a coverage issue. In order to solve that coverage issue, as shown in the right part of the figure, the configurations of the SSB beams are modified such that the two SSB beams are merged into a single SSB beam, identified by the same SSB index 1, for cell 2.

FIG. 12 thereby illustrates an example wherein the first network node 10 determines a new configuration that merges two SSB beams (namely SSB 1 and SSB 2) into a new SSB beam within a serving cell (i.e., SSB 1). In this example, the coverage area of the serving cell is initially defined by the envelop of the coverage area of the two original SSB beams (SSB 1 and SSB 2). After the new configuration is applied to the cell, the coverage area of the cell is defined by the coverage area of the new SSB 1 only.

Figure 13:
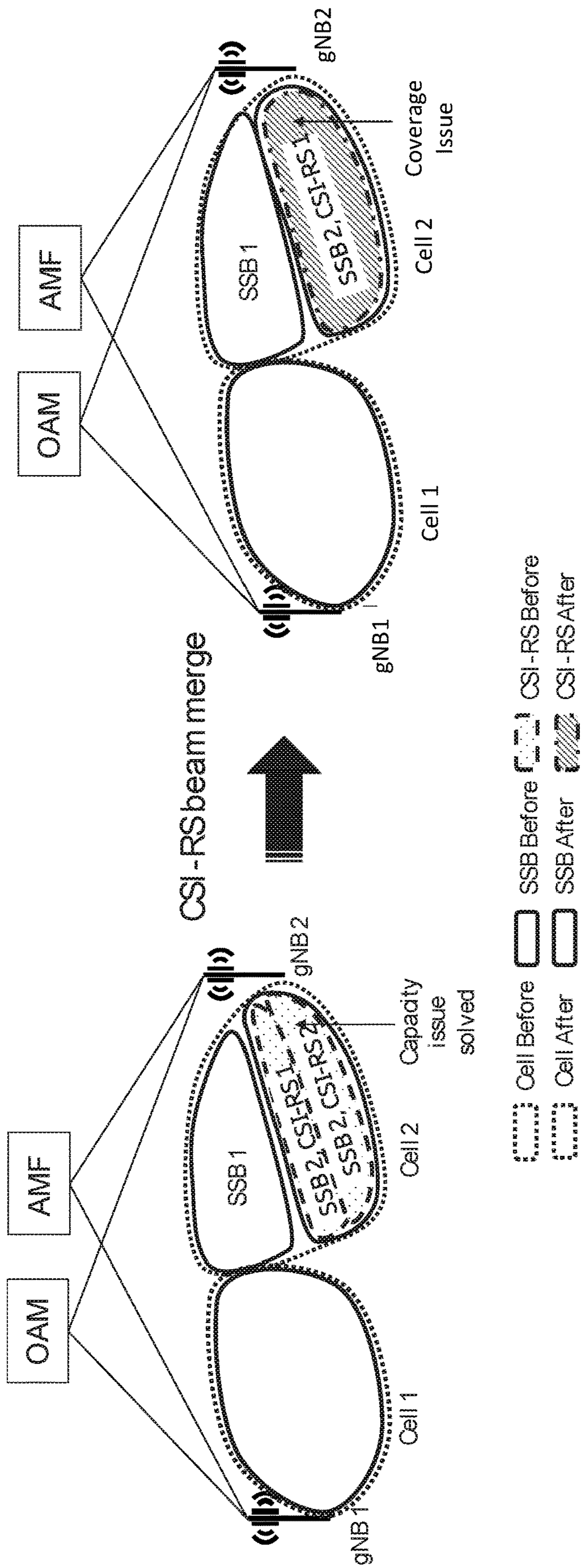
FIG. 13 is an example of first network node merging two SSB beams located under the coverage area of a serving cell, into a single SSB beam, according to some embodiments.

Example 3: Multiple CSI-RS Beams Under Coverage of an SSB Beam Merged into One CSI-RS Beams In an embodiment, the first network node 10 determines a configuration that merges a first RS beam and a second RS beam into a single new RS beam, wherein the first and the second RS beams may be located under the coverage area of at least a third RS beam. FIG. 13 is an example of first network node 10 merging two SSB beams located under the coverage area of a serving cell, into a single SSB beam. In this case, the coverage area of the serving cell is originally defined by the envelop of the coverage areas of the two original SSB beams, and then defined by the coverage area of the new SSB beam after the merging.

More particularly, as shown in FIG. 13, gNB 1 and gNB 2 are associated with the same AMF and OAM. gNB 1 serves cell 1 whereas gNB 2 serves cell 2. As shown in the left part of the figure, cell 2 is initially defined by three RS beams, in the form of three SSB beams. One SSB beam with index 1 is defined for one virtual cell, whereas two other SSM beams with SSB index 2 are defined for another virtual cell. Each SSB beam with SSB index 2 has a respective CSI-RS beam defined within the SSB beam's coverage, namely CSI-RS beam 1 and CSI-RS beam 2. However, SSB 2 and/or CSI-RS 2 has a capacity issue. In order to solve that capacity issue, as shown in the right part of the figure, the configurations of the CSI-RS beams 1 and 2 are modified such that the two CSI-RS beams are merged into a single CSI-RS beam, identified by the same SSB index 2 and CSI-RS index 1.

In one exemplifying case, illustrated in FIG. 13, the first network node 10 determines a new configuration for two CSI-RS beams (namely, CSI-RS 1 and CSI-RS 2) located under the coverage area of an SSB beam (namely SSB 2). More generally, the two initial CSI-RS beams could be associated with or located under the coverage area of different SSB beams. The new configuration merges the CSI-RS beams into a (single) new CSI-RS beam (namely, CSI-RS 1). In this example, the new configuration results into a new CSI-RS beam whose coverage area remains within the coverage area of the SSB beam to whom the initial CSI-RS beams were associated. Thereby the new configuration may associate, implicitly or explicitly, new CSI-RS beam(s) to the original SSB beam. In an alternative solution, the new configuration may result into a new CSI-RS beam whose coverage area falls within the coverage area of a different SSB beam. Thereby, the new configuration may associate, explicitly or implicitly, the new CSI-RS beam to different SSB beams.

Consider now a CCO solution via RS beam shaping.

In some embodiments for CCO via RS beam shaping, the first network node 10 resolves a CCO issue determining a new shape of at least one or more RS beam (such as an SSB beam or a CSI-RS beam) of a radio cell. The indication of the modified configuration may be associated to an index (such as a "SSB coverage state index" or "CSI-RS beam Coverage State Index") that the first network node 10 transmits to the second network node 20.

Consider now embodiments concerning Cell Reconfiguration Information.

In some embodiments concerning cell reconfiguration information, the first indication 14 transmitted by the first network node 10 to the second network node 20 may comprise a modification of the first network node's configuration executed for a list of cells of the first network node 10 or in a list of RS associated to one or more cells of the first network node 10 (such as SSB and/or CSI-RS reference signals within the coverage area of a cell of the first network node 10) or associated to other RS transmitted by the first network node 10 (such as CSI-RS beams under the coverage area of a SSB beam of the first network node 10).

Note that, in some embodiments, the first network node 10 determines a modification of the configuration of a cell or RS beams within a cell (such as SSB beams and CSI-RS beams) by modifying any of the configuration parameters associated to the cell or to the RS beams, respectively, such as the identity of the cell or RS beams and parameters that modify the coverage or capacity of the cell or RS beams.

In one embodiment, the information associated to the first network node configuration may include information related to the first network node configuration prior to the new configuration for one or more of: (i) a list of cells of the first network node 10 with modified configuration; (ii) a list of SSB beams with modified configuration associated to at least one cell of the first network node 10; (iii) a list of CSI-RS beams with modified configuration associated to at least one cell or to at least one SSB beam within a cell of the first network node 10; (iv) one or more information in the group of: a mapping between a serving cell and at least one RS beam, and a mapping between a first RS beam and at least a second RS beam.

The information may include information related to the first network node configuration after the new configuration for one or more in the group of: (i) a list of cells of the first network node 10 with modified configuration; (ii) a list of SSB beams with modified configuration associated to at least one cell of the first network node 10; (iii) a list of CSI-RS beams with modified configuration associated to at least one cell or to at least one SSB beam within a cell of the first network node 10; (iv) one or more information in the group of: a mapping between a serving cell and at least one RS beam, and a mapping between a first RS beam and at least a second RS beam.

In some embodiments, the first indication 14 comprises a "NG-RAN NODE CONFIGURATION UPDATE" XnAP message indicating information associated to the RAN node configuration prior to the modification of the (cell and) RS beams configuration and information associated to the first network node configuration after the modification of the (cell and) RS beams configuration.

In some embodiments, the first network node 10 indicates to the second network node 20 reconfiguration information for a first list of cells of the first network node 10, e.g., the Coverage Modification List. The reconfiguration information may include, for each cell in the first list of cells, information associated to the cell configuration prior to the modification of the (cell and) RS beams. The information associated to the cell configuration prior to the modification of the (cell and) RS may include one or more of the following types of information.

The information associated to the cell configuration prior to the modification of the (cell and) RS may include a cell identity.

Alternatively or additionally, the information associated to the cell configuration prior to the modification of the (cell and) RS may include a first index, the "Cell Coverage State Index", indicating the coverage configuration of the cell. For instance, different values of the first index could indicate different configurations of the cell, such as whether the cell is active or inactive, different cell coverage configuration, etc.

Alternatively or additionally, the information associated to the cell configuration prior to the modification of the (cell and) RS may include a first list of SSB beams with modified configuration. The first list may indicate, for each SSB in the list: (i) an identity of the SSB beam (such as SSB index); (ii) a second index, "SSB beam Coverage State Index" indicating the coverage configuration of the SSB beam, where, for instance, different values of the second index could indicate different configurations of the SSB beam, such as whether the SSB beam is active or inactive, different SSB coverage configuration, etc.; (iii) a first list of CSI-RS beams with modified configuration indicating, for each CSI-RS in the list: (a) an identity of the CSI-RS (such as a CSI-RS index); (b) a third index, the "CSI-RS beam Coverage State Index", indicating the coverage of the CSI-RS beam, where, for instance, different values of the third index could indicate different configurations of the CSI-RS beam, such as whether the CSI-RS beam is active or inactive, different CSI-RS beam coverage configuration, etc.; (iv) a second list of CSI-RS beams with modified configuration indicating, for each CSI-RS in the list: (a) an identity of the CSI-RS (such as a CSI-RS index); (b) a fourth index, the "CSI-RS beam Coverage State Index", indicating the coverage of the CSI-RS beam, where, for instance, different values of the fourth index could indicate different configurations of the CSI-RS beam, such as whether the CSI-RS beam is active or inactive, different CSI-RS beam coverage configuration, etc.

The reconfiguration information may alternatively or additionally include, for each cell in the first list of cells, information associated to the cell configuration after the modification of the (cell and) RS beams, i.e., a "Replacing Info" information element. For example, the information may include, for each cell in the first list of cells, one or more of the following types of information.

The information may include, for each cell in the first list of cells, a second list of new cells of the first network node 10 replacing the cell of the first list of cells. The second list may for example comprise, for each new cell in the second list of cells, one or more information elements in the group of: (i) a cell identity; (ii) a fifth index, the "Cell Coverage State Index", indicating the coverage configuration of the new cell, where, for instance, different values of the fifth index could indicate different configurations of the new cell, such as whether the new cell is active or inactive, different cell coverage configuration, etc.; (iii) a second list of new SSB beams; (iv) a mapping between each new SSB beam in the second list of SSB beams and one or more SSB beam in the first list of SSB beams; (v) a fourth list of CSI-RS beams; (vi) a second mapping between each new CSI-RS beam in the fourth list of CSI-RS beams and one or more CSI-RS beam in the second list of CSI-RS beams.

In some embodiments, the second list of new SSB beams indicates, for each SSB in the list: (a) an identity of the new SSB beam (such as SSB index); (b) a sixth index, "SSB beam Coverage State Index" indicating the coverage configuration of the SSB beam, where, for instance, different values of the sixth index could indicate different configurations of the new SSB beam, such as whether the SSB beam is active or inactive, different SSB coverage configuration, etc; (c) a third list of CSI-RS beams; and (d) a first mapping between each new CSI-RS beam in the third list of CSI-RS beams and one or more CSI-RS beams in the first list of CSI-RS beams. In some embodiments, the third list of CSI-RS beams comprises, for each CSI-RS beam in the third list: (1) an identity of the new CSI-RS beam; and (2) a seventh index, the "CSI-RS beam Coverage State Index", indicating the coverage of the CSI-RS beam. For instance, different values of the seventh index could indicate different configurations of the new CSI-RS beam, such as whether the CSI-RS beam is active or inactive, different CSI-RS beam coverage configuration, etc.

In some embodiments, the fourth list of CSI-RS beams comprises, for each CSI-RS beam in the fourth list: (1) an identity of the new CSI-RS beam; (2) an eighth index, the "CSI-RS beam Coverage State Index", indicating the coverage of the CSI-RS beam. For instance, different values of the eighth index could indicate different configurations of the new CSI-RS beam, such as whether the CSI-RS beam is active or inactive, different CSI-RS beam coverage configuration, etc.

Consider now some implementation examples.

Example 1: CSI-RS Beam Information Under SSB Beam Information

In one example embodiment based on an extension of the 3GPP COVERAGE CONFIGURATION UPDATE procedure (cf. 3GPP 36.423 v16.2.0 Technical Specification), the first indication 14 transmitted by the first network node 10 to the second network node 20 comprises a Coverage Modification List information element (IE) comprising one or more information elements in the following Table.

| | | | | |
|---|---|---|---|---|
| Coverage Modification List NR | | 0 . . . <maxnoofCellsinNG-RANnode> | | List of NR cells or SSB beams or CSI-RS beams before the modification |
| >NR CGI | M | | NR CGI | NR Cell Global Identifier of the cell before the modification |
| >Cell Coverage State Index | M | | INTEGER (0 . . . 15, . . .) | Value '0' indicates that the cell is inactive. Other values Indicates that the cell is active and also indicates the coverage configuration of the concerned cell |
| >SSB beam List (Proprietary extension) | | 0 . . . <maxnoofSSB> | | Indicate the list of SSB beams before the modification |
| >>SSB beam Index (Proprietary extension) | M | | | SSB index of the SSB beam |
| >>SSB beam Coverage State Index (Proprietary extension) | M | | INTEGER (0 . . . 15, . . .) | Value '0' indicates that the SSB beam is inactive. Other values Indicates that the SSB beam is active and also indicates the coverage configuration of the concerned SSB |
| >>>CSI-RS List (Proprietary extension) | | 0 . . . <maxnoofCSI-RS> | | Indicate the list of CSI-RS beams under the SSB beam index before the modification |
| >>>>CSI-RS beam Index (Proprietary extension) | M | | | CSI-RS index of the CSI-RS beam under the SSB beam index |
| >>>>CSI-RS beam Coverage State Index (Proprietary extension) | M | | INTEGER (0 . . . 15, . . .) | Value '0' indicates that the CSI-RS beam under the SSB beam index is inactive. Other values Indicates that the CSI-RS beam under the SSB beam index is active and also indicates the coverage configuration of the concerned CSI-RS |
| >NR Deployment Status Indicator | O | | ENUMERATED (pre-change-notification, . . .) | Indicates the NR Coverage State is planned to be used at the next reconfiguration |
| >Replacing Info List NR | C-ifNRDeploymentStatusIndicatorPresent | | | List of NR cells or SSB beams or CSI-RS beams after the modification |
| >>Replacing NR Cells List | | 0 . . . <maxnoofCellsinNG-RANnode> | | List of NR cells replacing concerned cell |
| >>>NR CGI | M | | NR CGI | NR Cell Global Identifier of a cell that may replace all or part of the coverage of the cell after the modification |
| >>>Cell Coverage State Index | M | | INTEGER (0 . . . 15, . . .) | Value '0' indicates that the cell is inactive. Other values Indicates that the cell is active and also indicates the coverage configuration of the concerned cell |
| >>>SSBMappingInfo | | | | Mapping between old SSB indexes and new SSB indexes for the concerned cell |
| >>>Replacing SSB beam List (Proprietary extension) | | 0 . . . <maxnoofSSB> | | Indicate the list of SSB beams after the modification |

-continued

| | | | | |
|---|---|---|---|---|
| >>>>SSB Index (Proprietary extension) | M | | | SSB Index of the SSB that may replace all or part of the coverage of the SSB to be modified |
| >>>>SSB beam Coverage State Index (Proprietary extension) | M | | INTEGER (0 . . . 15, . . .) | Value '0' indicates that the SSB beam is inactive. Other values Indicates that the SSB beam is active and also indicates the coverage configuration of the concerned SSB |
| >>>>CSIRSMappingInfo | | | | Mappin between old CSI-RS indexes and new CSI-RS indexes for the concerned SSB |
| >>>>Replacing CSI_RS beam List (Proprietary extension) | | 0 . . . <maxnoofCSI-RS> | | Indicate the list of CSI-RS beams after the modification |
| >>>>CSI-RS Index (Proprietary extension) | M | | | CSI-RS Index of the CSI-RS that may replace all or part of the coverage of the CSI-RS after the modification |
| >>>>>CSI-RS beam Coverage State Index (Proprietary extension) | M | | INTEGER (0 . . . 15, . . .) | Value '0' indicates that the CSI-RS beam is inactive. Other values Indicates that the CSI-RS beam is active and also indicates the coverage configuration of the concerned CSI-RS |

Example 2: CSI-RS Beam Information Under Cell Information

In another example, wherein CSI-RS beams are not directly associated to the coverage area of an SSB beam, but rather associated to the cell itself, the corresponding information elements a Coverage Modification List information element (IE) would appear directly under the cell information rather than under the SSB information element, as exemplified in the following Table.

| | | | | |
|---|---|---|---|---|
| Coverage Modification List NR | | 0 . . . <maxnoofCellsinNG-RANnode> | | List of NR cells or SSB beams or CSI-RS beams before the modification |
| >NR CGI | M | | NR CGI | NR Cell Global Identifier of the cell before the modification |
| >Cell Coverage State Index | M | | INTEGER (0 . . . 15, . . .) | Value '0' indicates that the cell is inactive. Other values Indicates that the cell is active and also indicates the coverage configuration of the concerned cell |
| >SSB beam List (Proprietary extension) | | 0 . . . <maxnoofSSB> | | Indicate the list of SSB beams before the modification |
| >>SSB beam Index (Proprietary extension) | M | | | SSB index of the SSB beam |
| >>SSB beam Coverage State Index (Proprietary extension) | M | | INTEGER (0 . . . 15, . . .) | Value '0' indicates that the SSB beam is inactive. Other values Indicates that the SSB beam is active and also indicates the coverage configuration of the concerned SSB |
| >>CSI-RS List (Proprietary extension) | | 0 . . . <maxnoofCSI-RS> | | Indicate the list of CSI-RS beams before the modification when not associated to a SSB beam index |
| >>>CSI-RS beam Index (Proprietary extension) | M | | | CSI-RS index of the CSI-RS beam when not associated to SSB beam index |
| >>>CSI-RS beam Coverage State Index (Proprietary extension) | M | | INTEGER (0 . . . 15, . . .) | Value '0' indicates that the CSI-RS beam is inactive. Other values Indicates that the CSI-RS beam is active and also indicates the coverage configuration of the concerned CSI-RS |
| >NR Deployment Status Indicator | O | | ENUMERATED (pre-change-notification, . . .) | Indicates the NR Coverage State is planned to be used at the next reconfiguration |
| >Replacing Info List NR | C-ifNRDeploymentStatusIndicatorPresent | | | List of NR cells or SSB beams or CSI-RS beams after the modification |
| >>Replacing NR Cells List | | 0 . . . <maxnoofCellsinNG-RANnode> | | List of NR cells replacing concerned cell |
| >>>NR CGI | M | | NR CGI | NR Cell Global Identifier of a cell that may replace all or part of the coverage of the cell after the modification |
| >>>Cell Coverage State Index | M | | INTEGER (0 . . . 15, . . .) | Value '0' indicates that the cell is inactive. Other values Indicates that the cell is active and also indicates the coverage configuration of the concerned cell |

-continued

| | | | | |
|---|---|---|---|---|
| >>>SSBMappingInfo | | | | Mapping between old SSB indexes and new SSB indexes for the concerned cell |
| >>>Replacing SSB beam List (Proprietary extension) | | 0 . . . <maxnoofSSB> | | Indicate the list of SSB beams after the modification |
| >>>>SSB Index (Proprietary extension) | M | | | SSB Index of the SSB that may replace all or part of the coverage of the SSB to be modified |
| >>>>SSB beam Coverage State Index (Proprietary extension) | M | | INTEGER (0 . . . 15, . . .) | Value '0' indicates that the SSB beam is inactive. Other values Indicates that the SSB beam is active and also indicates the coverage configuration of the concerned SSB |
| >>>CSIRSMappingInfo | | | | Mapping between old CSI-RS indexes and new CSI-RS indexes for the concerned cell when CSI-RS is not associated to an SSB beam index |
| >>>Replacing CSI-RS beam List (Proprietary extension) | | 0 . . . <maxnoofCSI-RS> | | Indicate the list of CSI-RS beams after the modification for the concerned cell when CSI-RS is not associated to an SSB beam index |
| >>>>CSI-RS Index (Proprietary extension) | M | | | CSI-RS Index of the CSI-RS that may replace all or part of the coverage of the CSI-RS after the modification for the concerned cell when CSI-RS is not associated to an SSB beam index |
| >>>>CSI-RS beam Coverage State Index (Proprietary extension) | M | | INTEGER (0 . . . 15, . . .) | Value '0' indicates that the CSI-RS beam is inactive. Other values Indicates that the CSI-RS beam is active and also indicates the coverage configuration of the concerned CSI-RS |

Example 3: Some CSI-RS Beam Information Under Cell Information, Other Under SSB Beam It is clear to the skilled reader that, in a cell configured with CSI-RS beams associated to either the cell itself or to one or more SSB beams of the cell, the structures suggested to reconfigure the CSI-RS beam coverage in the previous two tables could be combined.

Example 4: Same as Example 1 but with Dedicated Information Groups for SSB and CSI In another exemplifying case, a dedicated information group can be used to contain the information elements describing the replacing information of SSB beams and/or CSI-RS beams after the configuration modification. In this case, the replacing information in the table of Example 1 (or, equivalently, in Examples 2 and 3) can be rewritten as follows.

| | | | | |
|---|---|---|---|---|
| >Replacing Info List NR | C-ifNRDeploymentStatusIndicatorPresent | | | List of NR cells or SSB beams or CSI-RS beams after the modification |
| >>Replacing NR Cells List | | 0 . . . <maxnoofCellsinNG-RANnode> | | List of NR cells replacing concerned cell |
| >>>NR CGI | M | | NR CGI | NR Cell Global Identifier of a cell that may replace all or part of the coverage of the cell after the modification |
| >>>Cell Coverage State Index | M | | INTEGER (0 . . . 15, . . .) | Value '0' indicates that the cell is inactive. Other values Indicates that the cell is active and also indicates the coverage configuration of the concerned cell |
| >>>SSBReplacingInfo | M | | | Information group for SSB beams after the modification |
| >>>>SSBMappingInfo | | | | Mapping between old SSB indexes and new SSB indexes for the concerned cell |
| >>>>Replacing SSB beam List (Proprietary extension) | | 0 . . . <maxnoofSSB> | | Indicate the list of SSB beams after the modification |
| >>>>>SSB Index (Proprietary extension) | M | | | SSB Index of the SSB that may replace all or part of the coverage of the SSB to be modified |

-continued

| | | | | |
|---|---|---|---|---|
| >>>>>SSB beam Coverage State Index (Proprietary extension) | M | | INTEGER (0 . . . 15, . . .) | Value ‘0’ indicates that the SSB beam is inactive. Other values Indicates that the SSB beam is active and also indicates the coverage configuration of the concerned SSB |
| >>>>>CSIRSReplacingInfo | | | | Information group for SSB beams after the modification |
| >>>>>>CSIRSMappingInfo | | | | Mappin between old CSI-RS indexes and new CSI-RS indexes for the concerned SSB |
| >>>>>>Replacing CSI_RS beam List (Proprietary extension) | | 0 . . . <maxnoofCSI-RS> | | Indicate the list of CSI-RS beams after the modification |
| >>>>>>>CSI-RS Index (Proprietary extension) | M | | | CSI-RS Index of the CSI-RS that may replace all or part of the coverage of the CSI-RS after the modification |
| >>>>>>>CSI-RS beam Coverage State Index (Proprietary extension) | M | | INTEGER (0 . . . 15, . . .) | Value ‘0’ indicates that the CSI-RS beam is inactive. Other values Indicates that the CSI-RS beam is active and also indicates the coverage configuration of the concerned CSI-RS |

In any of the embodiments herein, the first and the second network nodes 10, 20 can be, for instance, any of a 3GPP eNB node, a 3GPP gNB node, a 3GPP en-gNB node, and a 3GPP ng-eNB node, or combinations thereof. For instance, in one embodiment, the first network node 10 is a gNB distributed unit (gNB-DU) and the second network node 20 is a gNB centralized unit (gNB-CU) of a split RAN architecture of a 3GPP NG-RAN system. In another embodiment, the first network node 10 and the second network node 20 are both a gNB of a full RAN architecture of a 3GPP NG-RAN system. In yet another embodiment, the first network node 10 is a gNB a 3GPP NG-RAN system and the second network node 20 is an eNB of an LTE system of an ng-eNB. In still another embodiment, the first network node 10 is a 3GPP en-gNB and the second network 20 node is a 3GPP eNB.

In one exemplifying case, earlier illustrated in FIG. 6, the second network node 20 is a gNB-CU of a NG-RAN system with split architecture and the first network node 10 is a gNB-DU connected to the gNB-CU by means of a F1AP interface. In this case, the gNB-CU-CP detects the presence of a CCO issue with a serving cell or the coverage area of a RS beam of the gNB-DU, whereas the gNB-DU-CP resolves the CCO issues and indicates the adopted solution (e.g. a new configuration for the serving cell and/or RS beams concerned with the CCO issue) to the gNB-CU-CP.

In case of a 3GPP RAN system with split architecture, the methods may be executed multiple times to resolve detected CCO issues. A non-limiting example is provided here below for the NR case.

The gNB Central Unit Control Plane (gNB-CU-CP) of a NG-RAN node provides the RRC anchor point for user devices of gNB Distributed Units (gNB-DU) with which communicates via an F1AP interface. Based on RRC measurements reports from user devices, such as RRC reports, the gNB-CU-CP can detect potential coverage or capacity issues for serving cells of underlying gNB-DUs.

The resolution of the CCO issues may be implemented by extending and/or modifying preexisting NG RAN NODE CONFIGURATION procedures. In particular firstly between the gNB-CU-CP of a first NG-RAN node in split architecture and a gNB-DU concerned with a CCO issue detected by the gNB-CU-CP. In this case, the first network node 10 is a gNB-CU-CP and the second network node 20 is a gNB-DU and the method can be realized by extending and/or modifying the 3GPP gNB-CU CONFIGURATION UPDATE procedure according to methods and embodiments described herein.

Then, again between the gNB-DU and the corresponding gNB-CU-CP to inform the gNB-CU-CP about a new gNB-DU configuration adopted by the gNB-DU to resolve the CCO issue. In this case, the first network node 10 is a gNB-DU and the second network node 20 is a gNB-CU-CP, and the methods can be realized by extending and/or modifying the 3GPP gNB-DU CONFIGURATION UPDATE procedure according to methods and embodiments described herein.

Consider now an example Of Implementation in EN-DC Scenario. For EN-DC scenario, the EN-DC Configuration Update is extended to inform a neighbor RAN node upon the modification of the cell coverage. In one embodiment, an eNB sends the extended configuration update towards a gNB by including LTE related information concerning a modification of coverage for LTE cells served by the eNB sending the message. In a variant, additional information concerning the modification of coverage for LTE or NR cells served by a third RAN node, neighbor to the eNB sending the message. In another embodiment, a gNB sends the extended configuration update towards an eNB by including NR related information concerning a modification of the NR cell coverage. In a variant, additional information concerning the modification of coverage for LTE or NR cells served by a third RAN node, neighbor to the gNB sending the message.

Consider now example modifications to TS 36.423 v16.2.0 for implementing some embodiments herein. The proposed example solution extends the existing X2AP signaling.

According to some embodiments, Table 8.1-2 of 3GPP TS 36.423 v16.2.0 is modified such that Class 2 Elementary Procedures include an EN-DC Configuration Request with an initiating message of an EN-DC Configuration Request.

The purpose of the EN-DC Configuration Update procedure is to request to update application level configuration data needed for eNB and en-gNB to interoperate correctly over the X2 interface. The procedure uses non UE-associated signalling.

For an eNB initiated EN-DC Configuration Update Request, an eNB initiates the procedure by sending an EN-DC CONFIGURATION UPDATE REQUEST message to a peer en-gNB. If the CCO Issue detection IE is present, the en-gNB shall, if supported, use it to generate the EUTRA Coverage Modification List IE and include the list in the EN-DC CONFIGURATION UPDATE message.

For an en-gNB initiated EN-DC Configuration Update Request, an en-gNB initiates the procedure by sending an EN-DC CONFIGURATION UPDATE REQUEST message to an eNB. If the CCO Issue detection IE is present, the en-gNB shall, if supported, use it to generate the NG-RAN Coverage Modification List IE and include the list in the EN-DC CONFIGURATION UPDATE message.

The EN-DC CONFIGURATION UPDATE REQUEST message is sent by an initiating node to a peer neighbouring node, both nodes able to interact for EN-DC, to request an updated information for a TNL association.

In some embodiments, the EN-DC CONFIGURATION UPDATE REQUEST message is specified as shown in the below table:

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Transaction ID | M | | 9.3.1.23 | | YES | Reject |
| CHOICE Configuration Update Request Type | M | | | | YES | Reject |
| >CCO Issue detection | M | | ENUMERATED (capacity, coverage, imbalance . . .) | Indicates which type of CCO issue has been detected | YES | Ignore |

In some embodiments, the EN-DC Configuration Update procedure may be updated as follows. For an eNB initiated EN-DC Configuration Update, if the EUTRA Coverage Modification List IE is present, en-gNB may use the information in the EUTRA Cell Coverage State IE to identify the cell deployment configuration enabled by eNB and for configuring the mobility towards the cell(s) indicated by the ECGI IE, as described in TS 36.300. If the EUTRA Cell Deployment Status Indicator IE is present in the EUTRA Coverage Modification List IE, the en-gNB shall consider the cell deployment configuration of the cell to be modified as the next planned configuration and shall remove any planned configuration stored for this cell. If the EUTRA Cell Deployment Status Indicator IE is present and the EUTRA Cell Replacing Info IE contains non-empty cell list, the en-gNB may use this list to avoid connection or re-establishment failures during the reconfiguration, e.g. consider the cells in the list as possible alternative handover targets. If the EUTRA Cell Deployment Status Indicator IE is not present, the en-gNB shall consider the cell deployment configuration of cell to be modified as activated and replace any previous configuration for the cells indicated in the EUTRA Coverage Modification List IE.

For an en-gNB initiated EN-DC Configuration Update, if the NG-RAN Coverage Modification List IE is present, the eNB may use the information in the NR Cell Coverage State IE to identify the NR cell deployment configuration and for configuring the mobility towards the NR cell(s) indicated by the NR CGI IE, as described in TS 38.300 v16.2.0. If the NG-RAN Deployment Status Indicator IE is present in the NG-RAN Coverage Modification List IE, the eNB shall, if supported, consider the NR cell deployment configuration of the NR cells to be modified as the next planned configuration and shall remove any planned configuration stored for this cell. If the NG-RAN Deployment Status Indicator IE is present and the NG-RAN Replacing Info IE contains non-empty cell list, the eNB may use this list to avoid connection or re-establishment failures during the reconfiguration, e.g. consider the cells in the list as possible alternative handover targets. If the NG-RAN Deployment Status Indicator IE is not present, the eNB shall, if supported, consider the NR cell deployment configuration of NR cell to be modified as activated and replace any previous configuration for the NR cells indicated in the NG-RAN Coverage Modification List IE.

In some embodiments, the EN-DC CONFIGURATION UPDATE message is implemented as shown in part below:

| IE/Group Name | Presence | Range | IE type and reference | Semantics description | Criticality | Assigned Criticality |
|---|---|---|---|---|---|---|
| Message Type | M | | 9.2.13 | | YES | reject |
| CHOICE Initiating NodeType | M | | | | YES | reject |
| >eNB | | | | | | |
| . . . | . . . | . . . | . . . | . . . | . . . | . . . |

-continued

| IE/Group Name | Presence | Range | IE type and reference | Semantics description | Criticality | Assigned Criticality |
|---|---|---|---|---|---|---|
| >> EUTRA Coverage Modification List | | 0 . . . <maxCellineNB> | | List of E-UTRAN cells with modified coverage | GLOBAL | reject |
| >>> ECGI | M | | ECGI 9.2.14 | E-UTRAN Cell Global Identifier of the cell to be modified | — | — |
| >>> EUTRA Cell Coverage State | M | | INTEGER (0 . . . 15, . . .) | Value ‘0’ indicates that the cell is inactive. Other values Indicates that the cell is active and also indicates the coverage configuration of the concerned cell | — | — |
| >>> EUTRA Cell Deployment Status Indicator | O | | ENUMERATED (pre-change-notification, . . .) | Indicates the Cell Coverage State is planned to be used at the next reconfiguration | — | — |
| >>> EUTRA Cell Replacing Info | C-ifCellDeploymentStatusIndicatorPresent | | | | — | — |
| >>>> EUTRA Replacing Cells | | 0 . . . <maxCellineNB> | | | — | — |
| >>>>> ECGI | | | ECGI 9.2.14 | E-UTRAN Cell Global Identifier of a cell that may replace all or part of the coverage of the cell to be modified | — | — |
| >en-gNB | | | | | | |
| . . . | . . . | . . . | . . . | . . . | . . . | . . . |
| >> NG-RAN Coverage Modification List | | 0 . . . <maxnoofCellsinNG-RANnode > | | List of NR cells with modified coverage | GLOBAL | reject |
| >>> NR Cell Global ID | M | | NR CGI 9.2.3.25 | NR Cell Global Identifier of the cell to be modified | — | — |
| >>> NR Cell Coverage State | M | | INTEGER (0 . . . 15, . . .) | Value ‘0’ indicates that the cell is inactive. Other values Indicates that the cell is active and also indicates the coverage configuration of the concerned cell | — | — |
| >>> NG-RAN Deployment Status Indicator | O | | ENUMERATED (pre-change-notification, . . .) | Indicates that the NR Cell Coverage State is planned to be used at the next reconfiguration | — | — |
| >>> NG-RAN Replacing Info | C-ifNGRANDeploymentStatusIndicatorPresent | | | | | |
| >>>> Replacing NR Cells | | 0 . . . <maxnoofCellsinNG-RANnode > | | | — | — |
| >>>>> NR Cell Global ID | | | NR CGI 9.2.3.25 | NR Cell Global Identifier of a cell that may replace all or part of the coverage of the cell to be modified | — | — |
| . . . | . . . | . . . | . . . | . . . | . . . | . . . |

| | Explanation |
|---|---|
| Range bound | |
| maxnoofCellsinNG-RANnode | Maximum no. cells that can be served by an NG-RAN node. Value is 16384. |
| Condition | |
| ifCellDeploymentStatusIndicatorPresent | This IE shall be present if the Cell Deployment Status Indicator IE is present. |
| ifNGRANDeploymentStatusIndicatorPresent | This IE shall be present if the NG-RAN Deployment Status Indicator IE is present. |

The NR Neighbour Information IE contains cell configuration information of NR cells that a neighbour node may need for the X2 AP interface. In some embodiments, the NR Neighbour Information IE is specified, in part, as shown below:

| IE/Group Name | Presence | Range | IE type and reference | Semantics description | Criticality | Assigned Criticality |
|---|---|---|---|---|---|---|
| NR Neighbour Information | | 1 . . . <maxnoofNRNeighbours> | | | — | |
| >NR Neighbour Information Item | | | | | — | |
| . . . | . . . | . . . | . . . | . . . | . . . | . . . |
| >>Coverage Modification List NG-RAN | | 0 . . . <mxCellingNB> | | List of NR cells with modified coverage | GLOBAL | reject |
| >>>NR Cell Global ID | M | | NR CGI 9.2.3.25 | NR Cell Global Identifier of the cell to be modified | — | |
| >>>Cell Coverage State NG-RAN | M | | INTEGER (0 . . . 15, . . .) | Value '0' indicates that the cell is inactive. Other values Indicates that the cell is active and also indicates the coverage configuration of the concerned cell | — | |
| >>>Cell Deployment Status Indicator NG-RAN | O | | ENUMERATED (pre-change-notification, . . .) | Indicates the Cell Coverage State is planned to be used at the next reconfiguration | | |
| >>>Cell Replacing Info NG-RAN | C-ifCellDeploymentStatusIndicatorPresent | | | | | |
| >>>>Replacing Cells NG-RAN | | 0 . . . <maxCellingNB> | | | | |
| >>>>> NR Cell Global ID | | | NR CGI 9.2.3.25 | NR Cell Global Identifier of a cell that may replace all or part of the coverage of the cell to be modified | | |
| >>>>> SSB Index | | | INTEGER (0 . . . 63) | Identify an SSB area of an NR cell | | |
| . . . | . . . | . . . | . . . | . . . | . . . | . . . |

The Served NR Cell Information IE contains cell configuration information of an NR cell that a neighbour eNB may need for the X2 AP interface. In some embodiments, the Served NR Cell Information IE is specified, in part, as shown below:

| IE/Group Name | Presence | Range | IE type and reference | Semantics description | Criticality | Assigned Criticality |
|---|---|---|---|---|---|---|
| NR-PCI | M | | INTEGER (0 . . . 1007) | NR Physical Cell ID | — | |
| Cell ID | M | | NR CGI 9.2.111 | | — | |
| Coverage Modification List NG-RAN | | 0 . . . <mxCellingNB> | | List of NR cells with modified coverage | GLOBAL | reject |

-continued

| IE/Group Name | Presence | Range | IE type and reference | Semantics description | Criticality | Assigned Criticality |
|---|---|---|---|---|---|---|
| >Cell Coverage State NG-RAN | M | | INTEGER (0 . . .15, . . .) | Value '0' indicates that the cell is inactive. Other values Indicates that the cell is active and also indicates the coverage configuration of the concerned cell | — | |
| >Cell Deployment Status Indicator NG-RAN | O | | ENUMERATED (pre-change-notification, . . .) | Indicates the Cell Coverage State is planned to be used at the next reconfiguration | | |
| >Cell Replacing Info NG-RAN | C-ifCellDeploymentStatusIndicatorPresent | | | | | |
| >>Replacing Cells NG-RAN | | 0 . . . <maxCellingNB> | | | | |
| >>> NR Cell Global ID | | | NR CGI 9.2.3.25 | NR Cell Global Identifier of a cell that may replace all or part of the coverage of the cell to be modified | | |
| >>> SSB Index | | | INTEGER (0 . . . 63) | Identify an SSB area of an NR cell | | |
| CSI-RS Transmission Indication | O | | ENUMERATED {activated, deactivated, . . .} | This IE indicates the CSI-RS transmission status of the given cell. | YES | ignore |

| Range bound | Explanation |
|---|---|
| maxnoofBPLMNs | Maximum no. of broadcast PLMN Ids. Value is 6. |
| maxnoofAdditionalPLMNs | Maximum no. additional PLMN Ids. Value is 6. |
| maxnoofextBPLMNs | Maximum no. of extended broadcast PLMN Ids. Value is 12. |

Consider now an example implementation in an NR-DC scenario. For the NR-DC scenario, the NG-RAN Node Configuration Update is extended to inform the neighbor node upon the modification of the cell coverage. In one embodiment, a gNB sends the extended configuration update towards a gNB by including NR related information concerning a modification of the NR cell coverage. In a variant, the extended configuration update includes additional information concerning the modification of coverage for LTE or NR cells served by a third RAN node, neighbor to the gNB sending the message.

The proposed example implementation extends the existing XnAP signaling. In the example implementation, an NG-RAN Node Configuration Update Request is added as a Class 2 Elementary Procedure, with an NG-RAN NODE CONFIGURATION UPDATE REQUEST being an initiating message.

The purpose of the NG-RAN node Configuration Update Request procedure is to request the update of application level configuration data needed for two NG-RAN nodes to interoperate correctly over the Xn-C interface. The procedure uses non UE-associated signalling.

According to the NG-RAN node Configuration Update Request procedure, an NG-RAN node1 initiates the procedure by sending the NG-RAN NODE CONFIGURATION UPDATE REQUEST message to a peer NG-RAN node2. If the CCO Issue detection IE is present, the NG-RAN node2 shall, if supported, use it to generate the NG-RAN Coverage Modification List IE and include it in the NG-RAN NODE CONFIGURATION UPDATE message.

More particularly, the NG-RAN NODE CONFIGURATION UPDATE REQUEST message is sent by a NG-RAN node to a neighbouring NG-RAN node to request the update of application level configuration data. The NG-RAN NODE CONFIGURATION UPDATE REQUEST message may be specified as below:

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Transaction ID | M | | 9.3.1.23 | | YES | Reject |
| CHOICE Configuration Update Request Type | M | | | | YES | Reject |

-continued

| IE/Group Name | Presence | Range | IE type and reference | Semantics description | Criticality | Assigned Criticality |
|---|---|---|---|---|---|---|
| >CCO Issue detection | M | | ENUMERATED (capacity, coverage, imbalance . . .) | Indicates which type of CCO issue has been detected | YES | Ignore |

In this context, the purpose of the NG-RAN node Configuration Update procedure is to update application level configuration data needed for two NG-RAN nodes to interoperate correctly over the Xn-C interface. The NG-RAN node, initiates the procedure by sending the NG-RAN NODE CONFIGURATION UPDATE message to a peer NG-RAN $node_2$.

If the NG-RAN Coverage Modification List IE is present, the peer NG-RAN $node_2$ may use the information in the NR Cell Coverage State IE to identify the NR cell deployment configuration and for configuring the mobility towards the NR cell(s) indicated by the NR CGI IE, as described in TS 38.300 v16.2.0. If the NG-RAN Coverage Modification List IE is present, the $gNB_2$ may use the information in the SSB Coverage State IE to identify the SSB beam deployment configuration enabled by $gNB_1$.

If the NG-RAN Deployment Status Indicator IE is present in the NG-RAN Coverage Modification List IE, the $gNB_2$ shall, if supported, consider the NR cell deployment configuration of the NR cells to be modified as the next planned configuration and shall remove any planned configuration stored for this cell.

If the NG-RAN Deployment Status Indicator IE is present in the NG-RAN Coverage Modification List IE, the $gNB_2$ shall, if supported, consider the SSB beam deployment configuration of the SSB beams to be modified as the next SSB beam configuration in the cell.

If the NG-RAN Deployment Status Indicator IE is present and the Replacing NR Cells IE contains non-empty NR cell list, the $gNB_2$ may use this list to avoid connection or re-establishment failures during the reconfiguration, e.g. consider the NR cells in the list as possible alternative handover targets.

If the NG-RAN Deployment Status Indicator IE is not present, the $gNB_2$ shall, if supported, consider the NR cell deployment configuration of NR cell to be modified and the SSB beam deployment configuration of the SSB beam to be modified as activated and replace any previous configuration for the NR cells and for the SSB beams indicated in the NG-RAN Coverage Modification List IE.

The NG-RAN NODE CONFIGURATION UPDATE message is sent by a NG-RAN node to a neighbouring NG-RAN node to transfer updated information for an Xn-C interface instance.

Direction: NG-RAN $node_1 \rightarrow$ NG-RAN $node_2$.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| TAI Support List | O | | 9.2.3.20 | List of supported TAs and associated characteristics. | GLOBAL | reject |
| CHOICE Initiating Node Type | M | | | | YES | ignore |
| >gNB | | | | | | |
| >>Served Cells To Update NR | O | | 9.2.2.15 | | YES | ignore |
| >>Cell Assistance Information NR | O | | 9.2.2.17 | | YES | ignore |
| >NG-RAN Coverage Modification List | | 0 . . . < maxnoofCellsinNG-RANnode > | | List of NR cells and SSB beams with modified coverage | GLOBAL | reject |
| >> NR Cell Global ID | M | | NR CGI 9.2.3.25 | NR Cell Global Identifier of the cell to be modified | — | — |
| >> NR Cell Coverage State | M | | INTEGER (0 . . . 15, . . .) | Value '0' indicates that the cell is inactive. Other values Indicates that the cell is active and also indicates the coverage | — | — |

-continued

| IE/Group Name | Presence | Range | IE type and reference | Semantics description | Criticality | Assigned Criticality |
|---|---|---|---|---|---|---|
| | | | | configuration of the concerned cell | | |
| >> SSB Beam List | | 0 . . . < maxnoofSSBBeam > | | | — | — |
| >>> SSB Beam Index | | | INTEGER (0 . . . 63) | Identify an SSB area of an NR cell | | — |
| >>> SSB Beam Coverage State | M | | INTEGER (0 . . . 15, . . .) | Value '0' indicates that the SSB beam is inactive. Other values Indicates that the SSB beam is active and also indicates the coverage configuration of the concerned SSB beam | — | — |
| >> NG-RAN Deployment Status Indicator | O | | ENUMERATED (pre-change-notification, . . .) | Indicates that the NR Cell Coverage State and, if present, the SSB Beam Coverage State, is planned to be used at the next recon-figuration | — | — |
| >> NG-RAN Replacing Info | C-ifNGRAN Deployment StatusIndicator Present | | | | — | — |
| >>> Replacing NR Cells | | 0 . . . < maxnoofCellsinNG-RANnode > | | | — | — |
| >>>> NR Cell Global ID | | | NR CGI 9.2.3.25 | NR Cell Global Identifier of a cell that may replace all or part of the coverage of the cell to be modified | — | — |
| >>>> Replacing SSB Beams | | 0 . . . < maxnoofSSBBeam > | | | — | — |
| >>>>> SSB Beam Index | | | INTEGER (0 . . . 63) | Identify an SSB area of an NR cell | — | — |
| >>Served Cells to Update E-UTRA | O | | 9.2.2.16 | | YES | ignore |
| >>Cell Assistance Information NR | O | | 9.2.2.17 | | YES | ignore |
| . . . | . . . | . . . | . . . | . . . | . . . | . . . |

| Range bound | Explanation |
|---|---|
| maxnoofTNLAssociations | Maximum numbers of TNL Associations between the NG RAN nodes. Value is 32. |
| maxnoofCellsinNG-RANnode | Maximum no. cells that can be served by an NG-RAN node. Value is 16384. |

-continued

| Condition | Explanation |
|---|---|
| ifNGRANDeploymentStatusIndicatorPresent | This IE shall be present if the NG-RAN Deployment Status Indicator IE is present. |

Consider now an example implementation in F1AP. The proposed example implementation extends the existing F1AP signaling.

The purpose of the gNB-DU Configuration Update procedure is to update application level configuration data needed for the gNB-DU and the gNB-CU to interoperate correctly on the F1 interface. This procedure does not affect existing UE-related contexts, if any. The procedure uses non-UE associated signalling.

The gNB-DU initiates the procedure by sending a GNB-DU CONFIGURATION UPDATE message to the gNB-CU including an appropriate set of updated configuration data that it has just taken into operational use. The gNB-CU responds with GNB-DU CONFIGURATION UPDATE ACKNOWLEDGE message to acknowledge that it successfully updated the configuration data. If an information element is not included in the GNB-DU CONFIGURATION UPDATE message, the gNB-CU shall interpret that the corresponding configuration data is not changed and shall continue to operate the F1-C interface with the existing related configuration data.

If the Coverage Modification List IE is contained in the GNB-CU CONFIGURATION UPDATE message and the indicated cells are already activated, the gNB-DU shall, if supported, replace the NR cell(s) indicated by the NR CG/IE with the NR cell(s) identified in the Replacing NR Cells IE. The gNB-DU may use the NR Cell Coverage State IE indicated within the Replacing NR Cells IE for the new cell configuration.

If the SSB Beam List IE is contained in the Coverage Modification List IE within the GNB-CU CONFIGURATION UPDATE message, the gNB-DU, shall, if supported, replace the SSB beams identified by the SSB Beam Index IE within the SSB Beam List IE, with the SSB beams identified in the Replacing SSB Beams IE. The gNB-DU may use the SSB Beam Cell Coverage State IE indicated within the Replacing SSB Beams for the new SSB beam configuration.

More particularly, the GNB-DU CONFIGURATION UPDATE message is sent by the gNB-DU to transfer updated information associated to an F1-C interface instance. In some embodiments, the GNB-DU CONFIGURATION UPDATE message is specified, in relevant part, as shown below:

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| . . . | . . . | . . . | . . . | . . . | . . . | . . . |
| Coverage Modification List | | 0 . . . <maxnoofCellsinNG-RANnode> | | List of NR cells and SSB beams for which a coverage modification is required | EACH | reject |
| >NR CGI | M | | NR CGI 9.3.1.12 | NR Cell Global Identifier of the cell to be modified | — | — |
| >SSB Beam List | | 0 . . . <maxnoofSSBBeam> | | | — | — |
| >>SSB Beam Index | | | INTEGER (0 . . . 63) | Identify an SSB area of an NR cell | | — |
| >Replacing Info | | | | | — | — |
| >>Replacing NR Cells | | 0 . . . <maxnoofCellsinNG-RANnode> | | | — | — |
| >>>NR CGI | | | NR CGI 9.3.1.12 | NR Cell Global Identifier of a cell | — | — |

-continued

| IE/Group Name | Presence | Range | IE type and reference | Semantics description | Criticality | Assigned Criticality |
|---|---|---|---|---|---|---|
| | | | | that may replace all or part of the coverage of the cell to be modified | | |
| >>>NR Cell Coverage State | M | | INTEGER (0 . . . 15, . . .) | Value '0' indicates that the cell is inactive. Other values Indicates that the cell is active and also indicates the coverage configuration of the concerned cell | — | — |
| >>>Replacing SSB Beams | | 0 . . . <maxnoofSSBBeam> | | | — | — |
| >>>>SSB Beam Index | | | INTEGER (0 . . . 63) | Identify an SSB area of an NR cell | — | — |
| >>>>SSB Beam Coverage State | M | | INTEGER (0 . . . 15, . . .) | Value '0' indicates that the SSB beam is inactive. Other values Indicates that the SSB beam is active and also indicates the coverage configuration of the concerned SSB beam | — | — |

The purpose of the gNB-CU Configuration Update procedure is to update application level configuration data needed for the gNB-DU and gNB-CU to interoperate correctly on the F1 interface. This procedure does not affect existing UE-related contexts, if any. The procedure uses non-UE associated signalling.

The gNB-CU initiates the procedure by sending a GNB-CU CONFIGURATION UPDATE message including the appropriate updated configuration data to the gNB-DU. The gNB-DU responds with a GNB-CU CONFIGURATION UPDATE ACKNOWLEDGE message to acknowledge that it successfully updated the configuration data. If an information element is not included in the GNB-CU CONFIGURATION UPDATE message, the gNB-DU shall interpret that the corresponding configuration data is not changed and shall continue to operate the F1-C interface with the existing related configuration data.

If the CCO Issue detection IE is contained in the GNB-CU CONFIGURATION UPDATE message, the gNB-DU shall, if supported, use it to determine the new cell and beam configuration.

More particularly in this regard, the GNB-CU CONFIGURATION UPDATE message is sent by the gNB-CU to transfer updated information associated to an F1-C interface instance. In some embodiments, the GNB-CU CONFIGURATION UPDATE message is specified, in relevant part, as below:

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| . . . | . . . | . . . | . . . | . . . | . . . | . . . |
| CCO Issue detection | O | | ENUMERATED (capacity, coverage, imbalance . . .) | Indicates which type of CCO issue has been detected | YES | Ignore |
| . . . | . . . | . . . | . . . | . . . | . . . | . . . |

Figure 14:
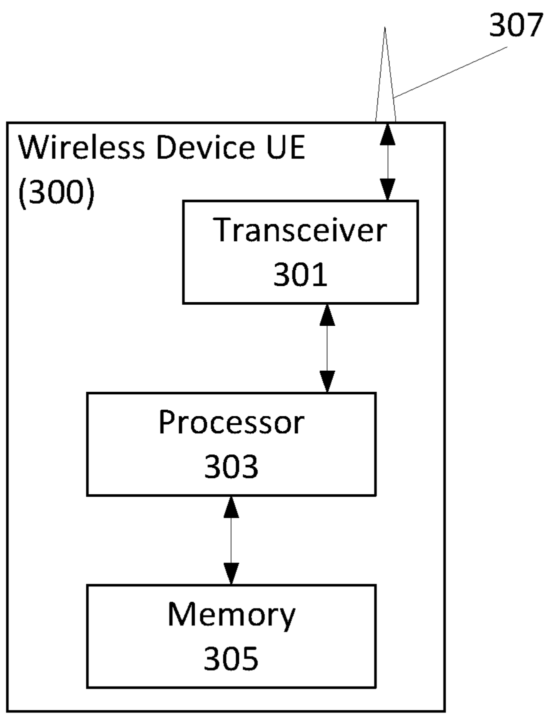
FIG. 14 is a block diagram illustrating elements of a wireless device UE according to some embodiments.

In view of the modifications and variations herein, FIG. 14 is a block diagram illustrating elements of a wireless device UE 300 (also referred to as a mobile terminal, a mobile communication terminal, a wireless communication device, a wireless terminal, a wireless communication terminal, user equipment, UE, a user equipment node/terminal/device, etc.) configured to provide wireless communication according to some embodiments. (Wireless device 300 may be provided, for example, as discussed below with respect to wireless device 2310 of FIG. 23.) As shown, wireless device UE may include an antenna 307 (e.g., corresponding to antenna 2311 of FIG. 23), and transceiver circuitry 301 (also referred to as a transceiver, e.g., corresponding to interface 2314 of FIG. 23) including a transmitter and a receiver configured to provide uplink and downlink radio communications with a base station(s) (e.g., corresponding to network node 2360 of FIG. 23) of a radio access network. Wireless device UE may also include processing circuitry 303 (also referred to as a processor, e.g., corresponding to processing circuitry 2320 of FIG. 23) coupled to the transceiver circuitry, and memory circuitry 305 (also referred to as memory, e.g., corresponding to device readable medium 2330 of FIG. 23) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Wireless device UE may also include an interface (such as a user interface) coupled with processing circuitry 303, and/or wireless device UE may be incorporated in a vehicle.

As discussed herein, operations of wireless device UE may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments relating to wireless devices).

Figure 15:
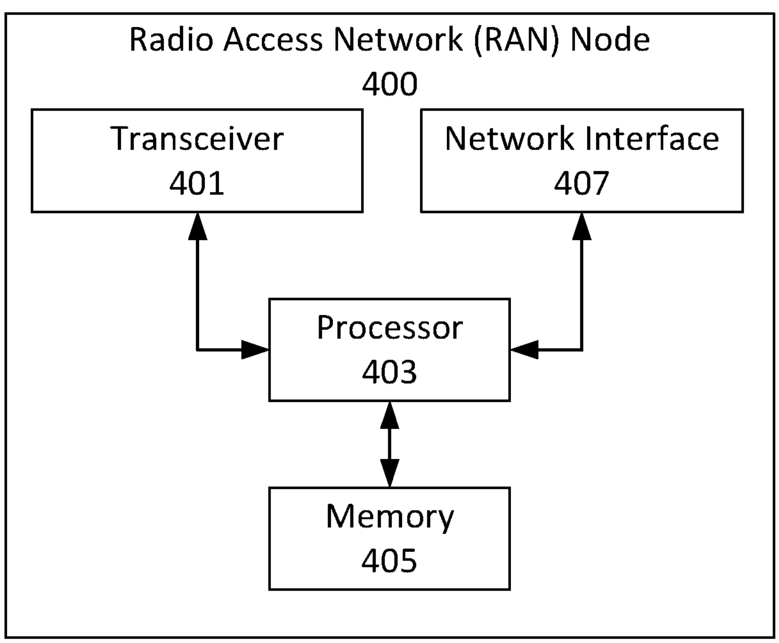
FIG. 15 is a block diagram illustrating elements of a radio access network RAN node of a Radio Access Network (RAN) configured to provide cellular communication according to some embodiments.

FIG. 15 is a block diagram illustrating elements of a radio access network (RAN) node 400 (also referred to as a network node, base station, eNodeB/eNB, gNodeB/gNB, etc.) of a Radio Access Network (RAN) configured to provide cellular communication according to some embodiments. (RAN node 400 may be provided, for example, as discussed below with respect to network node 2360 of FIG. 23.) As shown, the RAN node may include transceiver circuitry 401 (also referred to as a transceiver, e.g., corresponding to portions of interface 2390 of FIG. 23) including a transmitter and a receiver configured to provide uplink and downlink radio communications with mobile terminals. The RAN node may include network interface circuitry 407 (also referred to as a network interface, e.g., corresponding to portions of interface 2390 of FIG. 23) configured to provide communications with other nodes (e.g., with other base stations) of the RAN and/or core network CN. The network node may also include a processing circuitry 403 (also referred to as a processor, e.g., corresponding to processing circuitry 2370) coupled to the transceiver circuitry, and a memory circuitry 405 (also referred to as memory, e.g., corresponding to device readable medium 2380 of FIG. 23) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the RAN node may be performed by processing circuitry 403, network interface 407, and/or transceiver 401. For example, processing circuitry 403 may control transceiver 401 to transmit downlink communications through transceiver 401 over a radio interface to one or more mobile terminals UEs and/or to receive uplink communications through transceiver 401 from one or more mobile terminals UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations (e.g., operations discussed below with respect to Example Embodiments relating to RAN nodes).

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

Figure 16:
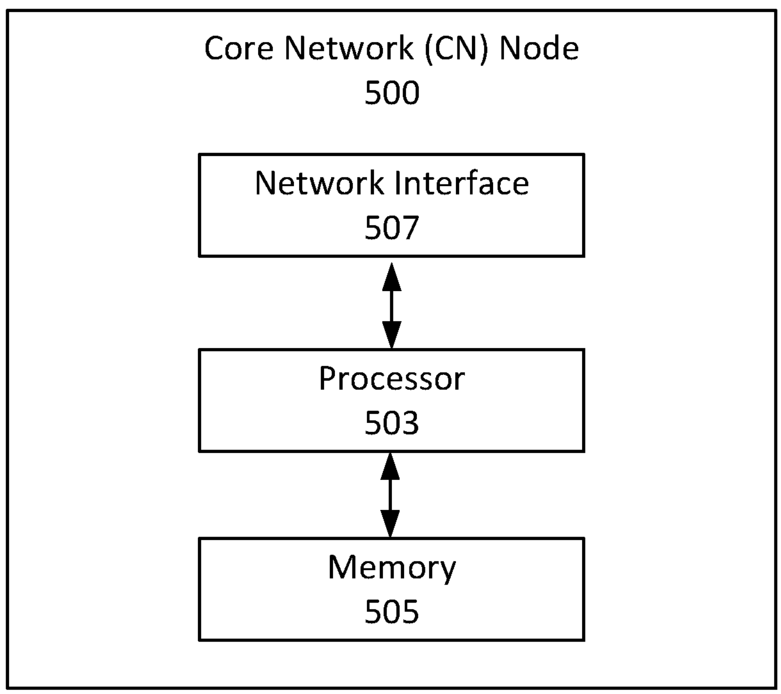
FIG. 16 is a block diagram illustrating elements of a core network CN node of a communication network configured to provide cellular communication according to some embodiments.

FIG. 16 is a block diagram illustrating elements of a core network (CN) node 500 (e.g., an SMF node, an AMF node, etc.) of a communication network configured to provide cellular communication according to some embodiments. As shown, the CN node may include network interface circuitry 507 (also referred to as a network interface) configured to provide communications with other nodes of the core network and/or the radio access network RAN. The CN node may also include a processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the CN node may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations (e.g., operations discussed below with respect to Example Embodiments relating to core network nodes).

Operations of a first network node 400 (implemented using the structure of FIG. 15) will now be discussed with reference to FIGS. 25 and 26 according to some embodiments of inventive concepts. For example, modules may be stored in memory 405 of FIG. 15, and these modules may provide instructions so that when the instructions of a module are executed by respective network node processing circuitry 403, processing circuitry 403 performs respective operations described herein.

Figure 17:
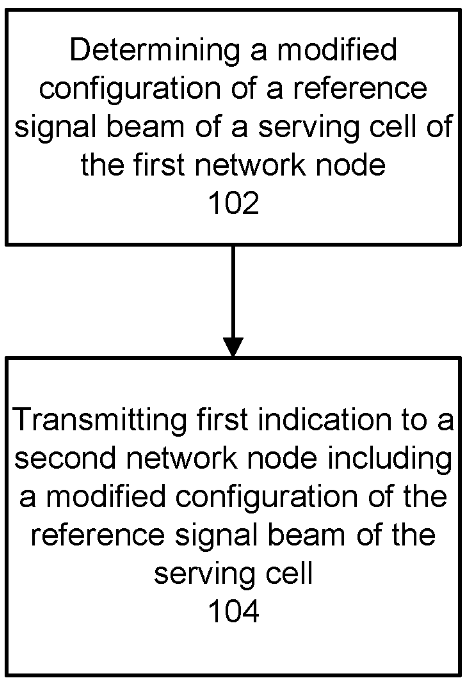
FIG. 17 is a logic flow diagram of a method of operating a first network node in a wireless communication network according to some embodiments.

Referring to FIG. 17, a method of operating a first network node 10, 400 in a wireless communication network includes determining 102 a modified configuration of a reference signal beam of a serving cell of the first network node 10, 400, and transmitting 104 a first indication 14 to a second network node 20, the first indication 14 including a configuration update that describes the modified configuration of the reference signal beam of the serving cell. In some embodiments, for example, the first indication 14 comprises a configuration update message that describes the modified configuration of the reference signal beam of the serving cell.

In some embodiments, the modified configuration modifies an identity of the reference signal beam. Additionally or alternatively, the modified configuration modifies an index indicating a coverage configuration of the reference signal beam. Additionally or alternatively, the modified configuration modifies an identity of a cell to which the reference signal beam is mapped.

In some embodiments, the modified configuration is a modified coverage configuration of the reference signal beam.

In some embodiments, the configuration update message indicates an identity of the serving cell, a list of one or more reference signal beams of the serving cell before coverage modification, and/or a list of one or more replacing cells that are to replace all or part of a coverage of the serving cell after coverage modification. In one embodiment, the list of one or more reference signal beams of the serving cell before coverage modification includes the reference signal beam, and the list indicates, for each of the one or more reference signal beams, an index of the reference signal beam and a coverage state of the reference signal beam before coverage modification. Here, the coverage state indicates whether or not the reference signal beam is active before coverage modification and indicates a coverage configuration of the reference signal beam before coverage modification. Alternatively or additionally, in some embodiments, the list of one or more replacing cells that are to replace all or part of a coverage of the serving cell after coverage modification indicates, for each of the one or more replacing cells, an identity of the replacing cell and a list of one or more replacing reference signal beams of the replacing cell. In this case, the list of one or more replacing reference signal beams indicates, for each of the one or more replacing reference signal beams, an index of the replacing reference signal beam and a coverage state of the replacing reference signal beam after coverage modification. Here, the coverage state indicates whether or not the replacing reference signal beam is to be active after coverage modification and indicates a coverage configuration of the replacing reference signal beam after coverage modification.

In one or more embodiments, the modified configuration of the reference signal beam of the serving cell comprises a modification in the coverage state of the reference signal beam.

In some embodiments, the configuration update message comprises a list of one or more reference signal beams that are to replace all or part of the reference signal beam according to the modified configuration of the reference signal beam.

In some embodiments, the reference signal beam comprises a downlink reference signal beam that carries a synchronization signal block or a channel state information reference signal.

In some embodiments, the method further comprises receiving, at the first network node 10, 400, an indication from the second network node 20 of a capacity and coverage optimization, CCO, issue with the serving cell of the first network node 10, 400. In this case, determining the modified configuration of the reference signal beam is performed in response to the received indication, and the indicated CCO issue comprises at least one of: a capacity issue, a coverage issue, an interference issue, and/or an uplink/downlink imbalance.

In some embodiments, the modified configuration comprises a change in a shape of the reference signal beam, a merging of the reference signal beam with at least another reference signal beam, or a splitting of the reference signal beam into at least multiple reference signal beams. In some embodiments, said merging comprises merging of the reference signal beam with at least another reference signal beam of a different serving cell, as part of merging said serving cell and said different serving cell. In other embodiments, said merging comprises merging of the reference signal beam with at least another reference signal beam of said serving cell. In still other embodiments, said splitting comprises splitting of the reference signal beam into at least multiple reference signal beams of different serving cells, as part of splitting said serving cell into multiple serving cells of the first radio network node. In yet other embodiments, said splitting comprises splitting of the reference signal beam into at least multiple reference signal beams of said serving cell, wherein the multiple reference signal beams of said serving cell have different identities.

In some embodiments, the first network node 10, 400 is a distributed unit, DU, of a gNB and the second network node 20 is a control unit, CU, of the gNB. In this case, the configuration update message is a gNB-DU Configuration Update message.

In some embodiments, the configuration update message indicates that a coverage configuration of the reference signal beam is to be modified to said modified coverage configuration.

In some embodiments, the configuration update message describes the modified configuration of the reference signal beam by indicating an index associated with the modified configuration.

In some embodiments, the configuration update message indicates that a configuration of the reference signal beam is to be modified: (i) from an initial configuration in which the reference signal beam is active to said modified coverage configuration in which the reference signal beam is inactive; or (ii) from an initial configuration in which the reference signal beam is inactive to said modified coverage configuration in which the reference signal beam is active.

Although not shown, in some embodiments, the method further comprises receiving a second indication 16 from the second network node 20, the second indication 16 comprising an acknowledgement of the first indication 14.

Figure 18:
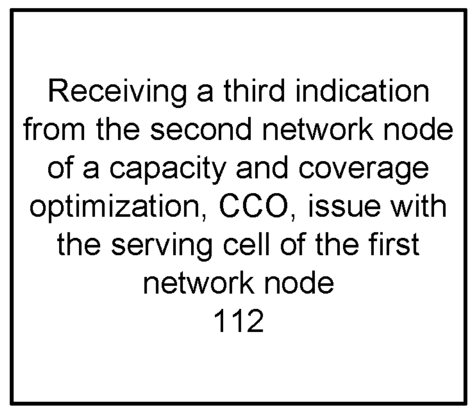
FIG. 18 is a logic flow diagram of a method of operating a first network node in a wireless communication network according to other embodiments.

Referring to FIG. 18, the method of operating a first network node 10, 400 in a wireless communication network may alternatively or additionally include receiving 112, at the first network node 10, 400, a third indication 18 from the second network node 20 of a capacity and coverage optimization, CCO, issue with the serving cell of the first network node 10, 400, where determining the modified configuration of the reference signal beam is performed in response to the third indication 18.

Operations of a second network node 400 (implemented using the structure of FIG. 15) will now be discussed with reference to FIGS. 27 to 30 according to some embodiments. For example, modules may be stored in memory 405 of FIG. 15, and these modules may provide instructions so that when the instructions of a module are executed by respective network node processing circuitry 403, processing circuitry 403 performs respective operations described herein.

Figure 19:
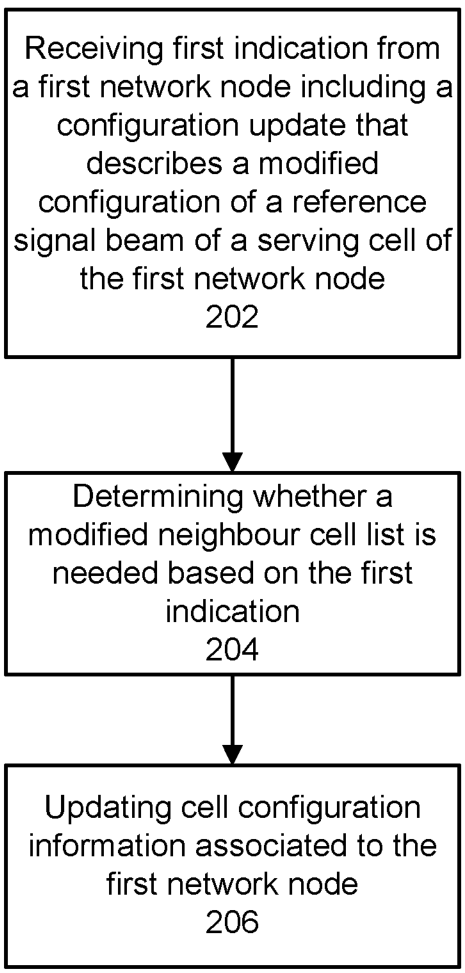
FIG. 19 is a logic flow diagram of a method of operating a second network node in a wireless communication network according to some embodiments.

Referring to FIG. 19, a method of operating a second network node 20, 400 in a wireless communication system includes receiving 202 a first indication 14 from a first network node 10, the first indication 14 including a configuration update that describes a modified configuration of a reference signal beam of a serving cell of the first network node 10. In some embodiments, for example, the first indication 14 comprises a configuration update message that describes the modified configuration of the reference signal beam of the serving cell. Regardless, in some embodiments, the method also comprises determining 204 whether a modified neighbour cell list is needed based on the first indication 14, and updating 206 cell configuration information associated to the first network node 10.

In some embodiments, the modified configuration modifies an identity of the reference signal beam. Additionally or alternatively, the modified configuration modifies an index indicating a coverage configuration of the reference signal beam. Additionally or alternatively, the modified configuration modifies an identity of a cell to which the reference signal beam is mapped.

In some embodiments, the modified configuration is a modified coverage configuration of the reference signal beam.

In some embodiments, the configuration update message indicates an identity of the serving cell, a list of one or more reference signal beams of the serving cell before coverage modification, and/or a list of one or more replacing cells that are to replace all or part of a coverage of the serving cell after coverage modification. In one embodiment, the list of one or more reference signal beams of the serving cell before coverage modification includes the reference signal beam, and the list indicates, for each of the one or more reference signal beams, an index of the reference signal beam and a coverage state of the reference signal beam before coverage modification. Here, the coverage state indicates whether or not the reference signal beam is active before coverage modification and indicates a coverage configuration of the reference signal beam before coverage modification. Alternatively or additionally, in some embodiments, the list of one or more replacing cells that are to replace all or part of a coverage of the serving cell after coverage modification indicates, for each of the one or more replacing cells, an identity of the replacing cell and a list of one or more replacing reference signal beams of the replacing cell. In this case, the list of one or more replacing reference signal beams indicates, for each of the one or more replacing reference signal beams, an index of the replacing reference signal beam and a coverage state of the replacing reference signal beam after coverage modification. Here, the coverage state indicates whether or not the replacing reference signal beam is to be active after coverage modification and indicates a coverage configuration of the replacing reference signal beam after coverage modification.

In one or more embodiments, the modified configuration of the reference signal beam of the serving cell comprises a modification in the coverage state of the reference signal beam.

In some embodiments, the configuration update message comprises a list of one or more reference signal beams that are to replace all or part of the reference signal beam according to the modified configuration of the reference signal beam.

In some embodiments, the reference signal beam comprises a downlink reference signal beam that carries a synchronization signal block or a channel state information reference signal.

In some embodiments, the modified configuration comprises a change in a shape of the reference signal beam, a merging of the reference signal beam with at least another reference signal beam, or a splitting of the reference signal beam into at least multiple reference signal beams. In some embodiments, said merging comprises merging of the reference signal beam with at least another reference signal beam of a different serving cell, as part of merging said serving cell and said different serving cell. In other embodiments, said merging comprises merging of the reference signal beam with at least another reference signal beam of said serving cell. In still other embodiments, said splitting comprises splitting of the reference signal beam into at least multiple reference signal beams of different serving cells, as part of splitting said serving cell into multiple serving cells of the first radio network node. In yet other embodiments, said splitting comprises splitting of the reference signal beam into at least multiple reference signal beams of said serving cell, wherein the multiple reference signal beams of said serving cell have different identities.

In some embodiments, the first network node 10, 400 is a distributed unit, DU, of a gNB and the second network node 20 is a control unit, CU, of the gNB. In this case, the configuration update message is a gNB-DU Configuration Update message.

In some embodiments, the configuration update message indicates that a coverage configuration of the reference signal beam is to be modified to said modified coverage configuration.

In some embodiments, the configuration update message describes the modified configuration of the reference signal beam by indicating an index associated with the modified configuration.

In some embodiments, the configuration update message indicates that a configuration of the reference signal beam is to be modified: (i) from an initial configuration in which the reference signal beam is active to said modified coverage configuration in which the reference signal beam is inactive; or (ii) from an initial configuration in which the reference signal beam is inactive to said modified coverage configuration in which the reference signal beam is active.

Figure 20:
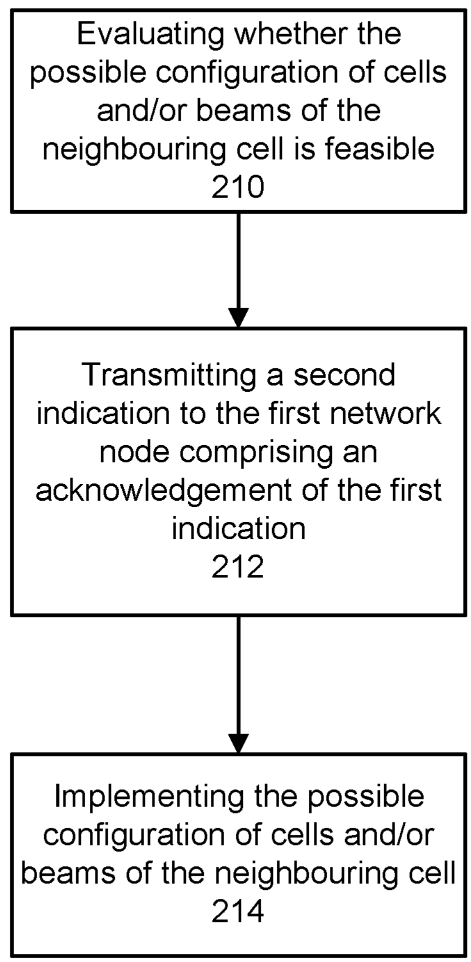
FIG. 20 is a logic flow diagram of a method of operating a second network node in a wireless communication network according to other embodiments.

Referring to FIG. 20, the method of operating the second network node 20, 40 may further include evaluating (210) whether the possible configuration of cells and/or beams of the neighbouring cell is feasible, and transmitting (212) a second indication 16 to the first network node 10 comprising an acknowledgement of the first indication 14. In some embodiments, the method further includes implementing (214) the possible configuration of cells and/or beams of the neighboring cell.

Figure 21:
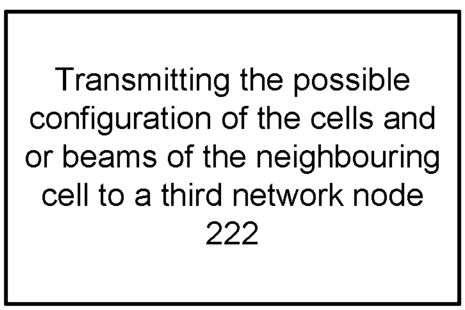
FIG. 21 is a logic flow diagram of a method of operating a second network node in a wireless communication network according to yet other embodiments.

Referring to FIG. 21, the method of operating the second network node 20, 40 may further include transmitting (222) the information regarding the possible configuration of cells and/or beams of the neighbouring cell to a third network node.

Figure 22:
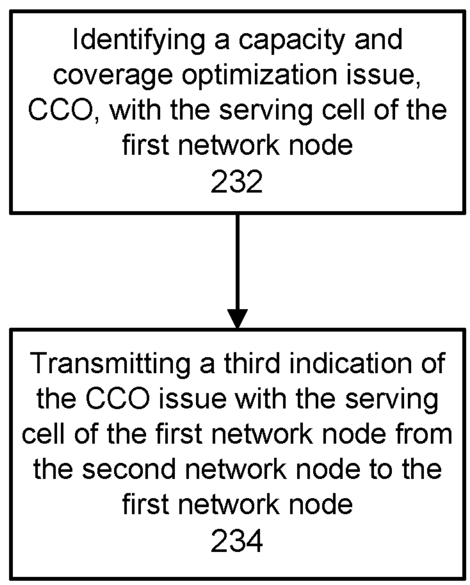
FIG. 22 is a logic flow diagram of a method of operating a second network node in a wireless communication network according to still other embodiments.

Referring to FIG. 22, the method of operating the second network node 20, 40 may further include identifying 232 a capacity and coverage optimization, CCO, issue with the serving cell of the first network node 10, and transmitting 234 a third indication 18 of the CCO issue with the serving cell of the first network node 10 from the second network node 20, 400 to the first network node 10.

Figure 23:
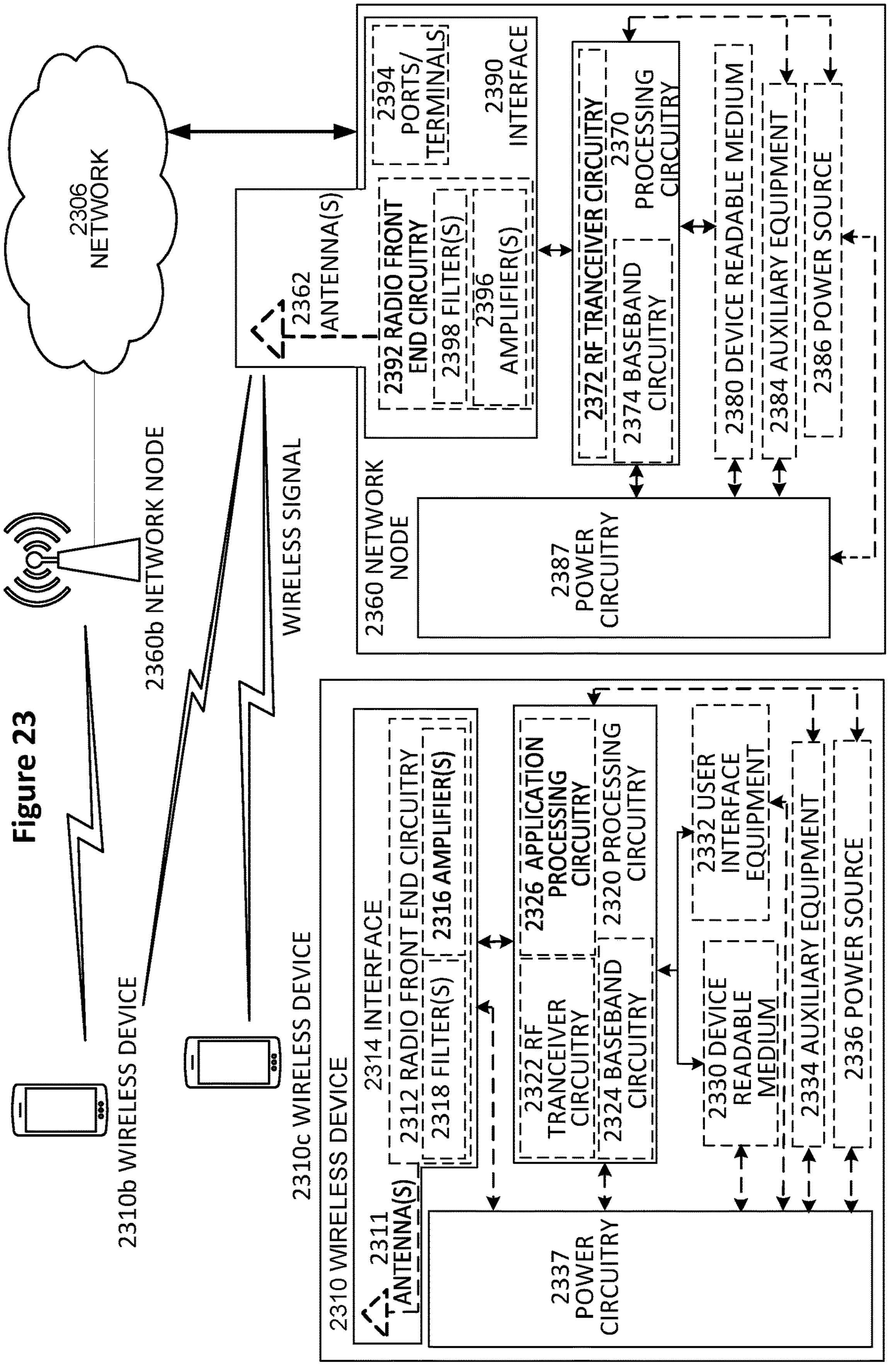
FIG. 23 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 23. For simplicity, the wireless network of FIG. 23 only depicts network 2306, network nodes 2360 and **2360*b*, and WDs 2310, 2310*b*, and 2310*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 2360 and wireless device (WD) 2310** are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2360 and WD 2310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 23, network node 2360 includes processing circuitry 2370, device readable medium 2380, interface 2390, auxiliary equipment 2384, power source 2386, power circuitry 2387, and antenna 2362. Although network node 2360 illustrated in the example wireless network of FIG. 23 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 2360 are depicted as single boxes located within a larger box, or nested within multiple boxes, in practice, a network node may comprise multiple different physical components that make up a single illustrated component (e.g., device readable medium 2380 may comprise multiple separate hard drives as well as multiple RAM modules).

Similarly, network node 2360 may be composed of multiple physically separate components (e.g., a NodeB component and a RNC component, or a BTS component and a BSC component, etc.), which may each have their own respective components. In certain scenarios in which network node 2360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 2360 may be configured to support multiple radio access technologies (RATs). In such embodiments, some components may be duplicated (e.g., separate device readable medium 2380 for the different RATs) and some components may be reused (e.g., the same antenna 2362 may be shared by the RATs).

Network node 2360 may also include multiple sets of the various illustrated components for different wireless technologies integrated into network node 2360, such as, for example, GSM, WCDMA, LTE, NR, WiFi, or Bluetooth wireless technologies. These wireless technologies may be integrated into the same or different chip or set of chips and other components within network node 2360.

Processing circuitry 2370 is configured to perform any determining, calculating, or similar operations (e.g., certain obtaining operations) described herein as being provided by a network node. These operations performed by processing circuitry 2370 may include processing information obtained by processing circuitry 2370 by, for example, converting the obtained information into other information, comparing the obtained information or converted information to information stored in the network node, and/or performing one or more operations based on the obtained information or converted information, and as a result of said processing making a determination.

Processing circuitry 2370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2360 components, such as device readable medium 2380, network node 2360 functionality. For example, processing circuitry 2370 may execute instructions stored in device readable medium 2380 or in memory within processing circuitry 2370. Such functionality may include providing any of the various wireless features, functions, or benefits discussed herein. In some embodiments, processing circuitry 2370 may include a system on a chip (SOC).

In some embodiments, processing circuitry 2370 may include one or more of radio frequency (RF) transceiver circuitry 2372 and baseband processing circuitry 2374. In some embodiments, radio frequency (RF) transceiver circuitry 2372 and baseband processing circuitry 2374 may be on separate chips (or sets of chips), boards, or units, such as radio units and digital units. In alternative embodiments, part or all of RF transceiver circuitry 2372 and baseband processing circuitry 2374 may be on the same chip or set of chips, boards, or units In certain embodiments, some or all of the functionality described herein as being provided by a network node, base station, eNB or other such network device may be performed by processing circuitry 2370 executing instructions stored on device readable medium 2380 or memory within processing circuitry 2370. In alternative embodiments, some or all of the functionality may be provided by processing circuitry 2370 without executing instructions stored on a separate or discrete device readable medium, such as in a hard-wired manner. In any of those embodiments, whether executing instructions stored on a device readable storage medium or not, processing circuitry 2370 can be configured to perform the described functionality. The benefits provided by such functionality are not limited to processing circuitry 2370 alone or to other components of network node 2360, but are enjoyed by network node 2360 as a whole, and/or by end users and the wireless network generally.

Device readable medium 2380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2370. Device readable medium 2380 may store any suitable instructions, data or information, including a computer program, software, an application including one or more of logic, rules, code, tables, etc. and/or other instructions capable of being executed by processing circuitry 2370 and, utilized by network node 2360. Device readable medium 2380 may be used to store any calculations made by processing circuitry 2370 and/or any data received via interface 2390. In some embodiments, processing circuitry 2370 and device readable medium 2380 may be considered to be integrated.

Interface 2390 is used in the wired or wireless communication of signalling and/or data between network node 2360, network 2306, and/or WDs 2310. As illustrated, interface 2390 comprises port(s)/terminal(s) 2394 to send and receive data, for example to and from network 2306 over a wired connection. Interface 2390 also includes radio front end circuitry 2392 that may be coupled to, or in certain embodiments a part of, antenna 2362. Radio front end circuitry 2392 comprises filters 2398 and amplifiers 2396. Radio front end circuitry 2392 may be connected to antenna 2362 and processing circuitry 2370. Radio front end circuitry may be configured to condition signals communicated between antenna 2362 and processing circuitry 2370. Radio front end circuitry 2392 may receive digital data that is to be sent out to other network nodes or WDs via a wireless connection. Radio front end circuitry 2392 may convert the digital data into a radio signal having the appropriate channel and bandwidth parameters using a combination of filters 2398 and/or amplifiers 2396. The radio signal may then be transmitted via antenna 2362. Similarly, when receiving data, antenna 2362 may collect radio signals which are then converted into digital data by radio front end circuitry 2392. The digital data may be passed to processing circuitry 2370. In other embodiments, the interface may comprise different components and/or different combinations of components.

In certain alternative embodiments, network node 2360 may not include separate radio front end circuitry 2392, instead, processing circuitry 2370 may comprise radio front end circuitry and may be connected to antenna 2362 without separate radio front end circuitry 2392. Similarly, in some embodiments, all or some of RF transceiver circuitry 2372 may be considered a part of interface 2390. In still other embodiments, interface 2390 may include one or more ports or terminals 2394, radio front end circuitry 2392, and RF transceiver circuitry 2372, as part of a radio unit (not shown), and interface 2390 may communicate with baseband processing circuitry 2374, which is part of a digital unit (not shown).

Antenna 2362 may include one or more antennas, or antenna arrays, configured to send and/or receive wireless signals. Antenna 2362 may be coupled to radio front end circuitry 2390 and may be any type of antenna capable of transmitting and receiving data and/or signals wirelessly. In some embodiments, antenna 2362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 2362 may be separate from network node 2360 and may be connectable to network node 2360 through an interface or port.

Antenna 2362, interface 2390, and/or processing circuitry 2370 may be configured to perform any receiving operations and/or certain obtaining operations described herein as being performed by a network node. Any information, data and/or signals may be received from a wireless device, another network node and/or any other network equipment. Similarly, antenna 2362, interface 2390, and/or processing circuitry 2370 may be configured to perform any transmitting operations described herein as being performed by a network node. Any information, data and/or signals may be transmitted to a wireless device, another network node and/or any other network equipment.

Power circuitry 2387 may comprise, or be coupled to, power management circuitry and is configured to supply the components of network node 2360 with power for performing the functionality described herein. Power circuitry 2387 may receive power from power source 2386. Power source 2386 and/or power circuitry 2387 may be configured to provide power to the various components of network node 2360 in a form suitable for the respective components (e.g., at a voltage and current level needed for each respective component). Power source 2386 may either be included in, or external to, power circuitry 2387 and/or network node 2360. For example, network node 2360 may be connectable to an external power source (e.g., an electricity outlet) via an input circuitry or interface such as an electrical cable, whereby the external power source supplies power to power circuitry 2387. As a further example, power source 2386 may comprise a source of power in the form of a battery or battery pack which is connected to, or integrated in, power circuitry 2387. The battery may provide backup power should the external power source fail. Other types of power sources, such as photovoltaic devices, may also be used.

Alternative embodiments of network node 2360 may include additional components beyond those shown in FIG. 23 that may be responsible for providing certain aspects of the network node's functionality, including any of the functionality described herein and/or any functionality necessary to support the subject matter described herein. For example, network node 2360 may include user interface equipment to allow input of information into network node 2360 and to allow output of information from network node 2360. This may allow a user to perform diagnostic, maintenance, repair, and other administrative functions for network node 2360.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2310 includes antenna 2311, interface 2314, processing circuitry 2320, device readable medium 2330, user interface equipment 2332, auxiliary equipment 2334, power source 2336 and power circuitry 2337. WD 2310 may include multiple sets of one or more of the illustrated components for different wireless technologies supported by WD 2310, such as, for example, GSM, WCDMA, LTE, NR, WiFi, WiMAX, or Bluetooth wireless technologies, just to mention a few. These wireless technologies may be integrated into the same or different chips or set of chips as other components within WD 2310.

Antenna 2311 may include one or more antennas or antenna arrays, configured to send and/or receive wireless signals, and is connected to interface 2314. In certain alternative embodiments, antenna 2311 may be separate from WD 2310 and be connectable to WD 2310 through an interface or port. Antenna 2311, interface 2314, and/or processing circuitry 2320 may be configured to perform any receiving or transmitting operations described herein as being performed by a WD. Any information, data and/or signals may be received from a network node and/or another WD. In some embodiments, radio front end circuitry and/or antenna 2311 may be considered an interface.

As illustrated, interface 2314 comprises radio front end circuitry 2312 and antenna 2311. Radio front end circuitry 2312 comprise one or more filters 2318 and amplifiers 2316. Radio front end circuitry 2314 is connected to antenna 2311 and processing circuitry 2320, and is configured to condition signals communicated between antenna 2311 and processing circuitry 2320. Radio front end circuitry 2312 may be coupled to or a part of antenna 2311. In some embodiments, WD 2310 may not include separate radio front end circuitry 2312; rather, processing circuitry 2320 may comprise radio front end circuitry and may be connected to antenna 2311. Similarly, in some embodiments, some or all of RF transceiver circuitry 2322 may be considered a part of interface 2314. Radio front end circuitry 2312 may receive digital data that is to be sent out to other network nodes or WDs via a wireless connection. Radio front end circuitry 2312 may convert the digital data into a radio signal having the appropriate channel and bandwidth parameters using a combination of filters 2318 and/or amplifiers 2316. The radio signal may then be transmitted via antenna 2311. Similarly, when receiving data, antenna 2311 may collect radio signals which are then converted into digital data by radio front end circuitry 2312. The digital data may be passed to processing circuitry 2320. In other embodiments, the interface may comprise different components and/or different combinations of components.

Processing circuitry 2320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2310 components, such as device readable medium 2330, WD 2310 functionality. Such functionality may include providing any of the various wireless features or benefits discussed herein. For example, processing circuitry 2320 may execute instructions stored in device readable medium 2330 or in memory within processing circuitry 2320 to provide the functionality disclosed herein.

As illustrated, processing circuitry 2320 includes one or more of RF transceiver circuitry 2322, baseband processing circuitry 2324, and application processing circuitry 2326. In other embodiments, the processing circuitry may comprise different components and/or different combinations of components. In certain embodiments processing circuitry 2320 of WD 2310 may comprise a SOC. In some embodiments, RF transceiver circuitry 2322, baseband processing circuitry 2324, and application processing circuitry 2326 may be on separate chips or sets of chips. In alternative embodiments, part or all of baseband processing circuitry 2324 and application processing circuitry 2326 may be combined into one chip or set of chips, and RF transceiver circuitry 2322 may be on a separate chip or set of chips. In still alternative embodiments, part or all of RF transceiver circuitry 2322 and baseband processing circuitry 2324 may be on the same chip or set of chips, and application processing circuitry 2326 may be on a separate chip or set of chips. In yet other alternative embodiments, part or all of RF transceiver circuitry 2322, baseband processing circuitry 2324, and application processing circuitry 2326 may be combined in the same chip or set of chips. In some embodiments, RF transceiver circuitry 2322 may be a part of interface 2314. RF transceiver circuitry 2322 may condition RF signals for processing circuitry 2320.

In certain embodiments, some or all of the functionality described herein as being performed by a WD may be provided by processing circuitry 2320 executing instructions stored on device readable medium 2330, which in certain embodiments may be a computer-readable storage medium. In alternative embodiments, some or all of the functionality may be provided by processing circuitry 2320 without executing instructions stored on a separate or discrete device readable storage medium, such as in a hard-wired manner. In any of those particular embodiments, whether executing instructions stored on a device readable storage medium or not, processing circuitry 2320 can be configured to perform the described functionality. The benefits provided by such functionality are not limited to processing circuitry 2320 alone or to other components of WD 2310, but are enjoyed by WD 2310 as a whole, and/or by end users and the wireless network generally.

Processing circuitry 2320 may be configured to perform any determining, calculating, or similar operations (e.g., certain obtaining operations) described herein as being performed by a WD. These operations, as performed by processing circuitry 2320, may include processing information obtained by processing circuitry 2320 by, for example, converting the obtained information into other information, comparing the obtained information or converted information to information stored by WD 2310, and/or performing one or more operations based on the obtained information or converted information, and as a result of said processing making a determination.

Device readable medium 2330 may be operable to store a computer program, software, an application including one or more of logic, rules, code, tables, etc. and/or other instructions capable of being executed by processing circuitry 2320. Device readable medium 2330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 2320. In some embodiments, processing circuitry 2320 and device readable medium 2330 may be considered to be integrated.

User interface equipment 2332 may provide components that allow for a human user to interact with WD 2310. Such interaction may be of many forms, such as visual, audial, tactile, etc. User interface equipment 2332 may be operable to produce output to the user and to allow the user to provide input to WD 2310. The type of interaction may vary depending on the type of user interface equipment 2332 installed in WD 2310. For example, if WD 2310 is a smart phone, the interaction may be via a touch screen; if WD 2310 is a smart meter, the interaction may be through a screen that provides usage (e.g., the number of gallons used) or a speaker that provides an audible alert (e.g., if smoke is detected). User interface equipment 2332 may include input interfaces, devices and circuits, and output interfaces, devices and circuits. User interface equipment 2332 is configured to allow input of information into WD 2310, and is connected to processing circuitry 2320 to allow processing circuitry 2320 to process the input information. User interface equipment 2332 may include, for example, a microphone, a proximity or other sensor, keys/buttons, a touch display, one or more cameras, a USB port, or other input circuitry. User interface equipment 2332 is also configured to allow output of information from WD 2310, and to allow processing circuitry 2320 to output information from WD 2310. User interface equipment 2332 may include, for example, a speaker, a display, vibrating circuitry, a USB port, a headphone interface, or other output circuitry. Using one or more input and output interfaces, devices, and circuits, of user interface equipment 2332, WD 2310 may communicate with end users and/or the wireless network, and allow them to benefit from the functionality described herein.

Auxiliary equipment 2334 is operable to provide more specific functionality which may not be generally performed by WDs. This may comprise specialized sensors for doing measurements for various purposes, interfaces for additional types of communication such as wired communications etc. The inclusion and type of components of auxiliary equipment 2334 may vary depending on the embodiment and/or scenario.

Power source 2336 may, in some embodiments, be in the form of a battery or battery pack. Other types of power sources, such as an external power source (e.g., an electricity outlet), photovoltaic devices or power cells, may also be used. WD 2310 may further comprise power circuitry 2337 for delivering power from power source 2336 to the various parts of WD 2310 which need power from power source 2336 to carry out any functionality described or indicated herein. Power circuitry 2337 may in certain embodiments comprise power management circuitry. Power circuitry 2337 may additionally or alternatively be operable to receive power from an external power source; in which case WD 2310 may be connectable to the external power source (such as an electricity outlet) via input circuitry or an interface such as an electrical power cable. Power circuitry 2337 may also in certain embodiments be operable to deliver power from an external power source to power source 2336. This may be, for example, for the charging of power source 2336. Power circuitry 2337 may perform any formatting, converting, or other modification to the power from power source 2336 to make the power suitable for the respective components of WD 2310 to which power is supplied.

Figure 24:
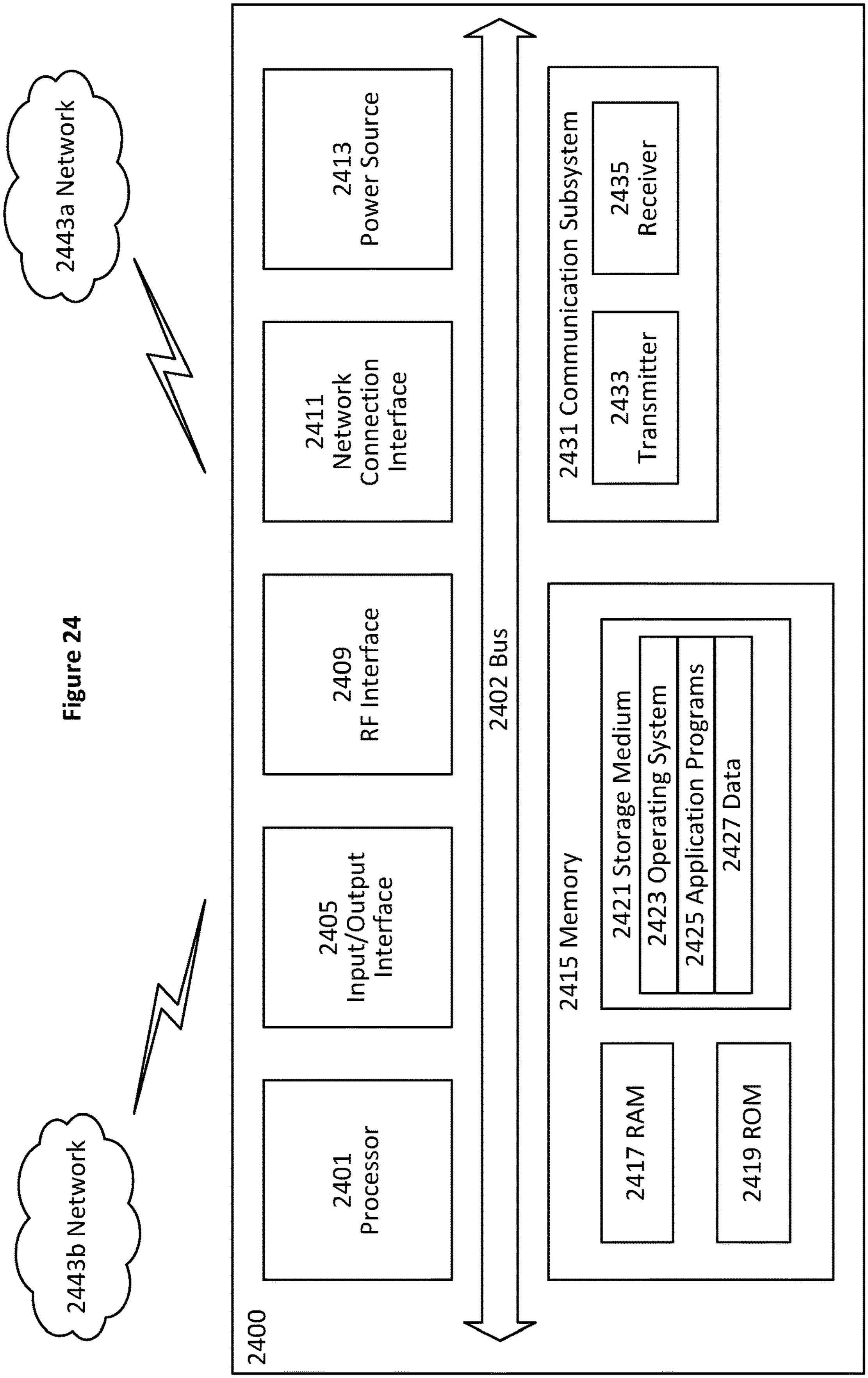
FIG. 24 is a block diagram of a user equipment according to some embodiments.

FIG. 24 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2400 may be any UE identified by the 3rd Generation Partnership Project (3GPP), including a NB-IoT UE, a machine type communication (MTC) UE, and/or an enhanced MTC (eMTC) UE. UE 2400, as illustrated in FIG. 24, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 24 is a UE, the components discussed herein are equally applicable to a WD, and vice-versa.

In FIG. 24, UE 2400 includes processing circuitry 2401 that is operatively coupled to input/output interface 2405, radio frequency (RF) interface 2409, network connection interface 2411, memory 2415 including random access memory (RAM) 2417, read-only memory (ROM) 2419, and storage medium 2421 or the like, communication subsystem 2431, power source 2433, and/or any other component, or any combination thereof. Storage medium 2421 includes operating system 2423, application program 2425, and data 2427. In other embodiments, storage medium 2421 may include other similar types of information. Certain UEs may utilize all of the components shown in FIG. 24, or only a subset of the components. The level of integration between the components may vary from one UE to another UE. Further, certain UEs may contain multiple instances of a component, such as multiple processors, memories, transceivers, transmitters, receivers, etc.

In FIG. 24, processing circuitry 2401 may be configured to process computer instructions and data. Processing circuitry 2401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2401 may include two central processing units (CPUs). Data may be information in a form suitable for use by a computer.

In the depicted embodiment, input/output interface 2405 may be configured to provide a communication interface to an input device, output device, or input and output device. UE 2400 may be configured to use an output device via input/output interface 2405. An output device may use the same type of interface port as an input device. For example, a USB port may be used to provide input to and output from UE 2400. The output device may be a speaker, a sound card, a video card, a display, a monitor, a printer, an actuator, an emitter, a smartcard, another output device, or any combination thereof. UE 2400 may be configured to use an input device via input/output interface 2405 to allow a user to capture information into UE 2400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 24, RF interface 2409 may be configured to provide a communication interface to RF components such as a transmitter, a receiver, and an antenna. Network connection interface 2411 may be configured to provide a communication interface to network 2443*a*. Network 2443*a* may encompass wired and/or wireless networks such as a local-area network (LAN), a wide-area network (WAN), a computer network, a wireless network, a telecommunications network, another like network or any combination thereof. For example, network 2443*a* may comprise a Wi-Fi network. Network connection interface 2411 may be configured to include a receiver and a transmitter interface used to communicate with one or more other devices over a communication network according to one or more communication protocols, such as Ethernet, TCP/IP, SONET, ATM, or the like. Network connection interface 2411 may implement receiver and transmitter functionality appropriate to the communication network links (e.g., optical, electrical, and the like). The transmitter and receiver functions may share circuit components, software or firmware, or alternatively may be implemented separately.

RAM 2417 may be configured to interface via bus 2402 to processing circuitry 2401 to provide storage or caching of data or computer instructions during the execution of software programs such as the operating system, application programs, and device drivers. ROM 2419 may be configured to provide computer instructions or data to processing circuitry 2401. For example, ROM 2419 may be configured to store invariant low-level system code or data for basic system functions such as basic input and output (I/O), startup, or reception of keystrokes from a keyboard that are stored in a non-volatile memory. Storage medium 2421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2421 may be configured to include operating system 2423, application program 2425 such as a web browser application, a widget or gadget engine or another application, and data file 2427. Storage medium 2421 may store, for use by UE 2400, any of a variety of various operating systems or combinations of operating systems.

Storage medium 2421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2421 may allow UE 2400 to access computer-executable instructions, application programs or the like, stored on transitory or non-transitory memory media, to off-load data, or to upload data. An article of manufacture, such as one utilizing a communication system may be tangibly embodied in storage medium 2421, which may comprise a device readable medium.

In FIG. 24, processing circuitry 2401 may be configured to communicate with network 2443*b* using communication subsystem 2431. Network 2443*a* and network 2443*b* may be the same network or networks or different network or networks. Communication subsystem 2431 may be configured to include one or more transceivers used to communicate with network 2443*b*. For example, communication subsystem 2431 may be configured to include one or more transceivers used to communicate with one or more remote transceivers of another device capable of wireless communication such as another WD, UE, or base station of a radio access network (RAN) according to one or more communication protocols, such as IEEE 802.24, CDMA, WCDMA, GSM, LTE, UTRAN, WiMax, or the like. Each transceiver may include transmitter 2433 and/or receiver 2435 to implement transmitter or receiver functionality, respectively, appropriate to the RAN links (e.g., frequency allocations and the like). Further, transmitter 2433 and receiver 2435 of each transceiver may share circuit components, software or firmware, or alternatively may be implemented separately.

In the illustrated embodiment, the communication functions of communication subsystem 2431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2431 may include cellular communication, Wi-Fi communication, Bluetooth communication, and GPS communication. Network 2443*b* may encompass wired and/or wireless networks such as a local-area network (LAN), a wide-area network (WAN), a computer network, a wireless network, a telecommunications network, another like network or any combination thereof. For example, network 2443*b* may be a cellular network, a Wi-Fi network, and/or a near-field network. Power source 2413 may be configured to provide alternating current (AC) or direct current (DC) power to components of UE 2400.

The features, benefits and/or functions described herein may be implemented in one of the components of UE 2400 or partitioned across multiple components of UE 2400. Further, the features, benefits, and/or functions described herein may be implemented in any combination of hardware, software or firmware. In one example, communication subsystem 2431 may be configured to include any of the components described herein. Further, processing circuitry 2401 may be configured to communicate with any of such components over bus 2402. In another example, any of such components may be represented by program instructions stored in memory that when executed by processing circuitry 2401 perform the corresponding functions described herein. In another example, the functionality of any of such components may be partitioned between processing circuitry 2401 and communication subsystem 2431. In another example, the non-computationally intensive functions of any of such components may be implemented in software or firmware and the computationally intensive functions may be implemented in hardware.

Figure 25:
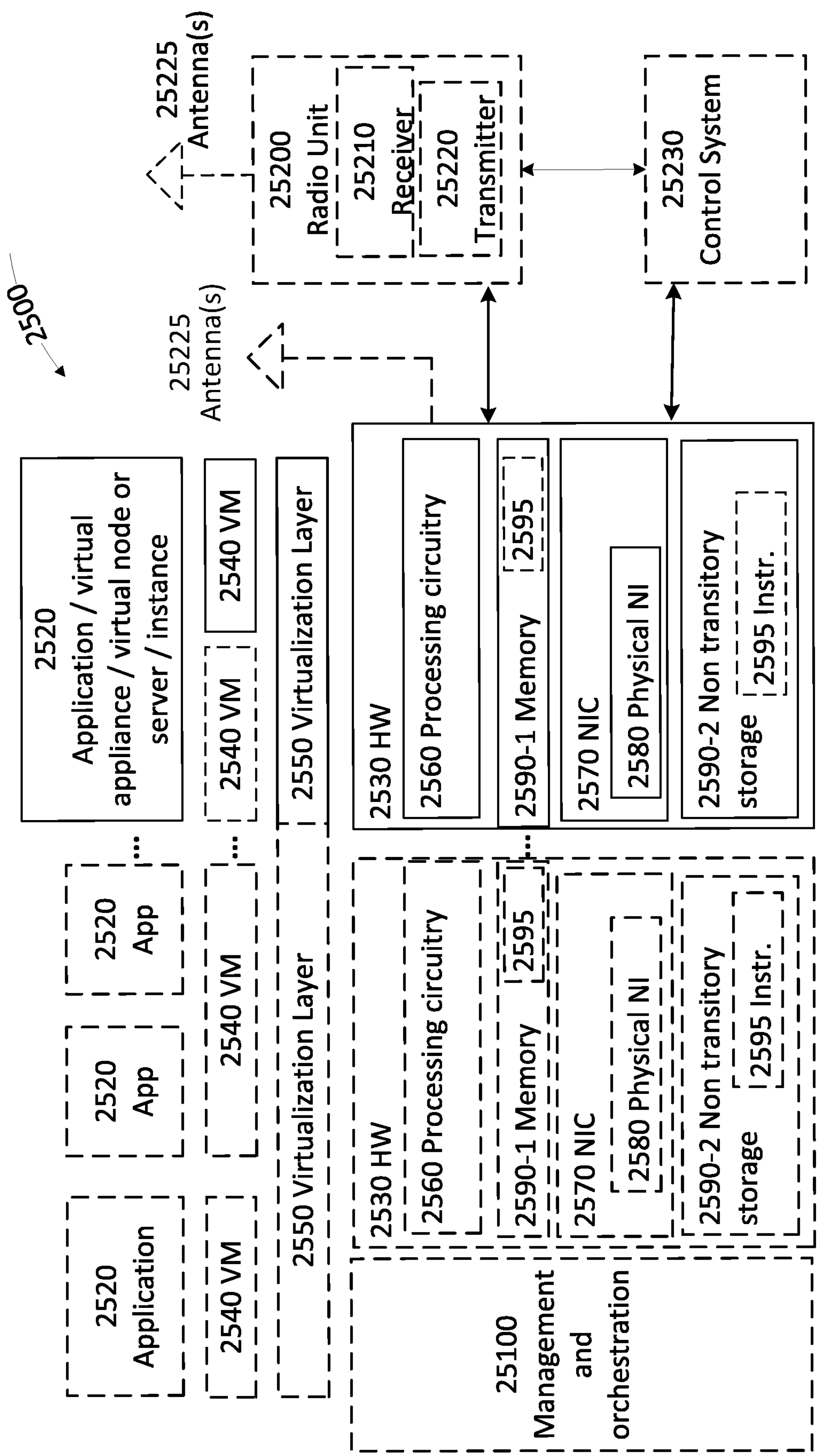
FIG. 25 is a block diagram of a virtualization environment according to some embodiments.

FIG. 25 is a schematic block diagram illustrating a virtualization environment 2500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2500 hosted by one or more of hardware nodes 2530. Further, in embodiments in which the virtual node is not a radio access node or does not require radio connectivity (e.g., a core network node), then the network node may be entirely virtualized.

The functions may be implemented by one or more applications 2520 (which may alternatively be called software instances, virtual appliances, network functions, virtual nodes, virtual network functions, etc.) operative to implement some of the features, functions, and/or benefits of some of the embodiments disclosed herein. Applications 2520 are run in virtualization environment 2500 which provides hardware 2530 comprising processing circuitry 2560 and memory 2590. Memory 2590 contains instructions 2595 executable by processing circuitry 2560 whereby application 2520 is operative to provide one or more of the features, benefits, and/or functions disclosed herein.

Virtualization environment 2500, comprises general-purpose or special-purpose network hardware devices 2530 comprising a set of one or more processors or processing circuitry 2560, which may be commercial off-the-shelf (COTS) processors, dedicated Application Specific Integrated Circuits (ASICs), or any other type of processing circuitry including digital or analog hardware components or special purpose processors. Each hardware device may comprise memory 2590-1 which may be non-persistent memory for temporarily storing instructions 2595 or software executed by processing circuitry 2560. Each hardware device may comprise one or more network interface controllers (NICs) 2570, also known as network interface cards, which include physical network interface 2580. Each hardware device may also include non-transitory, persistent, machine-readable storage media 2590-2 having stored therein software 2595 and/or instructions executable by processing circuitry 2560. Software 2595 may include any type of software including software for instantiating one or more virtualization layers 2550 (also referred to as hypervisors), software to execute virtual machines 2540 as well as software allowing it to execute functions, features and/or benefits described in relation with some embodiments described herein.

Virtual machines 2540, comprise virtual processing, virtual memory, virtual networking or interface and virtual storage, and may be run by a corresponding virtualization layer 2550 or hypervisor. Different embodiments of the instance of virtual appliance 2520 may be implemented on one or more of virtual machines 2540, and the implementations may be made in different ways.

During operation, processing circuitry 2560 executes software 2595 to instantiate the hypervisor or virtualization layer 2550, which may sometimes be referred to as a virtual machine monitor (VMM). Virtualization layer 2550 may present a virtual operating platform that appears like networking hardware to virtual machine 2540.

As shown in FIG. 25, hardware 2530 may be a standalone network node with generic or specific components. Hardware 2530 may comprise antenna 25225 and may implement some functions via virtualization. Alternatively, hardware 2530 may be part of a larger cluster of hardware (e.g. such as in a data center or customer premise equipment (CPE)) where many hardware nodes work together and are managed via management and orchestration (MANO) 25100, which, among others, oversees lifecycle management of applications 2520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2540 may be a software implementation of a physical machine that runs programs as if they were executing on a physical, non-virtualized machine. Each of virtual machines 2540, and that part of hardware 2530 that executes that virtual machine, be it hardware dedicated to that virtual machine and/or hardware shared by that virtual machine with others of the virtual machines 2540, forms a separate virtual network elements (VNE).

Still in the context of NFV, Virtual Network Function (VNF) is responsible for handling specific network functions that run in one or more virtual machines 2540 on top of hardware networking infrastructure 2530 and corresponds to application 2520 in FIG. 25.

In some embodiments, one or more radio units 25200 that each include one or more transmitters 25220 and one or more receivers 25210 may be coupled to one or more antennas 25225. Radio units 25200 may communicate directly with hardware nodes 2530 via one or more appropriate network interfaces and may be used in combination with the virtual components to provide a virtual node with radio capabilities, such as a radio access node or a base station.

In some embodiments, some signalling can be effected with the use of control system 25230 which may alternatively be used for communication between the hardware nodes 2530 and radio units 25200.

Figure 26:
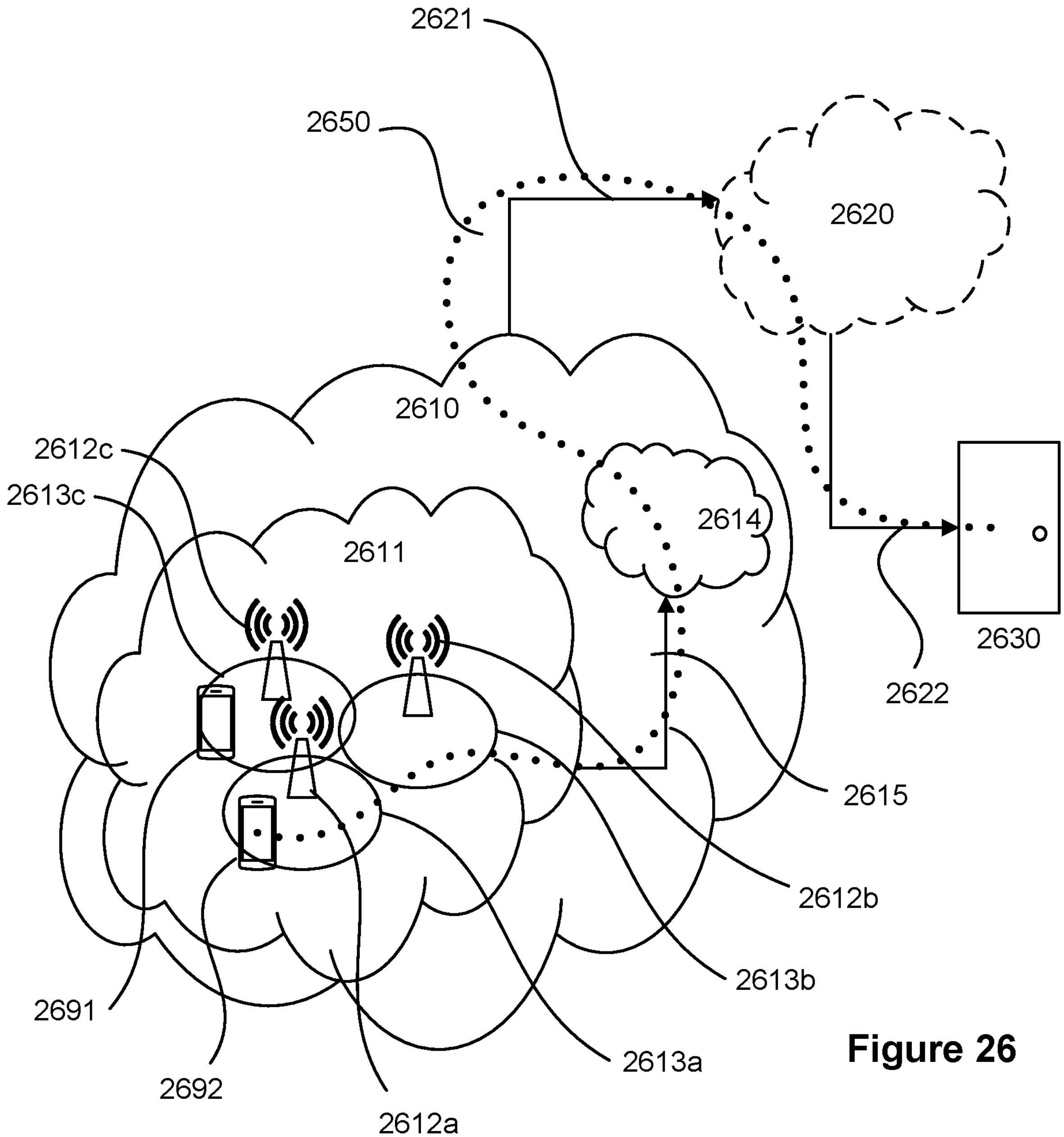
FIG. 26 is a block diagram of a communication network with a host computer according to some embodiments.

FIG. 26 illustrates a telecommunication network connected via an intermediate network to a host computer in accordance with some embodiments.

With reference to FIG. 26, in accordance with an embodiment, a communication system includes telecommunication network 2610, such as a 3GPP-type cellular network, which comprises access network 2611, such as a radio access network, and core network 2614.

Access network 2611 comprises a plurality of base stations **2612*a*, 2612*b*, 2612*c*, such as NBs, eNBs, gNBs or other types of wireless access points, each defining a corresponding coverage area 2613*a*, 2613*b*, 2613*c*. Each base station 2612*a*, 2612*b*, 2612*c* is connectable to core network 2614 over a wired or wireless connection 2615. A first UE 2691 located in coverage area 2613*c* is configured to wirelessly connect to, or be paged by, the corresponding base station 2612*c*. A second UE 2692 in coverage area 2613*a* is wirelessly connectable to the corresponding base station 2612*a*. While a plurality of UEs 2691, 2692 are illustrated in this example, the disclosed embodiments are equally applicable to a situation where a sole UE is in the coverage area or where a sole UE is connecting to the corresponding base station 2612**.

Telecommunication network 2610 is itself connected to host computer 2630, which may be embodied in the hardware and/or software of a standalone server, a cloud-implemented server, a distributed server or as processing resources in a server farm. Host computer 2630 may be under the ownership or control of a service provider, or may be operated by the service provider or on behalf of the service provider. Connections 2621 and 2622 between telecommunication network 2610 and host computer 2630 may extend directly from core network 2614 to host computer 2630 or may go via an optional intermediate network 2620. Intermediate network 2620 may be one of, or a combination of more than one of, a public, private or hosted network; intermediate network 2620, if any, may be a backbone network or the Internet; in particular, intermediate network 2620 may comprise two or more sub-networks (not shown).

The communication system of FIG. 26 as a whole enables connectivity between the connected UEs 2691, 2692 and host computer 2630. The connectivity may be described as an over-the-top (OTT) connection 2650. Host computer 2630 and the connected UEs 2691, 2692 are configured to communicate data and/or signaling via OTT connection 2650, using access network 2611, core network 2614, any intermediate network 2620 and possible further infrastructure (not shown) as intermediaries. OTT connection 2650 may be transparent in the sense that the participating communication devices through which OTT connection 2650 passes are unaware of routing of uplink and downlink communications. For example, base station 2612 may not or need not be informed about the past routing of an incoming downlink communication with data originating from host computer 2630 to be forwarded (e.g., handed over) to a connected UE 2691. Similarly, base station 2612 need not be aware of the future routing of an outgoing uplink communication originating from the UE 2691 towards the host computer 2630.

Figure 27:
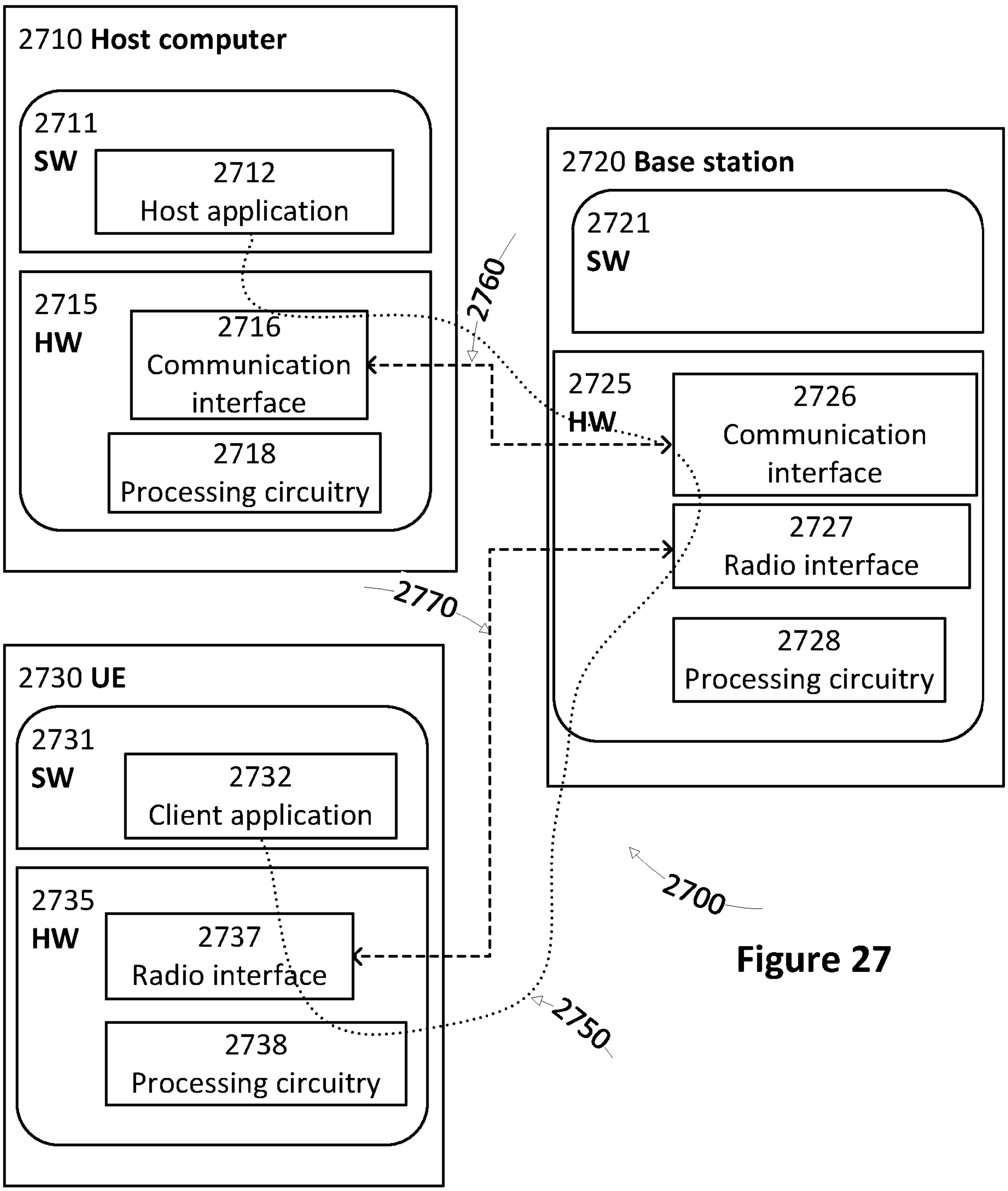
FIG. 27 is a block diagram of a host computer according to some embodiments.

FIG. 27 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 27. In communication system 2700, host computer 2710 comprises hardware 2715 including communication interface 2716 configured to set up and maintain a wired or wireless connection with an interface of a different communication device of communication system 2700. Host computer 2710 further comprises processing circuitry 2718, which may have storage and/or processing capabilities. In particular, processing circuitry 2718 may comprise one or more programmable processors, application-specific integrated circuits, field programmable gate arrays or combinations of these (not shown) adapted to execute instructions. Host computer 2710 further comprises software 2711, which is stored in or accessible by host computer 2710 and executable by processing circuitry 2718. Software 2711 includes host application 2712. Host application 2712 may be operable to provide a service to a remote user, such as UE 2730 connecting via OTT connection 2750 terminating at UE 2730 and host computer 2710. In providing the service to the remote user, host application 2712 may provide user data which is transmitted using OTT connection 2750.

Communication system 2700 further includes base station 2720 provided in a telecommunication system and comprising hardware 2725 enabling it to communicate with host computer 2710 and with UE 2730. Hardware 2725 may include communication interface 2726 for setting up and maintaining a wired or wireless connection with an interface of a different communication device of communication system 2700, as well as radio interface 2727 for setting up and maintaining at least wireless connection 2770 with UE 2730 located in a coverage area (not shown in FIG. 27) served by base station 2720. Communication interface 2726 may be configured to facilitate connection 2760 to host computer 2710. Connection 2760 may be direct or it may pass through a core network (not shown in FIG. 27) of the telecommunication system and/or through one or more intermediate networks outside the telecommunication system. In the embodiment shown, hardware 2725 of base station 2720 further includes processing circuitry 2728, which may comprise one or more programmable processors, application-specific integrated circuits, field programmable gate arrays or combinations of these (not shown) adapted to execute instructions. Base station 2720 further has software 2721 stored internally or accessible via an external connection.

Communication system 2700 further includes UE 2730 already referred to. Its hardware 2735 may include radio interface 2737 configured to set up and maintain wireless connection 2770 with a base station serving a coverage area in which UE 2730 is currently located. Hardware 2735 of UE 2730 further includes processing circuitry 2738, which may comprise one or more programmable processors, application-specific integrated circuits, field programmable gate arrays or combinations of these (not shown) adapted to execute instructions. UE 2730 further comprises software 2731, which is stored in or accessible by UE 2730 and executable by processing circuitry 2738. Software 2731 includes client application 2732. Client application 2732 may be operable to provide a service to a human or non-human user via UE 2730, with the support of host computer 2710. In host computer 2710, an executing host application 2712 may communicate with the executing client application 2732 via OTT connection 2750 terminating at UE 2730 and host computer 2710. In providing the service to the user, client application 2732 may receive request data from host application 2712 and provide user data in response to the request data. OTT connection 2750 may transfer both the request data and the user data. Client application 2732 may interact with the user to generate the user data that it provides.

It is noted that host computer 2710, base station 2720 and UE 2730 illustrated in FIG. 27 may be similar or identical to host computer 2630, one of base stations 2612*a*, 2612*b*, 2612*c* and one of UEs 2691, 2692 of FIG. 26, respectively. This is to say, the inner workings of these entities may be as shown in FIG. 27 and independently, the surrounding network topology may be that of FIG. 26.

In FIG. 27, OTT connection 2750 has been drawn abstractly to illustrate the communication between host computer 2710 and UE 2730 via base station 2720, without explicit reference to any intermediary devices and the precise routing of messages via these devices. Network infrastructure may determine the routing, which it may be configured to hide from UE 2730 or from the service provider operating host computer 2710, or both. While OTT connection 2750 is active, the network infrastructure may further take decisions by which it dynamically changes the routing (e.g., on the basis of load balancing consideration or reconfiguration of the network).

Wireless connection 2770 between UE 2730 and base station 2720 is in accordance with the teachings of the embodiments described throughout this disclosure. One or more of the various embodiments may improve the performance of OTT services provided to UE 2730 using OTT connection 2750, in which wireless connection 2770 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 2750 between host computer 2710 and UE 2730, in response to variations in the measurement results. The measurement procedure and/or the network functionality for reconfiguring OTT connection 2750 may be implemented in software 2711 and hardware 2715 of host computer 2710 or in software 2731 and hardware 2735 of UE 2730, or both. In embodiments, sensors (not shown) may be deployed in or in association with communication devices through which OTT connection 2750 passes; the sensors may participate in the measurement procedure by supplying values of the monitored quantities exemplified above, or supplying values of other physical quantities from which software 2711, 2731 may compute or estimate the monitored quantities. The reconfiguring of OTT connection 2750 may include message format, retransmission settings, preferred routing etc.; the reconfiguring need not affect base station 2720, and it may be unknown or imperceptible to base station 2720. Such procedures and functionalities may be known and practiced in the art. In certain embodiments, measurements may involve proprietary UE signaling facilitating host computer 2710's measurements of throughput, propagation times, latency and the like. The measurements may be implemented in that software 2711 and 2731 causes messages to be transmitted, in particular empty or 'dummy' messages, using OTT connection 2750 while it monitors propagation times, errors etc.

Figure 28:
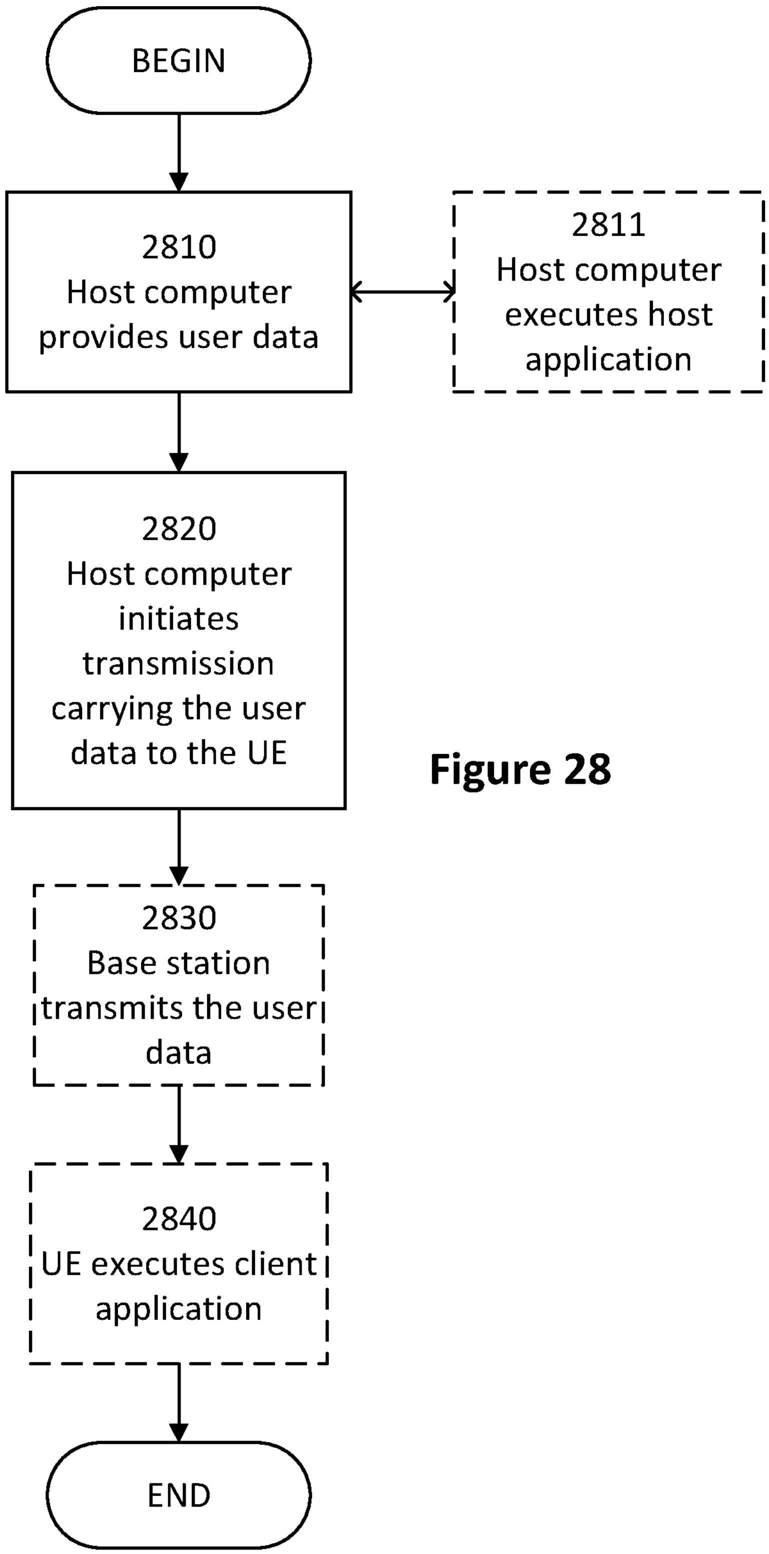
FIG. 28 is a flowchart illustrating a method implemented in a communication system, in accordance with one embodiment.

FIG. 28 illustrates methods implemented in a communication system including a host computer, a base station and a user equipment in accordance with some embodiments. The communication system includes a host computer, a base station and a UE which may be those described with reference to FIGS. 26 and 27. For simplicity of the present disclosure, only drawing references to FIG. 28 will be included in this section. In step 2810, the host computer provides user data. In substep 2811 (which may be optional) of step 2810, the host computer provides the user data by executing a host application. In step 2820, the host computer initiates a transmission carrying the user data to the UE. In step 2830 (which may be optional), the base station transmits to the UE the user data which was carried in the transmission that the host computer initiated, in accordance with the teachings of the embodiments described throughout this disclosure. In step 2840 (which may also be optional), the UE executes a client application associated with the host application executed by the host computer.

Figure 29:
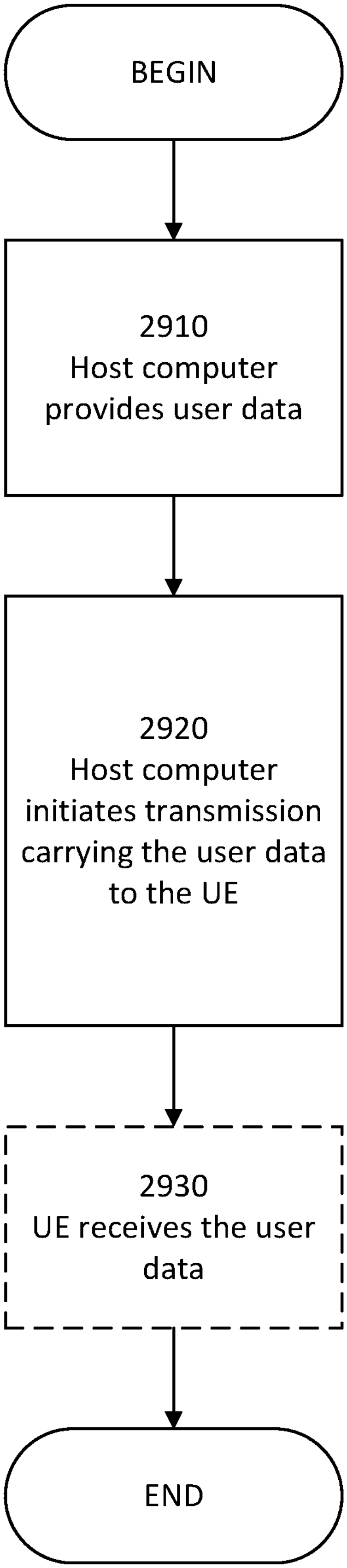
FIG. 29 is a flowchart illustrating a method implemented in a communication system, in accordance with one embodiment.

FIG. 29 illustrates methods implemented in a communication system including a host computer, a base station and a user equipment in accordance with some embodiments. The communication system includes a host computer, a base station and a UE which may be those described with reference to FIGS. 26 and 27. For simplicity of the present disclosure, only drawing references to FIG. 29 will be included in this section. In step 2910 of the method, the host computer provides user data. In an optional substep (not shown) the host computer provides the user data by executing a host application. In step 2920, the host computer initiates a transmission carrying the user data to the UE. The transmission may pass via the base station, in accordance with the teachings of the embodiments described throughout this disclosure. In step 2930 (which may be optional), the UE receives the user data carried in the transmission.

Figure 30:
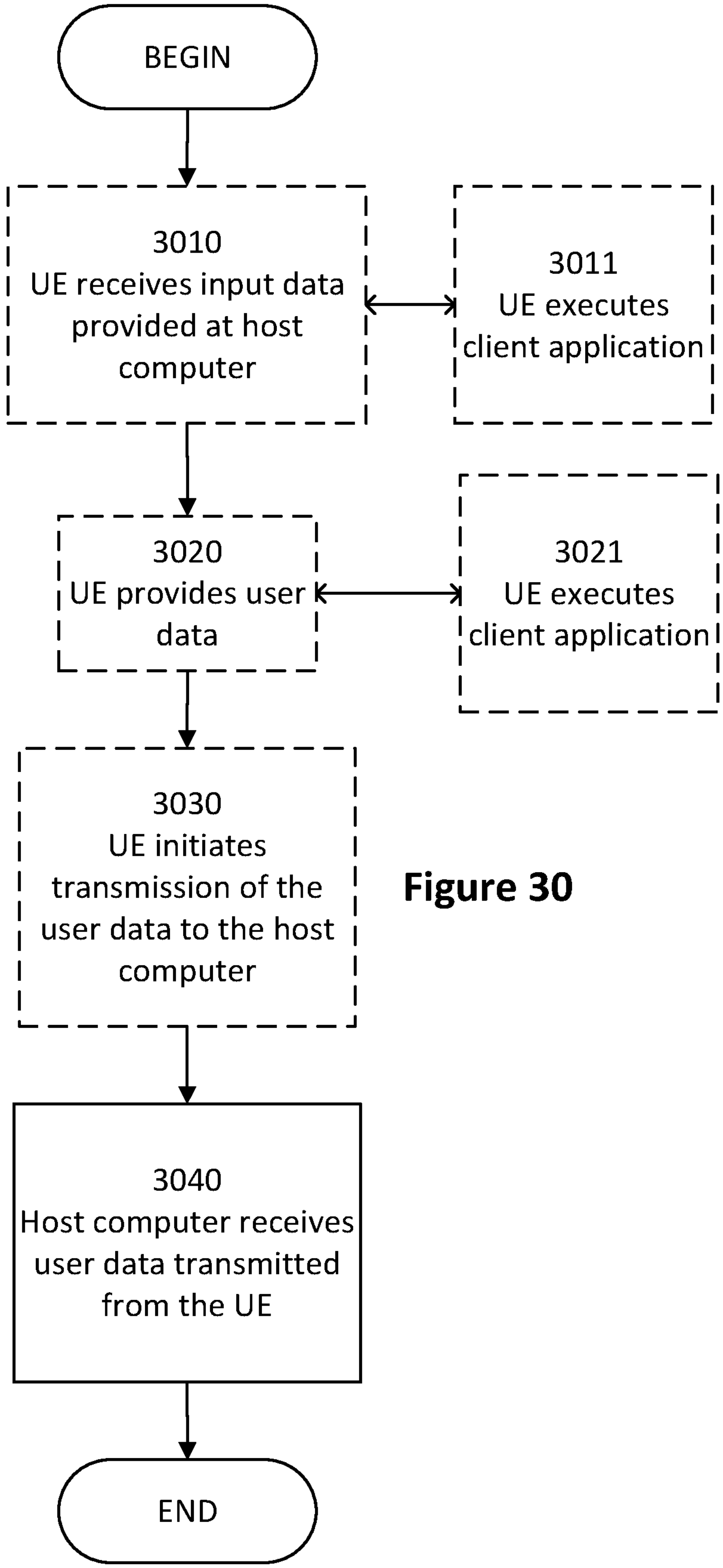
FIG. 30 is a flowchart illustrating a method implemented in a communication system, in accordance with one embodiment.

FIG. 30 illustrates methods implemented in a communication system including a host computer, a base station and a user equipment in accordance with some embodiments. The communication system includes a host computer, a base station and a UE which may be those described with reference to FIGS. 26 and 27. For simplicity of the present disclosure, only drawing references to FIG. 30 will be included in this section. In step 3010 (which may be optional), the UE receives input data provided by the host computer. Additionally or alternatively, in step 3020, the UE provides user data. In substep 3021 (which may be optional) of step 3020, the UE provides the user data by executing a client application. In substep 3011 (which may be optional) of step 3010, the UE executes a client application which provides the user data in reaction to the received input data provided by the host computer. In providing the user data, the executed client application may further consider user input received from the user. Regardless of the specific manner in which the user data was provided, the UE initiates, in substep 3030 (which may be optional), transmission of the user data to the host computer. In step 3040 of the method, the host computer receives the user data transmitted from the UE, in accordance with the teachings of the embodiments described throughout this disclosure.

Figure 31:
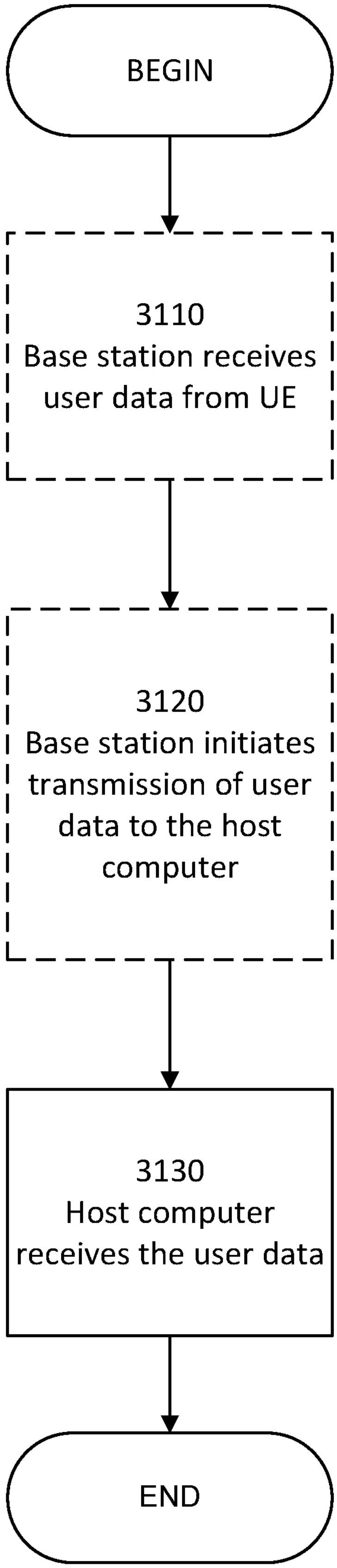
FIG. 31 is a flowchart illustrating a method implemented in a communication system, in accordance with one embodiment.

FIG. 31 illustrates methods implemented in a communication system including a host computer, a base station and a user equipment in accordance with some embodiments. The communication system includes a host computer, a base station and a UE which may be those described with reference to FIGS. 26 and 27. For simplicity of the present disclosure, only drawing references to FIG. 31 will be included in this section. In step 3110 (which may be optional), in accordance with the teachings of the embodiments described throughout this disclosure, the base station receives user data from the UE. In step 3120 (which may be optional), the base station initiates transmission of the received user data to the host computer. In step 3130 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Generally, therefore, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

When an element is referred to as being “connected”, “coupled”, “responsive”, or variants thereof to another element, it can be directly connected, coupled, or responsive to the other element or intervening elements may be present. In contrast, when an element is referred to as being “directly connected”, “directly coupled”, “directly responsive”, or variants thereof to another element, there are no intervening elements present. Like numbers refer to like elements throughout. Furthermore, “coupled”, “connected”, “responsive”, or variants thereof as used herein may include wirelessly coupled, connected, or responsive. As used herein, the singular forms “a”, “an” and “the” are intended to include the plural forms as well, unless the context clearly indicates otherwise. Well-known functions or constructions may not be described in detail for brevity and/or clarity. The term “and/or” includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms “comprise”, “comprising”, “comprises”, “include”, “including”, “includes”, “have”, “has”, “having”, or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation “e.g.”, which derives from the Latin phrase “exempli gratia,” may be used to introduce or specify a general example or examples of a previously mentioned item, and is not intended to be limiting of such item. The common abbreviation “i.e.”, which derives from the Latin phrase “id est,” may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as “circuitry,” “a module” or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Accordingly, many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Example embodiments are discussed below.

1. A method of operating a first network node (400) in a wireless communication network, comprising:
   determining (102) a modified configuration of a reference signal beam of a serving cell of the first network node; and
   transmitting (104) a first indication to a second network node, the first indication including a configuration update that describes the modified configuration of the reference signal beam of the serving cell.

2. The method of embodiment 1, further comprising:
   receiving a second indication from the second network node, the second indication comprising an acknowledgement of the first indication.

3. The method of embodiment 1 or 2, wherein the configuration update comprises a list of cells and/or a list of reference signal beams for which the first network node plans to use the modified configuration.

4. The method of any previous embodiment, wherein the configuration update comprises a list of cells and/or a list of reference signal beams that replace all or part of the configuration of cells and/or reference signal beams for the first network node that are indicated as to be modified in the configuration update.

5. The method of any previous embodiment, wherein the first indication comprises information regarding a possible configuration of cells and/or beams of a neighbouring cell to the serving cell.

6. The method of embodiment 5, wherein the neighbouring cell to the serving cell is served by the second network node.

7. The method of embodiment 5, wherein the neighbouring cell to the serving cell is served by a third network node.

8. The method of any of embodiments 5 to 7, wherein the possible configuration that is considered by the first network node to be compatible with the modified configuration described in the first indication.

9. The method of embodiment 8, wherein the modified configuration described in the first indication describes a change in shape of a reference signal beam of the serving cell, and wherein the possible configuration comprises a propose change to a shape of a beam in the neighbouring cell.

10. The method of any of embodiments 5 to 9 when dependent on embodiment 2, wherein the second indication comprises a confirmation of the possible configuration.

11. The method of any of embodiments 5 to 10, wherein the first indication comprises a list of cells of a neighbouring node to the first network node to which the possible configuration is signaled.

13. The method of any previous embodiment, wherein the modified configuration comprises at least one of a change in a shape of the reference signal beam, a merging of the reference signal beam with at least another reference signal beam, and/or a splitting of the reference signal beam into at least two new reference signal beams.

14. The method of any previous embodiment, wherein the reference signal beam comprises a downlink reference signal beam that carries a synchronization signal block or a channel state information reference signal, or an uplink reference signal beam that carries a sounding reference signal.

15. The method of any previous embodiment, wherein the first indication describes information related to a reconfiguration of the first network node according to the modified configuration.

16. The method of embodiment 15, wherein the information related to the reconfiguration of the first network node comprises a mapping between one or more serving cells of the first network node before the reconfiguration of the first network node according to the modified configuration and one or more serving cells of the first network node after the reconfiguration of the first network node according to the modified configuration.

17. The method of embodiment 15, wherein the information related to the reconfiguration of the first network node comprises a list of cells for which the first network node has modified a configuration of downlink reference beams.

18. The method of embodiment 15, wherein the information related to the reconfiguration of the first network node comprises a mapping between one or more reference signal beams of the serving cell of the first network node before the reconfiguration of the first network node according to the modified configuration and one or more reference signal beams of the serving cell of the first network node after the reconfiguration of the first network node according to the modified configuration.

19. The method of embodiment 15, wherein the information related to the reconfiguration of the first network node comprises a list of reference signal beams for which the first network node has modified the configuration.

20. The method of any previous embodiment, further comprising:
   modifying the configuration of at least one reference signal of the serving cell for coverage or capacity improvement.

21. The method of any previous embodiment, wherein the first indication comprises information relative to a possible configuration to be adopted by the second network node that is applicable to cells of the second network node that are neighbouring those cells of the first network node that are modified according to the modified configuration.

22. The method of any previous embodiment, further comprising:

receiving (112), at the first network node, a third indication from the second network node of a capacity and coverage optimization, CCO, issue with the serving cell of the first network node;

wherein determining the modified configuration of the reference signal beam is performed in response to the third indication.

23. The method of embodiment 22, wherein the indicated CCO issue comprises at least one of a capacity issue, a coverage issue, an interference issue and/or an uplink/downlink imbalance.

24. The method of any previous embodiment, wherein the first network node is a gNB and the second network node is a gNB.

25. The method of any of embodiments 1 to 23, wherein the first network node is a distributed unit, DU, of a gNB and the second network node is a control unit, CU, of the gNB.

26. The method of any previous embodiment, wherein the first indication comprises a modification of a list of synchronization signal blocks, SSBs, transmitted by the first network node.

27. The method of any previous embodiment, wherein the first indication comprises a new configuration for channel state information reference signals, CSI-RS, transmitted by the first network node.

28. The method of any previous embodiment, wherein the first indication comprises information splitting the serving cell into two or more cell partitions or new serving cells.

29. The method of embodiment 28, wherein the two or more cell partitions or new serving cells are configured with a single synchronization signal block, SSB, beam and a different physical cell identity, PCI.

30. The method of embodiment 28, wherein the two or more cell partitions or new serving cells are configured with multiple single synchronization signal block, SSB, beams and a different physical cell identity, PCI.

31. The method of embodiment 28, wherein the two or more cell partitions or new serving cells are configured with multiple single synchronization signal block, SSB, beams and a same physical cell identity, PCI.

32. The method of any previous embodiment, wherein the first indication comprises information splitting the reference signal beam into two or more reference signal beams.

33. The method of embodiment 32, wherein the two or more reference signal beams have coverage areas within the reference signal beam.

34. The method of any previous embodiment, wherein the first indication comprises information merging the reference signal beam with at least another reference signal beam.

35. The method of any previous embodiment, wherein the first indication comprises information merging the serving cell with at least a second serving cell to form at least a new serving cell.

36. The method of embodiment 35, wherein the serving cell and the second serving cell are defined by the coverage area of a single synchronization signal block, SSB, beam.

37. The method of embodiment 35, wherein the serving cell and the second serving cell are defined by the coverage area of a separate synchronization signal block, SSB, beams.

38. The method of any previous embodiment, wherein the first indication comprises information related to a configuration prior to reconfiguration of the reference beam for one or more of a list of cells of the first network node with modified configuration, a list of synchronization signal block, SSB, beams with modified configuration associated to at least one cell of the first network node, a list of channel state information reference signal, CSI-RS, beams with modified configuration associated to at least one cell or to at least one SSB beam within a cell of the first network node, a mapping between the serving cell and at least one reference signal beam and mapping between the reference signal beam and at least a second reference signal beam.

39. The method of any previous embodiment, wherein the first indication comprises information related to a configuration after reconfiguration of the reference beam for one or more of a list of cells of the first network node with modified configuration, a list of synchronization signal block, SSB, beams with modified configuration associated to at least one cell of the first network node, a list of channel state information reference signal, CSI-RS, beams with modified configuration associated to at least one cell or to at least one SSB beam within a cell of the first network node, a mapping between the serving cell and at least one reference signal beam and mapping between the reference signal beam and at least a second reference signal beam.

40. The method of any previous embodiment, wherein first network node is a gNB distributed unit (gNB-DU) and the second network node is a gNB centralized unit (gNB-CU) of a split RAN architecture of a 3GPP NG-RAN system.

41. The method of any of embodiments 1 to 39, wherein the first network node and the second network node are both a gNB of a full RAN architecture of a 3GPP NG-RAN system.

42. The method of any of embodiments 1 to 39, wherein the first network node is a gNB of a 3GPP NG-RAN system and the second network node is an eNB of an LTE system or an ng-eNB.

43. The method of any of embodiments 1 to 39, wherein the first network node is a 3GPP en-gNB and the second network node is a 3GPP eNB.

44. A method of operating a second network node in a wireless communication system, comprising:

receiving (202) a first indication from a first network node, the first indication including a configuration update that describes a modified configuration of a reference signal beam of a serving cell of the first network node;

determining (204) whether a modified neighbour cell list is needed based on the first indication; and updating (206) cell configuration information associated to the first network node.

45. The method of embodiment 44, wherein the first indication comprises information regarding a possible configuration of cells and/or beams of a neighbouring cell to the serving cell.

46. The method of embodiment 45, wherein the neighbouring cell to the serving cell is served by the second network node.

47. The method of embodiment 46, further comprising:

evaluating (210) whether the possible configuration of cells and/or beams of the neighbouring cell is feasible; and transmitting (212) a second indication to the first network node comprising an acknowledgement of the first indication.

48. The method of embodiment 47, further comprising:

implementing (214) the possible configuration of cells and/or beams of the neighbouring cell.

49. The method of embodiment 45, wherein the neighbouring cell to the serving cell is served by a third network node.

50. The method of embodiment 49, further comprising transmitting (222) the information regarding the possible configuration of cells and/or beams of the neighbouring cell to the third network node.

51. The method of any of embodiments 44 to 50, further comprising:

identifying (232) a capacity and coverage optimization, CCO, issue with the serving cell of the first network node; and transmitting (234) a third indication of the CCO issue with the serving cell of the first network node from the second network node to the first network node.

52. The method of embodiment 51, wherein the CCO issue comprises at least one of a capacity issue, a coverage issue, an interference issue and an uplink/downlink imbalance issue with the serving cell of the first network node.

53. A network node (400) configured to perform operations according to any of embodiments 1 to 52.

54. A first network node (400) configured to:

determine (102) a modified configuration of a reference signal beam of a serving cell of the first network node; and transmit (104) a first indication to a second network node, the first indication including a configuration update that describes the modified configuration of the reference signal beam of the serving cell.

55. A first network node (400), comprising:

a processor (403); and a memory (405) coupled to the processor;

wherein the memory comprises computer program instructions that, when executed by the processor, cause the network node to perform operations comprising:

determining (102) a modified configuration of a reference signal beam of a serving cell of the first network node; and transmitting (104) a first indication to a second network node, the first indication including a configuration update that describes the modified configuration of the reference signal beam of the serving cell.

56. A second network node (400) configured to:

receive (202) a first indication from a first network node, the first indication including a configuration update that describes a modified configuration of a reference signal beam of a serving cell of the first network node;

determine (204) whether a modified neighbour cell list is needed based on the first indication; and update (206) cell configuration information associated to the first network node.

57. A second network node (400), comprising:

a processor (403); and a memory (405) coupled to the processor;

wherein the memory comprises computer program instructions that, when executed by the processor, cause the network node to perform operations comprising:

receiving (202) a first indication from a first network node, the first indication including a configuration update that describes a modified configuration of a reference signal beam of a serving cell of the first network node;

determining (204) whether a modified neighbour cell list is needed based on the first indication; and updating (206) cell configuration information associated to the first network node.

What is claimed is:

1. A method performed by a first network node in a wireless communication network, the method comprising:

receiving an indication from a second network node of a capacity and coverage optimization (CCO) issue with a serving cell of the first network node;

determining, in response to the received indication, a modified configuration of a reference signal beam of the serving cell of the first network node; and transmitting a first indication to the second network node, wherein the first indication comprises a configuration update message that describes the modified configuration of the reference signal beam of the serving cell.

2. The method of claim 1, wherein the modified configuration modifies:

an identity of the reference signal beam; and/or a coverage state indicating a coverage configuration of the reference signal beam; and/or an identity of a cell to which the reference signal beam is mapped.

3. The method of claim 1, wherein the modified configuration is a modified coverage configuration of the reference signal beam.

4. The method of claim 1, wherein the configuration update message comprises a list of cells and/or a list of reference signal beams for which the first network node plans to use a modified configuration.

5. The method of claim 1, wherein the configuration update message includes a list of one or more reference signal beams of the serving cell before coverage modification, wherein the list includes said reference signal beam.

6. The method of claim 1, wherein the configuration update message includes a list of one or more replacing cells that are to replace all or part of a coverage of the serving cell after coverage modification.

7. The method of claim 1, wherein the configuration update message comprises a list of one or more reference signal beams that are to replace all or part of the reference signal beam according to the modified configuration of the reference signal beam.

8. The method of claim 1, wherein the indicated CCO issue comprises at least one of: a capacity issue, a coverage issue, an interference issue, and/or an uplink/downlink imbalance.

9. The method of claim 1, wherein the first network node is a distributed unit (DU) of a gNB and the second network node is a control unit (CU) of the gNB, and wherein the configuration update message is a gNB-DU Configuration Update message.

10. The method of claim 1, further comprising receiving a second indication from the second network node, the second indication comprising an acknowledgement of the first indication.

11. A method performed by a second network node in a wireless communication network, the method comprising:

transmitting, to a first network node, an indication of a capacity and coverage optimization (CCO) issue with a serving cell of the first network node;

receiving a first indication from the first network node in response to the transmitted indication of the CCO issue, the first indication comprising a configuration update message that describes a modified configuration of a reference signal beam of the serving cell of the first network node;

determining whether a modified neighbor cell list is needed based on the first indication; and updating cell configuration information associated to the first network node.

12. The method of claim 11, wherein the modified configuration modifies:

an identity of the reference signal beam; and/or a coverage state indicating a coverage configuration of the reference signal beam; and/or an identity of a cell to which the reference signal beam is mapped.

13. The method of claim 11, wherein the modified configuration is a modified coverage configuration of the reference signal beam.

14. The method of claim 11, wherein the configuration update message includes a list of one or more replacing cells that are to replace all or part of a coverage of the serving cell after coverage modification.

15. The method of claim 11, wherein the configuration update message comprises a list of one or more reference signal beams that are to replace all or part of the reference signal beam according to the modified configuration of the reference signal beam.

16. The method of claim 11, wherein the indicated CCO issue comprises at least one of: a capacity issue, a coverage issue, an interference issue, and/or an uplink/downlink imbalance.

17. The method of claim 11, wherein the first network node is a distributed unit (DU) of a gNB and the second network node is a control unit (CU) of the gNB, and wherein the configuration update message is a gNB-DU Configuration Update message.

18. The method of claim 11, further comprising transmitting a second indication to the first network node, the second indication comprising an acknowledgement of the first indication.

19. A first network node configured for use in a wireless communication network, the first network node comprising:

a processor; and a memory coupled to the processor;

wherein the memory comprises computer program instructions that, when executed by the processor, cause the first network node to:

receive an indication from a second network node of a capacity and coverage optimization (CCO) issue with a serving cell of the first network node;

determine, in response to the received indication, a modified configuration of a reference signal beam of the serving cell of the first network node; and transmit a first indication to the second network node, wherein the first indication comprises a configuration update message that describes the modified configuration of the reference signal beam of the serving cell.

20. The first network node of claim 19, wherein the memory comprises computer program instructions that, when executed by the processor, cause the first network node to perform a method, the method comprising:

receiving an indication from a second network node of a CCO issue with a serving cell of the first network node;

determining, in response to the received indication, a modified configuration of a reference signal beam of the serving cell of the first network node; and transmitting a first indication to the second network node, wherein the first indication comprises a configuration update message that describes the modified configuration of the reference signal beam of the serving cell, and wherein the modified configuration modifies:

an identity of the reference signal beam; and/or a coverage state indicating a coverage configuration of the reference signal beam; and/or an identity of a cell to which the reference signal beam is mapped.

21. A second network node configured for use in a wireless communication network, the second network node comprising:

a processor; and a memory coupled to the processor;

wherein the memory comprises computer program instructions that, when executed by the processor, cause the second network node to:

transmit, to a first network node, an indication of a capacity and coverage optimization (CCO) issue with a serving cell of the first network node;

receive a first indication from the first network node in response to the transmitted indication of the CCO issue, the first indication comprising a configuration update message that describes a modified configuration of a reference signal beam of the serving cell of the first network node;

determine whether a modified neighbor cell list is needed based on the first indication; and update cell configuration information associated to the first network node.

22. The second network node of claim 21, wherein the memory comprises computer program instructions that, when executed by the processor, cause the second network node to perform a method, the method comprising:

transmitting, to a first network node, an indication of a CCO issue with a serving cell of the first network node;

receiving a first indication from the first network node in response to the transmitted indication of the CCO issue, the first indication comprising a configuration update message that describes a modified configuration of a reference signal beam of the serving cell of the first network node;

determining whether a modified neighbor cell list is needed based on the first indication; and updating cell configuration information associated to the first network node, and wherein the modified configuration modifies:

an identity of the reference signal beam; and/or a coverage state indicating a coverage configuration of the reference signal beam; and/or an identity of a cell to which the reference signal beam is mapped.

* * * * *